(12) United States Patent
Svrcek et al.

(10) Patent No.: US 11,404,937 B2
(45) Date of Patent: Aug. 2, 2022

(54) INTEGRATED LINEAR GENERATOR SYSTEM

(71) Applicant: Mainspring Energy, Inc., Menlo Park, CA (US)

(72) Inventors: Matt Svrcek, Redwood City, CA (US); David DeGraaff, Mountain View, CA (US); Kevin Walters, Redwood City, CA (US); Cameron Wylie, Oakland, CA (US); John Powers, Menlo Park, CA (US); John Lawler, Portland, OR (US); Sam Sherman, San Francisco, CA (US); Jodie Prudhomme, San Francisco, CA (US); Scott Coakley, Naples, ID (US)

(73) Assignee: Mainspring Energy, Inc., Menlo Park, CA (US)

( * ) Notice: Subject to any disclaimer, the term of this patent is extended or adjusted under 35 U.S.C. 154(b) by 133 days.

(21) Appl. No.: 16/719,916

(22) Filed: Dec. 18, 2019

(65) Prior Publication Data
US 2020/0195093 A1    Jun. 18, 2020

Related U.S. Application Data

(60) Provisional application No. 62/781,586, filed on Dec. 18, 2018.

(51) Int. Cl.
*H02K 7/18* (2006.01)
*F02B 63/04* (2006.01)
(Continued)

(52) U.S. Cl.
CPC ......... *H02K 7/1884* (2013.01); *F02B 63/041* (2013.01); *F02B 71/04* (2013.01); *H02P 9/08* (2013.01)

(58) Field of Classification Search
CPC .......... F02B 63/041; F02B 71/04; H02P 9/08; H02P 2101/25; H02P 9/006
See application file for complete search history.

(56) References Cited

U.S. PATENT DOCUMENTS

| 7,616,084 B2 | 11/2009 | Lu et al. | |
| 2005/0109295 A1* | 5/2005 | Kaneko | F02B 71/04 123/46 E |

(Continued)

FOREIGN PATENT DOCUMENTS

WO    WO 2007126312    11/2007

OTHER PUBLICATIONS

International Search Report and Written Opinion of PCT/US2019/067296 dated Apr. 14, 2020.

*Primary Examiner* — Syed O Hasan
(74) *Attorney, Agent, or Firm* — Haley Guiliano LLP; Alexander Shvarts; Andrew C. Lee

(57) ABSTRACT

An integrated linear generator system includes, for example, a generator assembly, a control system, a frame system, an exhaust system, an intake system, a cooling system, a bearing system, one or more auxiliary systems, or a combination thereof. The generator system is configured to generate power, as controlled by the control system. The generator assembly may include an opposed- and free-piston linear generator, configured to operate on a two-stroke cycle. The intake and exhaust systems are configured to provide reactants to and remove products from the generator assembly, respectively. The cooling system is configured to effect heat transfer, material temperature, or both, of components of the integrated linear generator system. The bearing system is configured to constrain the off-axis motion of translators of the generator assembly without applying significant friction forces. The frame system is configured to manage (Continued)

rigidity, flexibility, and alignment of components of the integrated linear generator system.

23 Claims, 43 Drawing Sheets

(51) Int. Cl.
*F02B 71/04* (2006.01)
*H02P 9/08* (2006.01)

(56) References Cited

U.S. PATENT DOCUMENTS

| | | | |
|---|---|---|---|
| 2005/0274332 A1* | 12/2005 | Lemke | F02B 75/282 |
| | | | 123/41.35 |
| 2011/0221206 A1 | 9/2011 | Milinkovic et al. | |
| 2012/0112468 A1* | 5/2012 | Najt | F01B 11/007 |
| | | | 290/1 A |
| 2012/0125284 A1* | 5/2012 | Brace | B62K 11/04 |
| | | | 29/428 |
| 2012/0125291 A1 | 5/2012 | Simpson et al. | |
| 2017/0306837 A1 | 10/2017 | Gadda et al. | |
| 2018/0066657 A1* | 3/2018 | Perevozchikov | F04C 29/04 |

\* cited by examiner

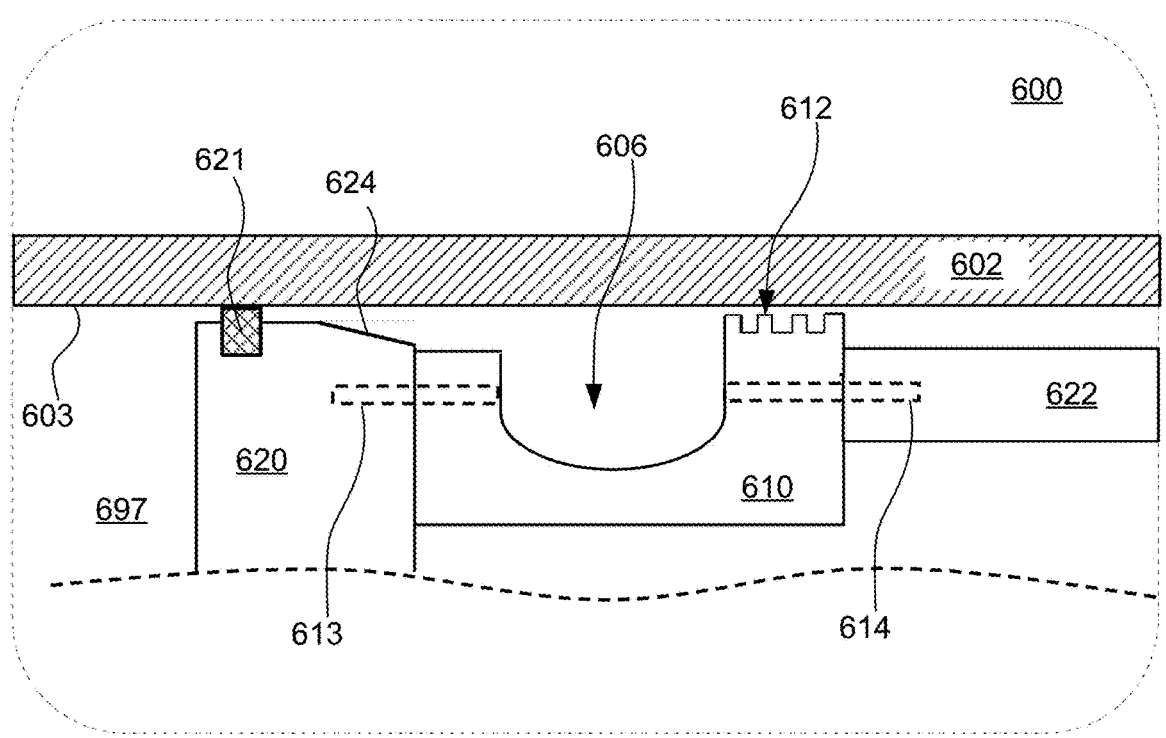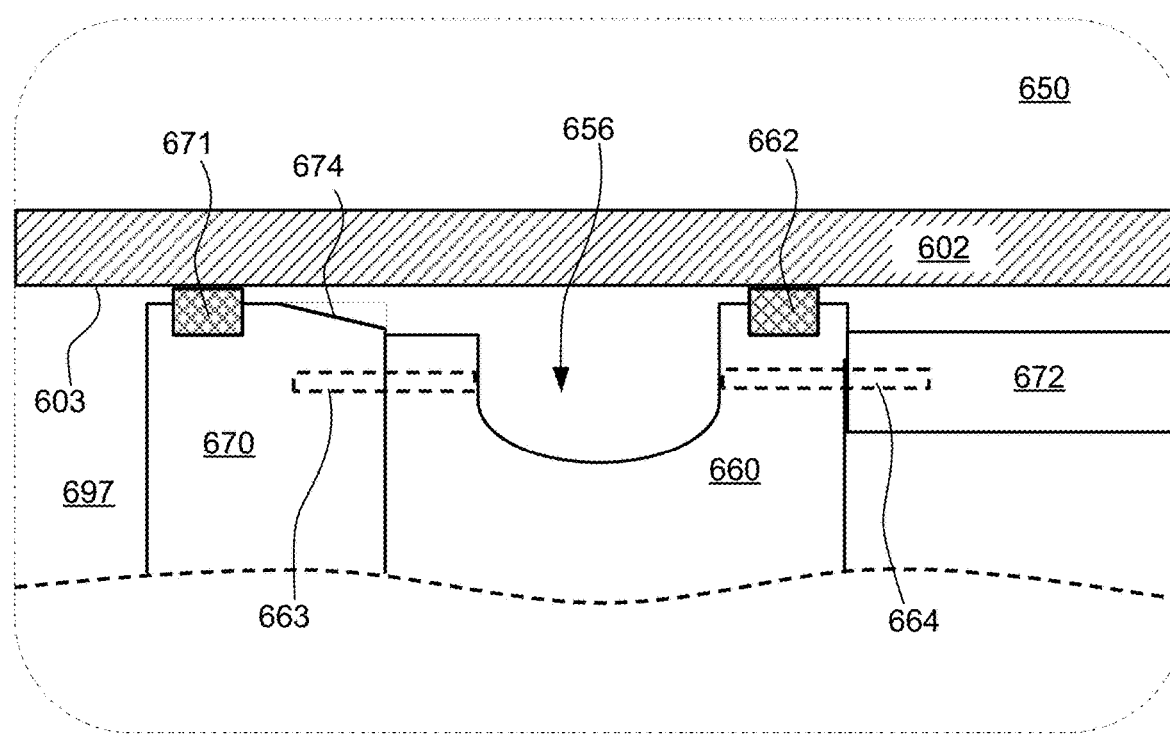
FIG. 6

FUEL SUPPLY,
SOURCE, OR
RESERVOIR

1800

FUEL FILTER
1802

FUEL
COMPRESSOR
1804

FUEL VALVE
1806

INTAKE SYSTEM
(E.G., MANIFOLD),
CYLINDER, ETC.

FIG. 18

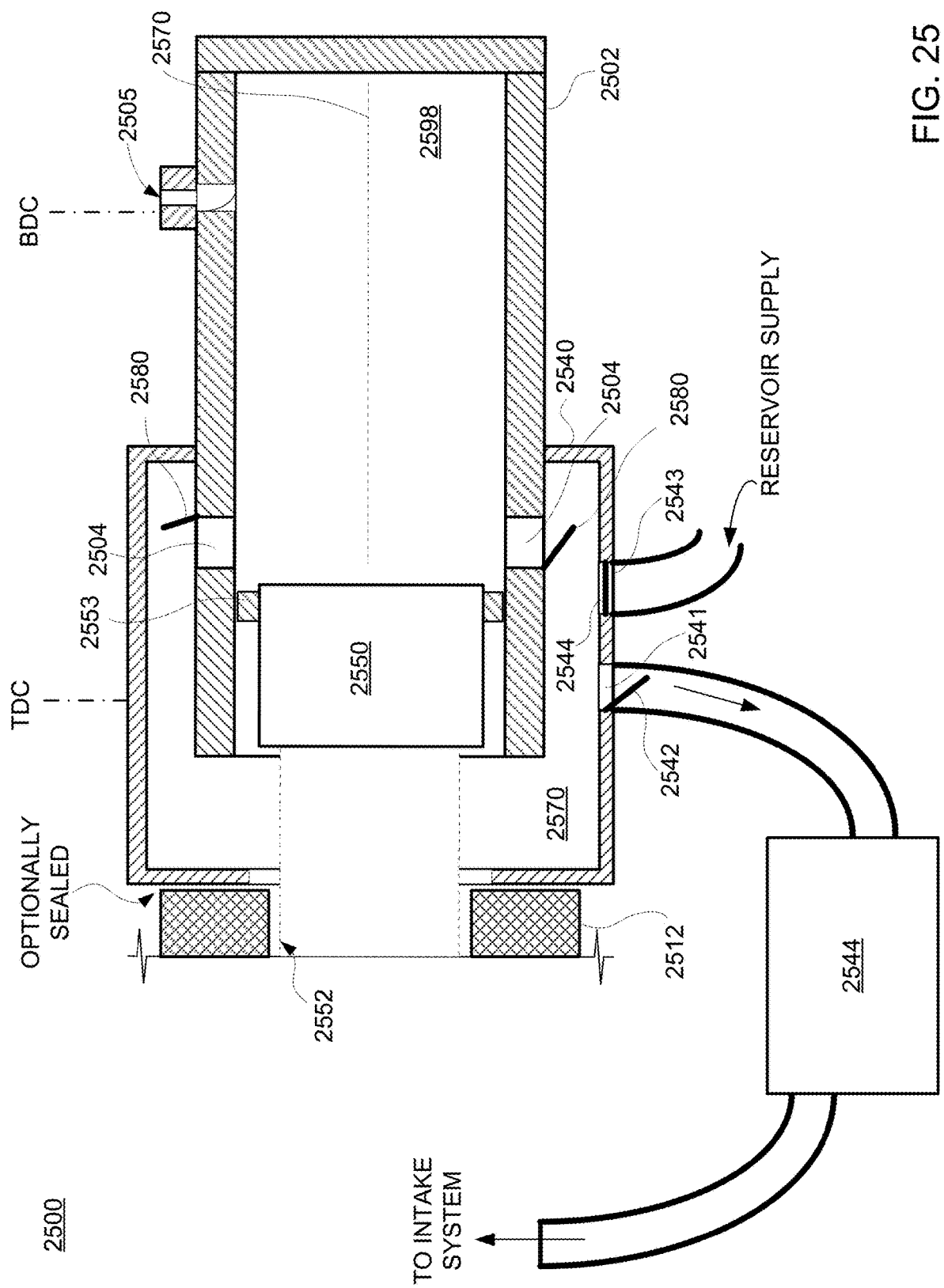

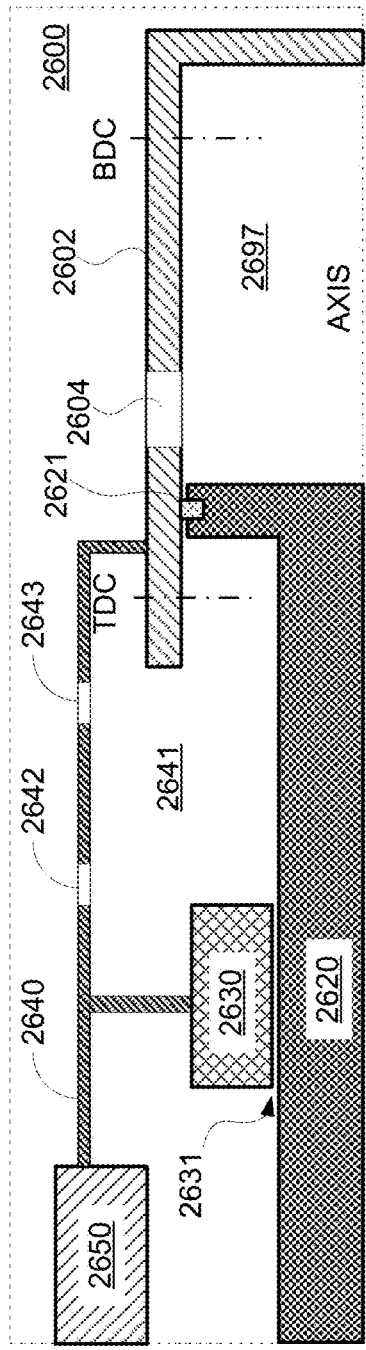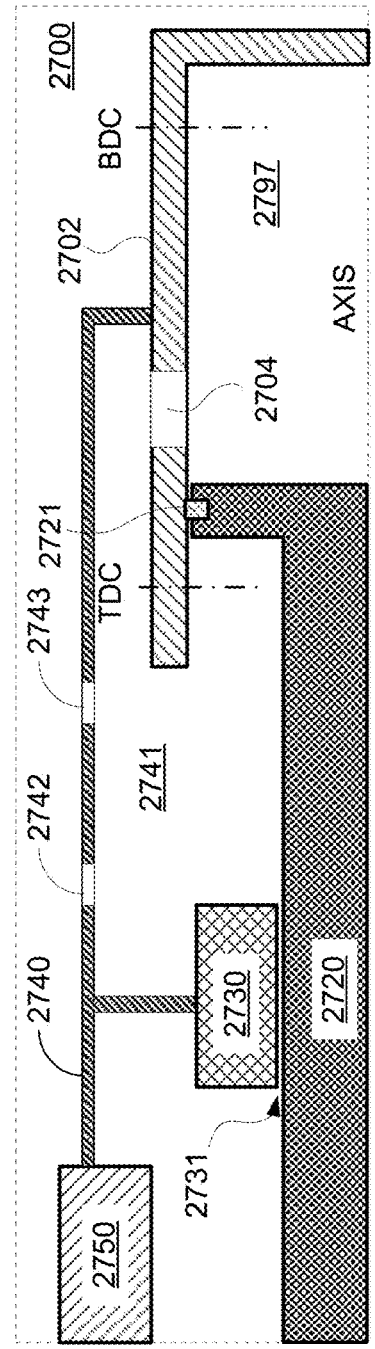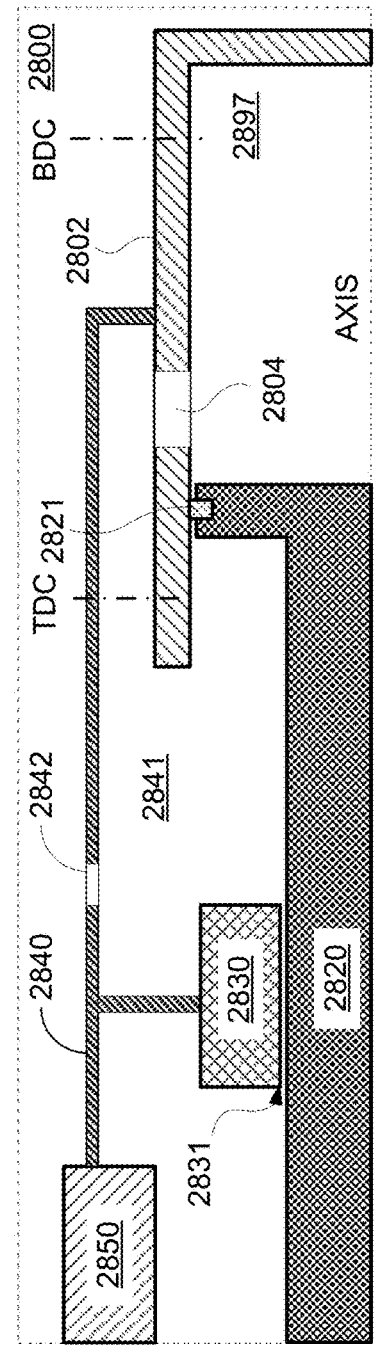

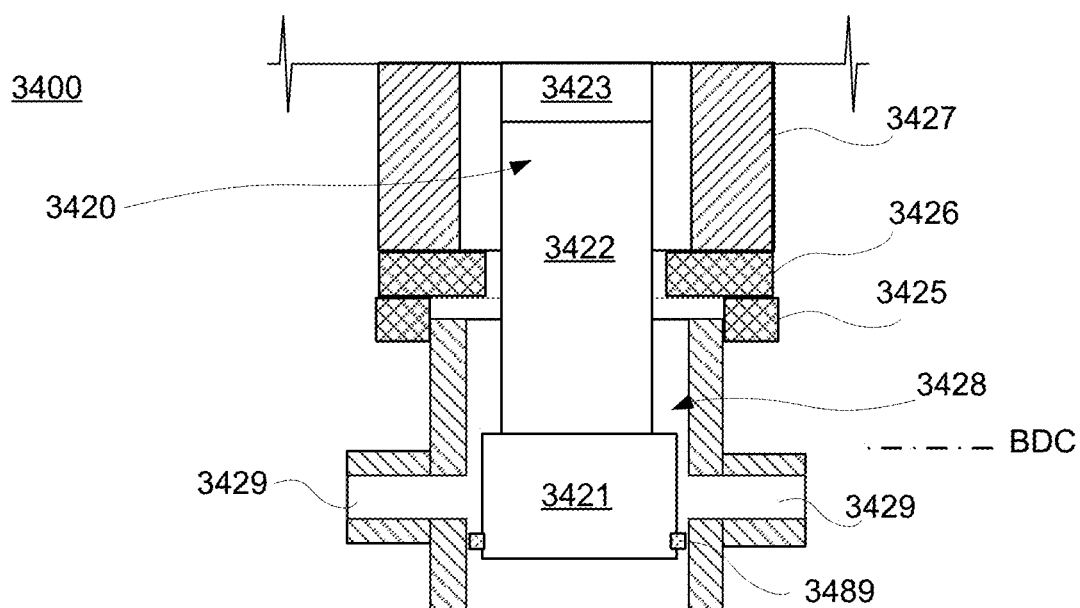
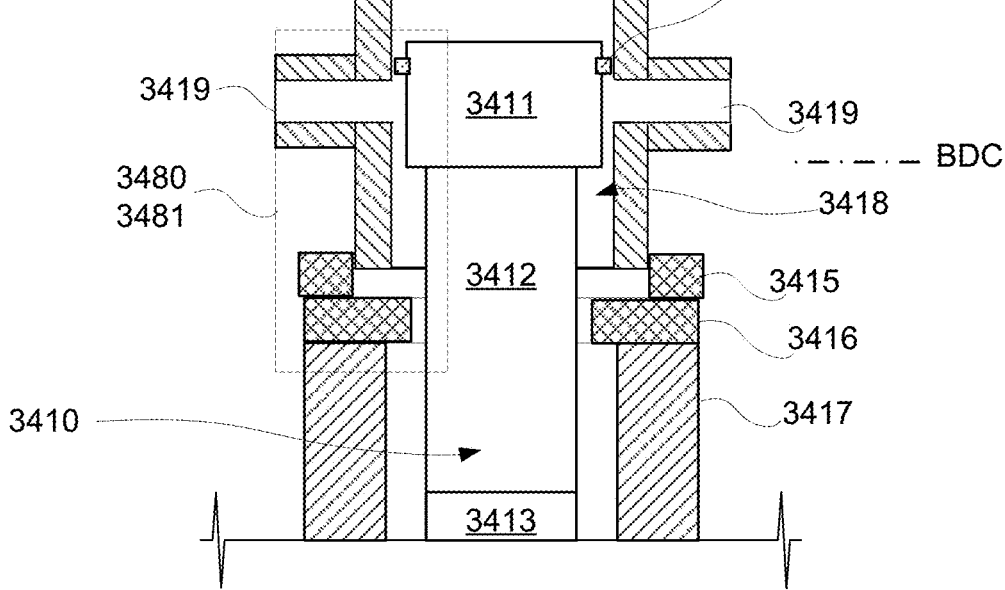
FIG. 34

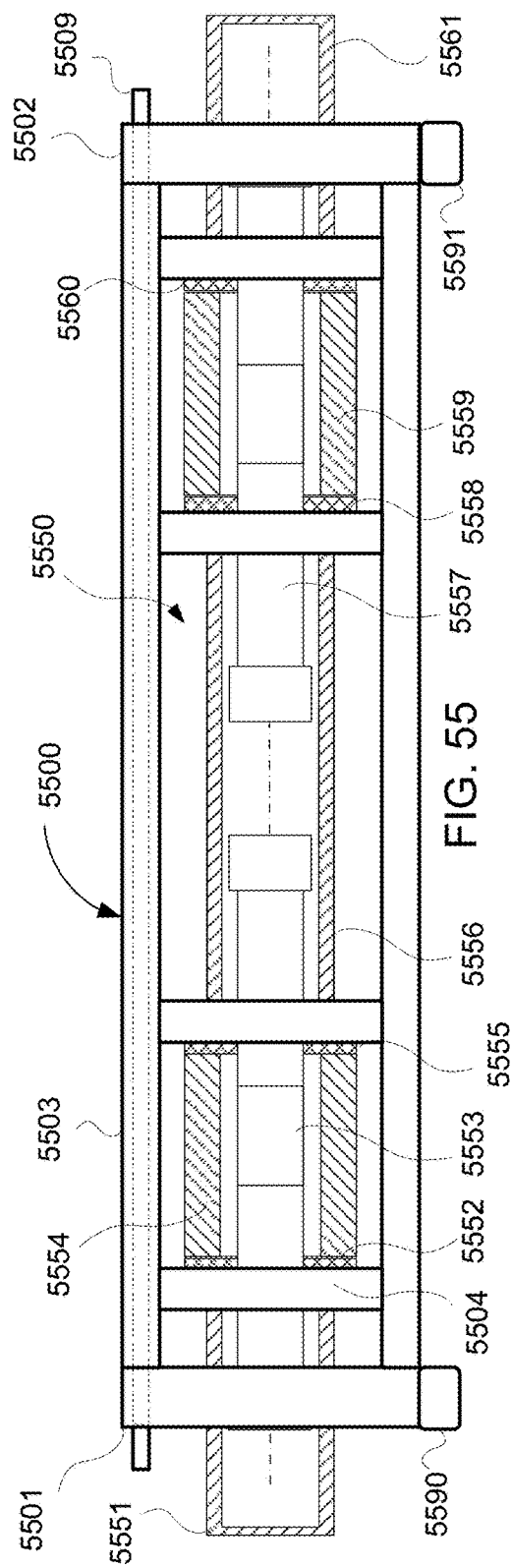
FIG. 55
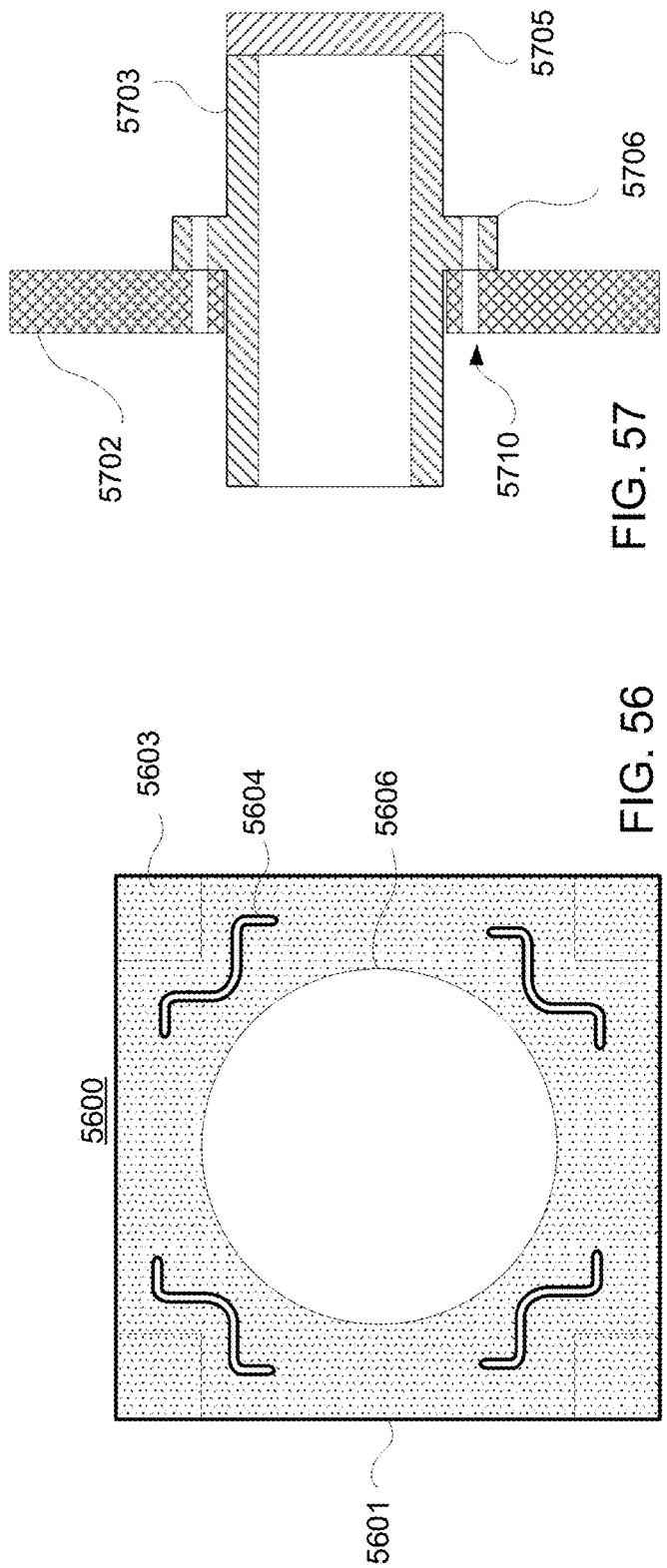
FIG. 56
FIG. 57

INTEGRATED LINEAR GENERATOR SYSTEM

CROSS-REFERENCE TO RELATED APPLICATIONS

The present disclosure is directed towards integrated linear generator systems and aspects thereof. This application claims the benefit of U.S. Provisional Patent Application No. 62/781,586 filed Dec. 18, 2018, the disclosure of which is hereby incorporated by reference herein in its entirety.

BACKGROUND

Power generating systems typically rely on a variety of subsystems acting in concert. For example, a typical crankshaft engine includes a rotating assembly that includes pistons, connecting rods, oiled bearings, and a crankshaft, an oil system, a coolant system, an ignition system, a valving system and camshaft, a fuel system, and an exhaust system. These subsystems are tailored to the crankshaft engine.

SUMMARY

In some embodiments, the present disclosure is directed to a linear generator. The linear generator includes a structural frame, a cylinder, a first linear electromagnetic machine (LEM), and a second LEM. The cylinder is affixed to a center region of the structural frame. The LEM is arranged on a first longitudinal side of the cylinder, and is affixed to the structural frame. The second LEM is arranged on a second longitudinal side of the cylinder, and is affixed to the structural frame. The second longitudinal side is opposite the first longitudinal side. The second LEM is aligned to the first LEM, and the cylinder is aligned to the first LEM and to the second LEM. For example, in some embodiments, the first LEM is laterally aligned, axially aligned, or both, to the second LEM. In some embodiments, the first LEM includes a first stator bore, the second LEM includes a second stator bore, and the first stator bore is aligned to the second stator bore. In some embodiments, the cylinder is affixed to the structural frame by one or more flexures. For example, in some embodiments, the one or more flexures are relatively stiffer to lateral displacement than axial displacement.

In some embodiments, the linear generator includes a first gas spring cylinder affixed to the structural frame and aligned to the first LEM, and a second gas spring cylinder affixed to the structural frame and aligned to the second LEM.

In some embodiments, the structural frame includes one or more openings in a top surface. The one or more openings allow insertion of the cylinder into the structural frame, allow insertion of the first LEM into the structural frame, and allow insertion of the second LEM into the structural frame.

In some embodiments, the linear generator includes at least one mount affixed to the frame. The linear generator may operate in one or more frequency ranges, and the mount is capable of attenuating vibrations from the linear generator.

In some embodiments, the structural frame includes one or more end members that allow for axial thermal expansion and maintain lateral stiffness.

In some embodiments, the present disclosure is directed to a linear generator that includes a structural frame, a cylinder, a first stator, and a second stator. The cylinder is affixed to a center region of the structural frame, the first stator is arranged on a first longitudinal side of the cylinder and is affixed to the structural frame, and the second stator is arranged on a second longitudinal side of the cylinder and is affixed to the structural frame. The second longitudinal side is opposite the first side, the second stator is aligned to the first stator, and the cylinder is aligned to the first stator and to the second stator.

In some embodiments, the linear generator includes a first translator that is arranged to interact with both the first stator, and the cylinder and a second translator that is arranged to interact with both the second stator and the cylinder. In some embodiments, the linear generator includes one or more first gas bearing housings that constrain the first translator relative to the first stator, and one or more second gas bearing housings that constrain the second translator relative to the second stator. In some embodiments, each translator includes a first piston arranged to move along an axis of the cylinder, and a magnet section that interacts with a respective stator. For example, opposing pistons of the translators define a reaction section of the cylinder In some embodiments, the structural frame includes one or more end members, wherein the one or more end members allow for axial thermal expansion and maintain lateral stiffness.

In some embodiments, the present disclosure is directed to a structural frame for mounting components of a linear generator. The structural frame includes one or more members for providing axial and lateral stiffness, a first mounting area of the one or more members for receiving a first LEM, a second mounting area of the one or more members for receiving a second LEM, a third mounting area of the one or more members for receiving a cylinder, and one or more openings among the one or more members. The one or more openings correspond to the first mounting area, the second mounting area, and the third mounting area.

In some embodiments, the one or more openings are arranged on a top side of the structural frame so that the first mounting area receives the first LEM through the top side, the second mounting area receives the second LEM through the top side, and the third mounting area receives the cylinder through the top side.

In some embodiments, the structural frame includes one or more end members coupled to the one or more members. The one or more end members allow for axial thermal expansion and maintain lateral stiffness. In some embodiments, the first mounting area, the second mounting area, and the third mounting area are axially and laterally aligned.

In some embodiments, the present disclosure is directed to a linear generator that includes an intake system. The intake system is configured to provide intake gas to the reaction section.

In some embodiments, the present disclosure is directed to a linear generator that includes an exhaust system. The exhaust system is configured to remove exhaust gas from the reaction section.

In some embodiments, the present disclosure is directed to a linear generator that includes a fuel system. The fuel system is configured to provide fuel to the mix with intake air upstream or in the reaction section.

In some embodiments, the present disclosure is directed to a linear generator that includes an electrical system. The electrical system is configured to manage electrical interactions such as power management, control signals, sensor circuitry, control circuitry, and other circuitry.

In some embodiments, the present disclosure is directed to a linear generator that includes a control system. The control system is configured to communicate with sensors, receive sensor signals, generate control signals, determine operating parameters, execute computer instructions, and otherwise control aspects of operating and characterizing a linear generator.

In some embodiments, the present disclosure is directed to a system that includes one or more cores. For example, each core may include a linear generator or a generator assembly.

In some embodiments, the present disclosure is directed to a linear generator that includes a cooling system. The cooling system is configured to manage heat flows and temperatures of the linear generator.

In some embodiments, the present disclosure is directed to a linear he linear generator that includes a bearing system. The bearing system is configured to manage bearing stiffness and operation. For example, a bearing system manages a gas bearing (e.g., pressure, flow or both of the gas bearing).

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 6 shows two cross-sectional views of illustrative translators having reservoirs, in accordance with some embodiments of the present disclosure;

FIG. 18 shows a system diagram of an illustrative fuel system, in accordance with some embodiments of the present disclosure;

FIG. 25 shows a cross-sectional side view of an illustrative gas spring system, having a reservoir configured for intake compression, in accordance with some embodiments of the present disclosure;

FIG. 26 shows a side cross-sectional view of a portion of an illustrative gas spring system having a reservoir, in accordance with some embodiments of the present disclosure;

FIG. 27 shows a side cross-sectional view of a portion of an illustrative gas spring system having a reservoir, in accordance with some embodiments of the present disclosure;

FIG. 28 shows a side cross-sectional view of a portion of an illustrative gas spring system having a reservoir, in accordance with some embodiments of the present disclosure;

FIG. 34 shows a cross-sectional view of an illustrative generator assembly portion, in accordance with some embodiments of the present disclosure;

FIG. 55 shows a side view of illustrative assembly including frame system coupled to generator assembly, in accordance with some embodiments of the present disclosure;

FIG. 56 shows an end view of an illustrative frame system, in accordance with some embodiments of the present disclosure;

FIG. 57 shows a cross-sectional view of an illustrative portion of an integrated linear generator system, which includes an end member, gas spring cylinder, and head, in accordance with some embodiments of the present disclosure;

DETAILED DESCRIPTION

In some embodiments, the present disclosure provides linear generator systems configured to provide electrical work (i.e., electricity) from an input of a fuel and oxidizer. In some embodiments, the present disclosure provides linear systems configured to convert between kinetic and electrical energy. In some embodiments, a linear generator includes a pair of opposed, oscillating translators arranged along an axis. The translators both contact a single compression or reaction section, and each translator also contacts a respective driver section (e.g., gas spring). As each translator moves along the axis, the compression or reaction section and gas springs are alternately compressed and expanded. In some embodiments, there are no mechanical linkages between translators (i.e., a linear free-piston generator or a linear free-translator generator). Electrical work is extracted from the linear generator via multiphase stators, which are configured to interact electromagnetically with the translators as the translators move.

Figure 1:
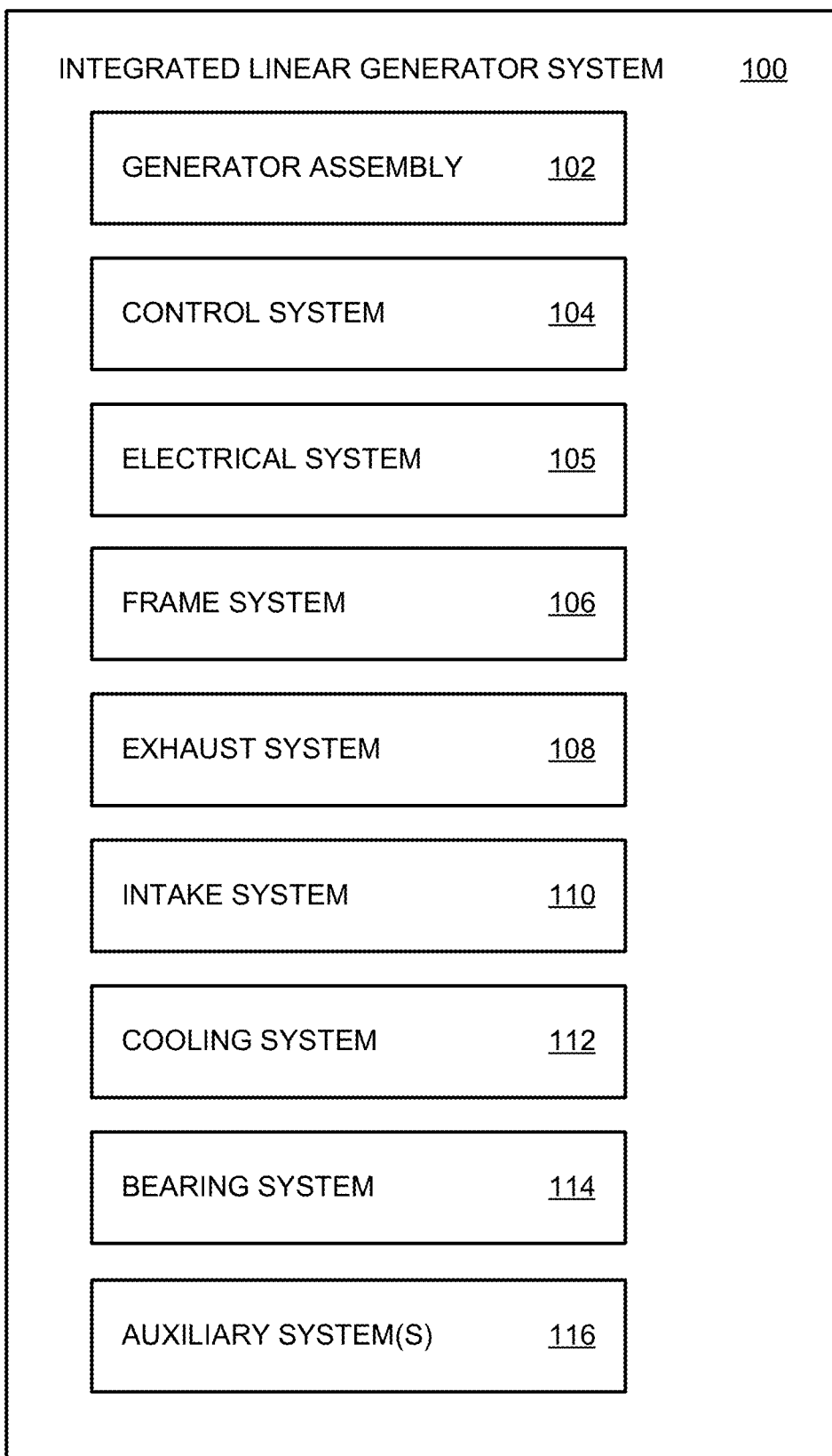
FIG. 1 shows a system diagram of an illustrative integrated linear generator system, in accordance with some embodiments of the present disclosure.

FIG. 1 shows a system diagram of an illustrative integrated linear generator system 100, in accordance with some embodiments of the present disclosure. Integrated linear generator system 100 includes generator assembly 102, control system 104, electrical system 105, frame system 106, exhaust system 108, intake system 110, cooling system 112, bearing system 114, and auxiliary system(s) 116. Generator system 100 is configured to generate and manage electric power as controlled by control system 104 and electrical system 105. In some embodiments, electrical system 105 includes both low-voltage and high-voltage components. For example, electrical system 105 may include 480 VAC components (e.g., grid or grid-tied components, auxiliary components), 120 VAC components/circuits (e.g., auxiliary components), a high voltage DC bus and components (e.g., >400 VDC, >700 VDC, or >1000 VDC components), a low voltage DC bus and components (e.g., 12 VDC, 24 VDC, or 48 VDC components), low voltage DC components (e.g., 12 VDC, 24 VDC, or 48 VDC components), any other suitable electrical circuits operating with any suitable voltage and current characteristics, or any combination thereof. Intake system 110 is configured to provide reactants (e.g., air, fuel, or both) to generator assembly 102, and exhaust system 108 is configured to remove exhaust products from generator assembly 102. Cooling system 112 is configured to limit, control, or otherwise affect, heat transfer and material temperature of components of integrated linear generator system 100. Bearing system 114 is configured to constrain the off-axis motion (e.g., radial, lateral, or otherwise lateral motion) of translators of generator assembly 102 using, for example, a low-friction gas bearing. Frame system 106 is configured to manage rigidity, flexibility, and alignment of components of integrated linear generator system 100. The divisions between, or combination of, systems 102-114 may be implemented in any suitable arrangement and are shown as separate in FIG. 1 for purposes of the following description. For example, any suitable components of control system 104, electrical system 105, frame system 106, bearing system 114, intake system 110, exhaust system 108, and cooling system 112 may be integral to generator assembly 102. Auxiliary system(s) 116 may include any suitable system or subsystem configured to support operation of integrated linear generator system 100.

It will be understood that system 100 is merely illustrative. Any suitable combination of subsystems may be used, including those that contain fewer or more than what is shown in FIG. 1.

Generator assembly 102 includes, for example, the moving and stationary assemblies and components that are configured to convert chemical and/or thermal energy into electrical energy. In some embodiments, generator assembly 102 includes cylinders, translators, stators, bearings, bearing housings, seals, corresponding alignment hardware, any other suitable components, or any suitable combination thereof. In some embodiments, generator assembly 102 is configured to perform a thermodynamic cycle such as, for example, a chemical engine cycle. An illustrative example includes a two-stroke piston engine cycle using compression ignition and port breathing via uniflow scavenging (e.g., intake ports at a first axial end and exhaust ports arranged at a second axial end, wherein scavenging occurs primarily axially). In a further example, generator assembly 102 may be configured to perform a cycle approximating, for example, an Otto cycle, a Diesel cycle, an Atkinson cycle, a Miller cycle, a Carnot cycle, an Ericsson cycle, a Stirling cycle, any other suitable idealized or actual cycle, or any suitable combination thereof.

Figure 2:
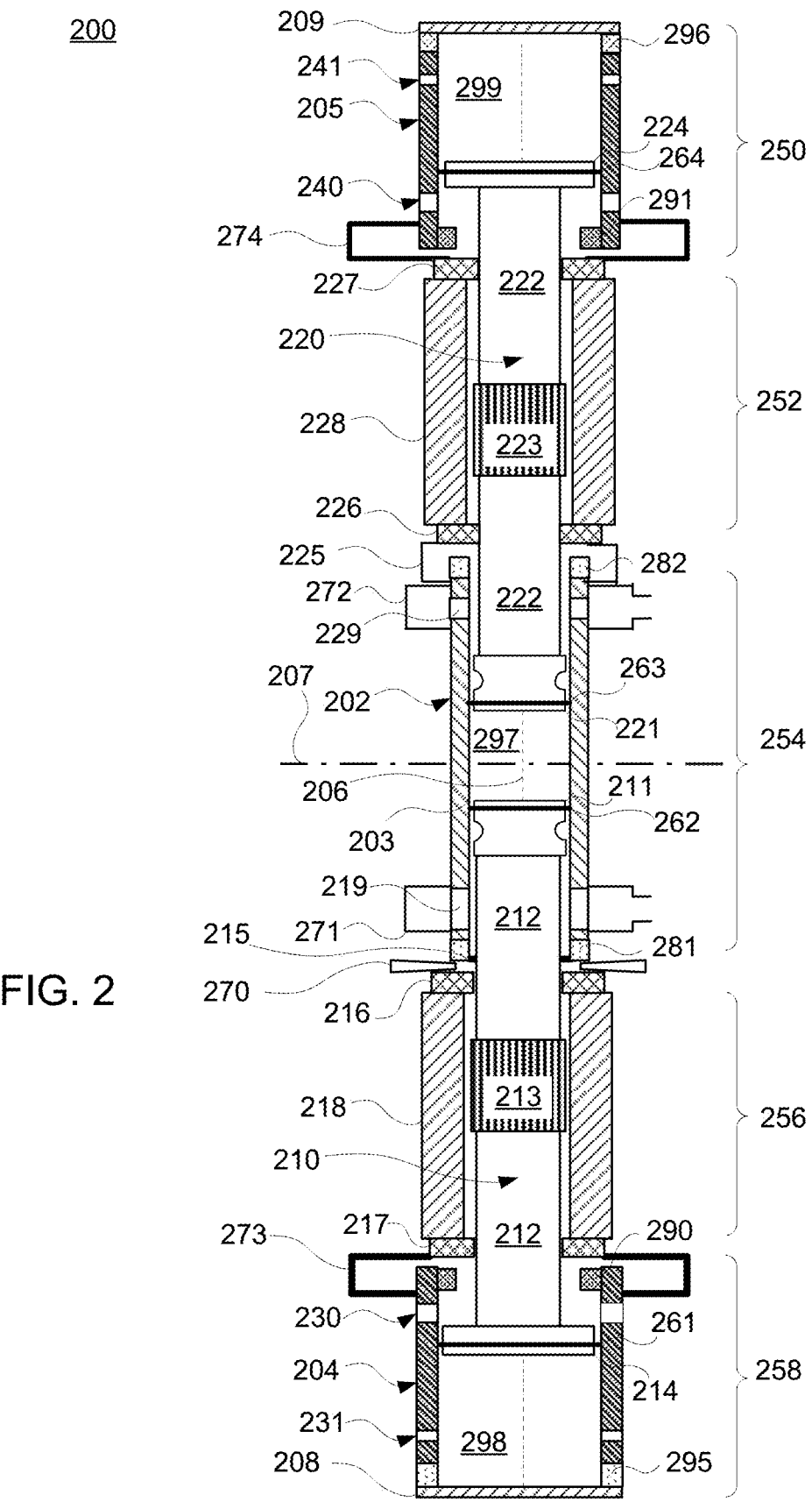
FIG. 2 shows a cross-sectional side view of an illustrative generator assembly, in accordance with some embodiments of the present disclosure.

FIG. 2 shows a cross-sectional view of illustrative generator assembly 200, in accordance with some embodiments of the present disclosure. Generator assembly 200 is configured as an opposed, generator. Generator assembly 200 includes translators 210 and 220, which are configured to move along axis 206 (e.g., translate linearly along axis 206). Translators 210 and 220 are configured to move within cylinders 202, 204 and 205, thus forming expansion and compression volumes 297, 298, and 299 for performing boundary work (e.g., determined using the cyclic integral of PdV over a suitable range such as a stroke or cycle). For clarity, the spatial arrangement of the systems and assemblies described herein will generally be referred to in the context of cylindrical coordinates, having axial, radial, and azimuthal directions. It will be understood that any suitable coordinate system may be used (e.g., cylindrical coordinates may be mapped to any suitable coordinate system), in accordance with the present disclosure. Note that axis 206 is directed in the axial direction, and the radial direction is defined as being perpendicular to axis 206 (e.g., directed away from axis 206). The azimuthal direction is defined as the angular direction around axis 206 (e.g., orthogonal to both axis 206 and the radial direction, and directed around axis 206).

In some embodiments, the stationary components of generator assembly 200 include cylinder 202, cylinder 204, cylinder 205, stator 218, stator 228, bearing housing 216, bearing housing 217, bearing housing 226, bearing housing 227, seal 215, seal 225, exhaust manifold 271, and intake manifold 272. In some embodiments, bearing housings 216 and 217 are coupled to stator 218 (e.g., either directly connected, or coupled by an intermediate component such as a flexure or mount). For example, bearing housings 216 and 217 may be aligned to (e.g., laterally or axially aligned), and fastened to, stator 218 to maintain a radial air gap between magnet assembly 213 and stator 218. Similarly, in some embodiments, bearing housings 226 and 227 are rigidly coupled to stator 228.

Translator 210 includes tube 212, piston 211, seal 262, piston 214, seal 261, and magnet assembly 213, all substantially rigidly coupled to move as a substantially rigid body along axis 206, relative to the stationary components. Translator 220 includes tube 222, piston 221, seal 263, piston 224, seal 264, and magnet assembly 223, all substantially rigidly coupled to move as a substantially rigid body along axis 206. In some embodiments, pistons 211 and 221 may include features or components to manage, modify, reduce, or otherwise control thermal expansion of or heat transfer to tubes 212 and 222, respectively (e.g., a spacer with low thermal conductivity, a collar that affects the flow of blow-by gases, or both) In some embodiments, magnet assemblies 213 and 223 may be a region of tubes 212 and 222, respectively. In some embodiments, magnet assemblies 213 and 223 may include separate components affixed to tubes 212 and 222, respectively. Reaction section 297 is bounded by pistons 211 and 221 (e.g., and also defined by seals 262 and 263), as well as bore 203 of cylinder 202. Gas springs 298 and 299 are bounded by respective pistons 214 and 224, as well as respective cylinders 204 and 205. Accordingly, as translators 210 and 220 move along axis 206, the volumes of reaction section 297, gas spring 298, and gas spring 299 expand and contract. Further, for example, pressures within those volumes decrease or increase as the volume increases or decreases, respectively. Each of bearing housings 216, 217, 226, and 227 is configured to provide a gas bearing between itself and the corresponding translator (e.g., tube 212 and 222). For example, each of bearing housings 216, 217, 226, and 227 may be configured to direct pressurized gas to the gas bearing (e.g., via a flow system). In an illustrative example, each of bearing housings 216, 217, 226, and 227 may be configured to direct pressurized gas having an absolute pressure greater than ambient pressure (e.g., 1 atm at sea level) to the gas bearing such that bearing gas has sufficient pressure to flow through the gas bearing and into the environment (e.g., directly or via other ducting). In some embodiments, bearing gas may be pressurized relative to the environment (e.g., about 1 atm), a pressure in a breathing system (e.g., a boost pressure, or a gas pressure in an exhaust system that may be greater than or less than 1 atm), or any other suitable pressure reference. In some embodiments, generator assembly 200 is configured for oil-less operation, with bearing housings 216, 217, 226, and 227 forming gas bearings against translators 210 and 220. Each of translators 210 and 220 is configured achieve a position-velocity trajectory. The trajectory may include a top dead center (TDC) position, when the respective translator is nearest axial centerline 207 (i.e., more inboard), and a bottom dead center (BDC) position, where the respective translator is furthest from axial centerline 207 (i.e., more outboard).

Cylinder 202 includes bore 203, which houses reaction section 297. Cylinder 202 also includes illustrative intake breathing ports 219 and exhaust breathing ports 229, which couple bore 203 to the outside of cylinder 202. For example, intake breathing ports 229 couple bore 203 to an intake system, such as intake manifold 272 thereof. In a further example, exhaust breathing ports 219 couple bore 203 to an exhaust system, such as exhaust manifold 271 thereof. Intake manifold 272 may seal to cylinder 202, seal 225 (e.g., by extending axially to seal 225), bearing housing 226 (e.g., by extending axially to bearing housing 226, an intervening component, or a combination thereof. Exhaust manifold 271 may seal to cylinder 202, seal 215, bearing housing 216 (e.g., by extending axially to bearing housing 216, an intervening component, or a combination thereof. In some embodiments, as illustrated, seal 215 includes a contact seal, which may be comprised of a self-lubricating material (e.g., graphite), ceramic material, metal, plastic, or any other suitable material, or any combination thereof. Seal 215 is stationary with respect to the motion of translator 210 and can be housed within a ring compressor 281 (as illustrated), cylinder 202, a dedicated seal holder, or any other suitable component, or any combination thereof. In some embodiments, seal 215 includes a contact seal, non-contact seal, any other suitable seal, or any combination thereof. In some embodiments, as illustrated, a translator cooler 270 may be included to provide a flow of pressurized gas used to cool translator 210. In some embodiments, cooling gas for translator cooler 270 may be provided by a blower (e.g., of an intake system), reservoir of a gas spring system, a port of a gas spring system, an external gas supply, any other suitable gas supply, or any combination thereof. In some embodiments, translator cooler 270 may be configured to provide preferential cooling fluid flow. For example, translator cooler 270 may provide more cooling fluid flow to one or more surface areas of translator 210 and less cooling flow to the one or more other surface areas of translator 210, or vice versa. In some embodiments, translator cooler 270 may be configured to provide substantially uniform cooling. When intake breathing ports 229 are not covered by piston 221 (e.g., intake ports are open), fluid exchange between reaction section 297 and the intake system may occur. When exhaust breathing ports 219 are not covered by piston 211, fluid exchange between reaction section 297 and the exhaust system may occur. Fluid flow primarily occurs from the intake system through intake breathing ports 229 to bore 203, and from bore 203 through exhaust breathing ports 219 to the exhaust system. For example, averaged over time, fluid flows from the intake system to bore 203, and from bore 203 to the exhaust system. However, flow may also occur in the opposite directions such as, for example, from blowback or plugging pulses, during some time periods (e.g., intermittent or transient events). In some embodiments, the radially outer surface of cylinder 202 is cooled. For example, the radially-outer surface of cylinder 202 may be air-cooled (e.g., by a cooling system), liquid-cooled (e.g., by a cooling system), or both. In some embodiments, a thermal interface material may be arranged between the air cooling features (such as fins) and cylinder 202 to improve thermal conductivity. In some embodiments, cylinder 202 may include one or more ports arranged in between intake breathing ports 229 and exhaust breathing ports 219, which may be configured to house sensors (e.g., coupled to a control system), fuel injectors (e.g., coupled to an intake system or dedicated fuel system), or any other suitable components that may require access to bore 203. Along axis 206, intake breathing ports 229 and exhaust breathing ports 219 may be, but need not be, positioned symmetrically about a center of cylinder 202. Port location can be referenced to any suitable datum, however, one datum is the position of the front of the port (e.g., nearest axial centerline 207). The front of the ports defines the closed portion of the cycle (e.g., the start of compression, the end of expansion, the start of breathing, the end of breathing). For example, in some embodiments, exhaust breathing ports 219 may be relatively closer to axial centerline 207 than intake breathing ports 229. To illustrate, exhaust breathing ports 219 may open to reaction section 297 before intake breathing ports 229 during an expansion stroke, and exhaust breathing ports 219 may close to reaction section 297 after intake breathing ports 229 during a compression stroke. In some embodiments, breathing techniques other than uniflow scavenging may be used, such as, for example, loop scavenging or cross scavenging, and accordingly breathing ports may be positioned to be uncovered by only a single piston (e.g., with intake and exhaust breathing ports on the same side axially of the cylinder). In some embodiments, the centerline of piston positions may be changed during operation to change the relative timing of port openings and closings. For example, while the port locations may be spatially fixed on cylinder 202, the apex positions of pistons 211 and 221 (e.g., TDC position and BDC position) may be selected to move the TDC centerline (e.g., the midpoint between TDC positions of pistons 211 and 221 in either axial direction). In a further example, moving the TDC centerline may allow breathing behavior to be changed. The timing of port opening and closing, relative strength (e.g., amplitude in pressure wave), or both, of breathing behavior may be changed accordingly. Further, the compression ratio, expansion ratio, or both, may be changed by moving the TDC centerline or the BDC positions. To illustrate, the TDC centerline may, but need not, coincide axially with axial centerline 207. Breathing port locations and piston apex positions may be used to affect breathing behavior. In some embodiments, the BDC position of one or both pistons may be changed during operation to change the relative timing of port openings and closings. For example, one port may be maintained open longer to impact breathing. It will be understood that TDC and BDC refer to respective positions of pistons in contact with a reaction section (e.g., which correspond to BDC an TDC of pistons in contact with gas springs, respectively). For example, at or near TDC, a reaction section has a minimum volume and a gas spring has a maximum volume. In a further example at or near BDC, a reaction section has a maximum volume and a gas spring has a minimum volume. In some embodiments, cylinder assembly 254 includes cylinder 202, intake manifold 272, exhaust manifold 271, mounting hardware (e.g., mounts, flexures, or other hardware), and any other suitable components that may be mounted as a unit. Ring compressors 281 and 282 are coupled to the axial ends of cylinder 202 for the purposes of maintaining seals 262 and 263, respectively, within pistons 211 and 221, respectively, during replacement, installation, removal, or inspection. For example, during inspection or maintenance, translators 210 and 220 may be positioned axially so that ring compressors 281 and 282 are axially aligned with respective seals 262 and 263. Further, ring compressors 281 and 282 may be removed with respective pistons 211 and 221 during maintenance or inspection. Ring compressors 281 and 282 may have the same or similar inner diameter as bore 203 of cylinder 202. In some embodiments, ring compressors 281 and 282 may comprise of two or more sections (e.g., a clamshell design) configured to hold seals 262 and 263 in place during replacement, installation, removal, or inspection. In some embodiments, ring compressors 281 and 282 may comprise a single piece configured to hold seals 262 and 263 during replacement, installation, removal, or inspection. Ring compressors 281 and 282 may be attached to cylinder 202 through any suitable means, including but not limited to, v-band clamps, fasteners, bolts, springs, or any combination thereof.

In some embodiments, as illustrated, cylinders 204 and 205 are closed by respective heads 208 and 209, which may be bolted or otherwise fastened to cylinders 204 and 205 (e.g., to suitable flanges of cylinders 204 and 205). In some embodiments, cylinders 204 and 205 include a closed end (e.g., to seal gas springs 298 and 299, respectively), and no separate head need be included. In some embodiments, as illustrated, spacers 295 and 296 are arranged to provide axial space, and hence volume, to respective gas springs 298 and 299. Spacers 295 and 296 may be bolted, fastened, or otherwise secured to respective cylinders 204 and 205, respective heads 208 and 209, or both. In some embodiments, spacers 295 and 296 are configured to function as ring compressors (e.g., during disassembly, inspection or replacement of rings). In some embodiments, spacers 295 and 296 may comprise two or more sections (e.g. a clamshell design). Cylinders 204 and 205 include respective lower-pressure ports 230 and 240 for exchanging lower pressure gas (e.g., for exchanging lower pressure gas) and respective higher-pressure ports 231 and 241 for exchanging higher pressure gas (e.g., for exchanging higher pressure gas). In some embodiments, lower-pressure ports 230 and 240 are coupled to the environment, with the corresponding gas flow referred to herein as "atmospheric breathing." In some embodiments, lower-pressure ports 230 and 240 are coupled to a low-pressure reservoir or source (e.g., conditioned atmospheric air or other suitable gas reservoir or source above atmospheric pressure). For example, lower-pressure ports 230 and 240 may be coupled to respective reservoirs 273 and 274, as illustrated. Reservoirs 273 and 274 may be configured to seal back sections of pistons 214 and 224, respectively. As illustrated, reservoirs 273 and 274 are sealed against bearing housings 217 and 227, respectively, and also cylinders 204 and 205, respectively. Reservoirs 273 and 274 may be sealed against any suitable component of a linear generator including, for example, a frame, a stator, a gas spring head, any other suitable component, or any combination thereof. The volume of reservoirs 273 and 274 may be sized to minimize or otherwise limit pressure fluctuations in gas in the respective back sections. In some embodiments, a filter may be installed at, or upstream of, lower-pressure ports 230 and 240 to prevent the intake of particles (e.g., dust or debris), certain molecules (e.g., water in some instances), or other undesirable constituents of the gas source. In some embodiments, cylinders 204 and 205 need not include lower-pressure ports 230 and 240, higher-pressure ports 231 and 241, or any ports at all. For example, in some embodiments, no high-pressure ports are included, and low-pressure ports 230 and 240 are included to provide make-up gas to make up for blow-by past respective pistons 214 and 224 (e.g., and may be included at any suitable location in the corresponding cylinder or cylinder head if applicable). In some embodiments, driver sections 250 and 258 may include features for removing energy from the generator system to protect against damage or failures (e.g., overpressure of gas spring 298 or 299, loss of sealing of gas spring 298 or 299). Further details of such features are described in the context of FIG. 12. For example, either or both of cylinders 204 and 205 may include grooves (e.g., "scallops") configured to allow higher-pressure gas to leak around the seals (e.g., rings) if pistons 214 and 224 over-travel, thus causing the gas spring to lose pressure and energy. In a further example, a pressure relief valve may be included and coupled to the gas spring to cause the gas spring to release energy (e.g., gas) if the pressure exceeds a design threshold.

Stator 218, magnet assembly 213, tube 212, and bearing housings 216 and 217 form linear electromagnetic machine (LEM) 256. Similarly, stator 228, magnet assembly 223, tube 222, and bearing housings 226 and 228 form LEM 252. Further, a LEM may optionally include one or more pistons. For example, a LEM may be defined to include stator 218, translator 210, and bearing housings 216 and 217. In a further example, a LEM may be defined to include stator 228, translator 220, and bearing housings 226 and 227. A LEM includes a stationary assembly (e.g., a stator and bearing housings) and a translating assembly (e.g., a translator) that is constrained to move along an axis, wherein the stator is capable of applying an electromagnetic force on the translator to cause and/or effect motion along the axis. The bearing housings of a LEM may be, but need not be, affixed to the stator. For example, the bearings housings may be coupled to the stator, a structural frame, a cylinder, either directly or by an intervening components, or any combination thereof. Stators 218 and 228 may include a plurality of phase windings, which form a plurality of phases. The current in each of the phases may be controlled in time by a control system (e.g., which may include corresponding power electronics and processing equipment) to affect the position of translators 210 and 220, motion of translators 210 and 220, work interactions with translators 210 and 220, or any combination thereof. In some embodiments, magnet assemblies 213 and 223 include permanent magnets arranged in an array (e.g., of alternating North and South poles). Because translators 210 and 220 move as substantially rigid assemblies, electromagnetic forces applied to respective magnet assemblies 213 and 223 accelerate and decelerate translators 210 and 220. In some embodiments, stators 218 and 228 may be air-cooled (e.g., by an air cooling system), liquid-cooled (e.g., by a liquid cooling system), or both. In some embodiments, stators 218 and 228 are arranged around respective translators 210 and 220, or respective magnet assemblies 213 and 223 thereof (e.g., the motor air gap is arcuate with a thickness profile). For example, stators 218 and 228 may extend fully around (e.g., 360 degrees azimuthally around) or partially around (e.g., having azimuthally arranged segments and azimuthally arranged gaps between windings of a phase) respective translators 210 and 220. In some embodiments, stators 218 and 228 are arranged axially along respective translators 210 and 220, or respective magnet assemblies 213 and 223 thereof. For example, magnet assemblies 213 and 223 may include flat magnet sections and stators 218 and 228 may include flat surfaces that correspond to the magnet sections (e.g., the motor air gap is planar with a thickness profile). In some embodiments, stators 218 and 228 extend axially along respective translators 210 and 220, or respective magnet assemblies 213 and 223 thereof.

In some embodiments, generator assembly 200 includes one or more features for protecting components of generator assembly 200 from damage due to mechanical failures, control failures, component failures, operation at extreme conditions, or a combination thereof. Bumpstops 290 and 291, as illustrated, are arranged to convert kinetic energy from respective translators 210 and 220 into deformation, by contacting respective pistons 214 and 224 in the event of an overtravel of the translators. For example, one or both of stators 218 and 228 may include one or more features for protecting generator assembly 200. In some embodiments, one or both of stators 218 and 228 include one or more features (e.g., a bumpstop, mechanical springs, pneumatic pistons) configured to convert translator kinetic energy into sound, heat, solid deformation, or a combination thereof, thus slowing, stopping, or redirecting the translator's motion. For example, a bumpstop may be configured to undergo a plastic deformation (e.g., be bent, compacted, crumpled, punched or otherwise deformed) upon contact with a translator to convert kinetic energy of the translator. In some embodiments, one or more bumpstops may be arranged at either or both of driver sections 250 and 258. In some embodiments, bumpstops are included as part of other components of generator assembly 200 such as, for example, driver sections 250 and 258. In some embodiments, bumpstops are located at each end of cylinder 202 near BDC. A bumpstop may be affixed directly or with intervening components to a structural frame at any suitable location, affixed directly or with intervening components to a cylinder at any suitable location (e.g., cylinder 203, 204, 205, or a combination thereof), affixed directly or with intervening components to a stator, or a combination thereof. In some embodiments, generator assembly 200 may include features or components for affixing to a structure frame (e.g., as in FIGS. 53-57). For example, cylinder assembly 254, driver sections 250 and 258, and LEMs 252 and 256 may include one or more features or components for affixing to a structural frame, one or more features or components for aligning to a structural frame, one or more components or features for aligning off of a structural frame to another component (e.g., LEM 252 to LEM 256, cylinder assembly 254 to a LEM), or any combination thereof. In some embodiments, features or components used to affix a portion of generator assembly 200 to a structural frame may provide compliance in a direction (e.g., axially, laterally, or radially) and stiffness in a different direction (e.g., axially stiff while radially compliant) to allow for changes during operation.

Figure 3:
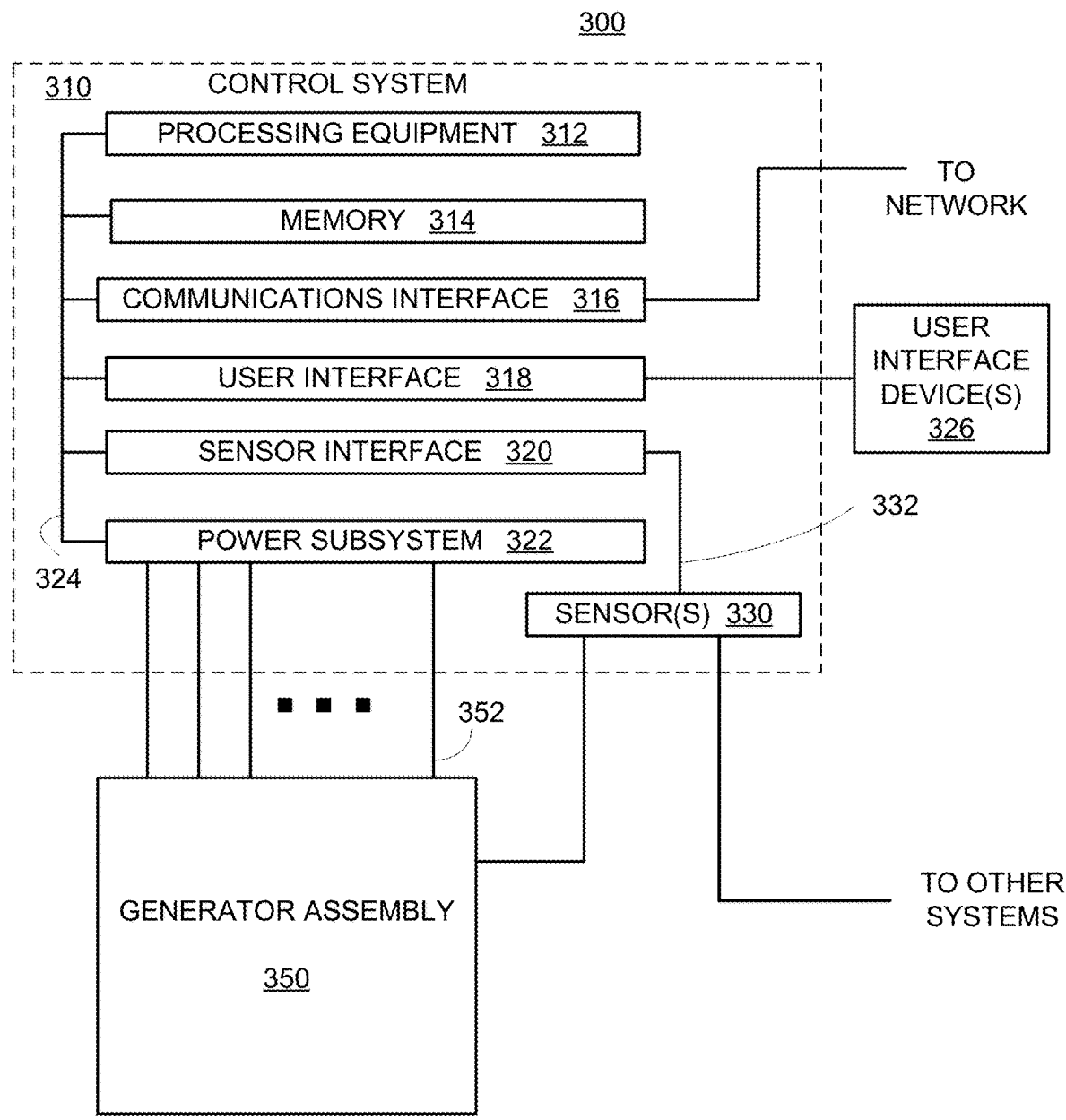
FIG. 3 is a block diagram of an illustrative linear generator, including a control system for controlling operation of a generator assembly, in accordance with some embodiments of the present disclosure.

FIG. 3 is a block diagram of illustrative linear generator 300, including control system 310 for controlling operation of generator assembly 350, in accordance with some embodiments of the present disclosure. Generator assembly 350 may include one or more stators, each including multiple windings corresponding to multiple phases (e.g., each phase includes one or more windings). For example, a stator may include three or more phases, which may electromagnetically interact with a translator to apply force to the translator. For example, a phase may apply a force on the translator in the same direction of motion (e.g., motoring) or in the opposite direction of motion (e.g., braking or generating), or a combination thereof (alternately) over the course of a stroke or cycle. The current flow (e.g., direction and magnitude) in each winding, and hence each phase (e.g., even if more than one winding is included in a phase), may be controlled by control system 310 and supplied/received using power subsystem 322.

Control system 310 may include processing equipment 312, memory 314, one or more communications interfaces 316, one or more user interfaces 318, sensor interface 320, power subsystem 322, any other suitable components or modules that are not shown, or any combination thereof. Control system 310 may be implemented at least partially in one or more computers, embedded systems, terminals, control stations, handheld devices, modules, any other suitable interface devices, or any combination thereof. In some embodiments, the components of control system 310 may be communicatively coupled via one or more communications buses 324, as shown in FIG. 3.

In some embodiments, control system 310 is configured to control trajectories of translators, control a power output, control energy storage, control operating conditions, respond to electrical loads, manage the provision of intake gas to a cylinder, manage the removal of exhaust gas from the cylinder, ensure safe operation (e.g., perform diagnostics and detect faults), any other suitable function, or any suitable combination thereof (e.g., all of the aforementioned).

In some embodiments, control system 310 receives information from one or more sensors 330, user inputs (e.g., at user interface 318), reference databases (e.g., look-up tables stored in memory 314), any other sources, or any combination thereof, and determine corresponding control responses. For example, control system 310 may receive position information from sensors 330 relating to a translator and stator of generator assembly 350, along with desired force information, and determine current values for one or more phases of the electromagnetic machine. In some embodiments, control system 310 controls the current in each phase of a stator. In some embodiments, control system 310 controls the current in each phase based on position information (e.g., axial position, axial velocity, axial acceleration), magnetic flux information, motor constant information (e.g., force constant, back emf), any other suitable information, or any combination thereof. Control system 310 may control the magnitude of current in each phase, direction of current flow in each phase, or both. Control system 310 may control the commutation of currents in a plurality of phases.

Processing equipment 312 may include a processor (e.g., a central processing unit), cache, random access memory (RAM), read only memory (ROM), any other suitable components, or any combination thereof that may process information regarding multiphase electromagnetic machine 350. Memory 314 may include any suitable volatile or non-volatile memory that may include, for example, random access memory (RAM), read only memory (ROM), flash memory, a hard disk, any other suitable memory, or any combination thereof. Information stored in memory 314 may be accessible by processing equipment 312 via communications bus 324. For example, computer readable program instructions (e.g., for implementing the techniques disclosed herein) stored in memory 314 may be accessed and executed by processing equipment 312. In some embodiments, memory 314 includes a non-transitory computer readable medium for storing computer executable instructions that cause processing equipment 312 (e.g., processing equipment of a suitable computing system), to carry out a method for controlling a generator assembly, intake system, exhaust system, cooling system, bearing system, gas spring system, any other suitable systems, or any combination thereof. For example, memory 314 may include computer executable instructions for implementing any of the control techniques described herein.

In some embodiments, communications interface 316 includes a wired connection (e.g., using IEEE 802.3 ethernet, or universal serial bus interface protocols), wireless coupling (e.g., using IEEE 802.11 "Wi-Fi," Bluetooth, or via cellular network), optical coupling, inductive coupling, any other suitable coupling, or any combination thereof, for communicating with one or more systems external to control system 310. For example, communications interface 316 may include a USB port configured to accept a flash memory drive. In a further example, communications interface 316 may include an Ethernet port configured to allow communication with one or more devices, networks, or both. In a further example, communications interface 316 may include a transceiver configured to communicate using any suitable standards over a cellular network.

In some embodiments, user interface 318 includes a wired connection (e.g., using IEEE 802.3 ethernet, or universal serial bus interface, tip-ring-seal RCA type connection), wireless coupling (e.g., using IEEE 802.11 "Wi-Fi," Infrared, Bluetooth, or via cellular network), optical coupling, inductive coupling, any other suitable coupling, or any combination thereof, for communicating with one or more of user interface devices 326. User interface device(s) 326 may include a display, keyboard, mouse, audio device, any other suitable user interface devices, or any combination thereof. For example, a display may include a display screen such as, for example, a cathode ray tube screen, a liquid crystal display screen, a light emitting diode display screen, a plasma display screen, any other suitable display screen that may provide graphics, text, images or other visuals to a user, or any combination of screens thereof. Further, a display may include a touchscreen, which may provide tactile interaction with a user by, for example, offering one or more soft commands on a display screen. In a further example, user interface device(s) 326 may include a keyboard such as a QWERTY keyboard, a numeric keypad, any other suitable collection of hard command buttons, or any combination thereof. In a further example, user interface device(s) 326 may include a mouse or any other suitable pointing device that may control a cursor or icon on a graphical user interface displayed on a display screen. In a further example, user interface devices 326 may include an audio device such as a microphone, a speaker, headphones, any other suitable device for providing and/or receiving audio signals, or any combination thereof. In some embodiments, user interface 318, user interface device(s) 326, or both, need not be included (e.g., control system 310 need not receive user input nor provide output to a user). In some embodiments, user interface device(s) 326 includes a computing device with which a user may interact. For example, user interface device(s) 326 may include a computer having touchscreen, and a software application (e.g., a web portal hosted by an applications server or other host system) may generate a display and process user input. In a further example, user interface device(s) 326 may be coupled to communications interface 316 (e.g., using a web-based application implemented over a network connection).

In some embodiments, sensor interface 320 includes a power supply (e.g., for supplying power to sensor(s) 330), a signal conditioner, a signal pre-processor, any other suitable components, or any combination thereof. For example, sensor interface 320 may include one or more filters (e.g., analog and/or digital), an amplifier, a sampler, and an analog to digital converter for conditioning and pre-processing signals from sensor(s) 330. In some embodiments, sensor interface 320 communicates with sensor(s) 330 via communicative coupling 332, which may be a wired connection (e.g., using IEEE 802.3 ethernet, or universal serial bus interface), wireless coupling (e.g., using IEEE 802.11 "Wi-Fi," or Bluetooth), optical coupling, inductive coupling, any other suitable coupling, or any combination thereof.

Sensor(s) 330 may include any suitable type of sensor, which may be configured to sense any suitable property or aspect of generator assembly 350, any other system, or any combination thereof. In some embodiments, sensor(s) 330 includes a linear encoder, rotary encoder, or both, configured to sense a relative position between a translator and stator of generator assembly 350. In some embodiments, sensor(s) 330 includes an accelerometer configured to sense an acceleration of a translator relative to a fixed stator, a vibration of a nominally static component, or any other suitable acceleration. In some embodiments, sensor(s) 330 includes a camera configured to capture images (e.g., time-lapse imaging) of a translator relative to a stator of generator assembly 350. In some embodiments, sensor(s) 330 includes one or more current sensors (e.g., coupled to a phase of a stator of generator assembly 350), one or more voltage sensors (e.g., coupled to a phase of a stator of generator assembly 350), or both, configured to sense a voltage, current, work output and/or input (e.g., current multiplied by voltage), any other suitable electrical property of a linear generator, or any combination thereof. In some embodiments, sensor(s) 330 includes one or more temperature sensors such as, for example, a thermocouple, a thermistor, a resistance temperature detector (RTD), any other suitable sensor for detecting temperature, or any combination thereof. For example, sensor(s) 330 may include a thermocouple arranged to measure a temperature of a permanent magnet, a winding, a power subsystem component such as a transistor, a cylinder, a bearing housing, a gas (e.g., an intake gas or an exhaust gas), or any other component or fluid of a linear generator. In some embodiments, control system 310 is configured to control axial positions of translators of generator assembly 350 during non-operating events (e.g., when not generating power). For example, in some embodiments, control system 310 is configured to move the translators axially outward and engage a locking mechanism (not shown in the figure) to lock the translators in place axially during maintenance, inspection, or removal, installing, or replacement of components in the generator assembly 350.

In some embodiments, sensor(s) 330 may be included in control system 310. In some embodiments, sensor(s) 330 may be integrated, partially or wholly, into generator assembly 350 (e.g., an encoder tape affixed to a translator). In some embodiments, sensor(s) 330, sensor interface 320, or both, may be removable from, external to, optionally omitted from, optionally installed with, or otherwise not included in, control system 310. For example, sensor(s) 330 may include piezoelectric pressure sensors having control circuitry separate from control system 310. Further to this example, the control circuitry may be optionally integrated into control system 310.

In some embodiments, power subsystem 322 includes control circuitry, power electronics, electric loads (e.g., for dissipation of electrical energy to heat via a resistive load bank), grounds (e.g., chassis or earth ground), terminal strips, electric power storage equipment (e.g., batteries, capacitors), electric bus lines for transferring power, insulated gate bipolar transistors (IGBTs), mechanical relays, solid state relays, power diodes, thyristors, metal oxide semiconductor field-effect transistors (MOSFETs), any other suitable transistors, switches, contactors, fuses, pulse width modulation controllers, digital to analog controllers, any other suitable electronic components, any other suitable controllers, or any combination thereof. Power subsystem 322 may receive control signals via communications bus 324 from processing equipment 312 regarding generator assembly 350. For example, power subsystem 322 may include multiple IGBTs coupled via power coupling 352 to corresponding phase leads of the multiple phases of a stator. To illustrate, the IGBTs may be coupled to high and low bus voltage lines, as well as the windings of the phases, which may be coupled to a wye neutral point. In some embodiments, power coupling 352 includes one or more cables, lead, connectors, or a combination thereof. For example, each phase of a stator may be coupled via a respective cable to corresponding terminals of power subsystem 322. In some embodiments, power subsystem 322 includes a virtual phase, which may accommodate current flow, but does not correspond to any phase of a stator of generator assembly 350. In some embodiments, power subsystem 322 includes a grid tie inverter (GTI), configured to manage electric power interactions between linear generator 300 and an electric power grid. For example, in some embodiments, power subsystem 322 may include a DC bus, having a DC voltage managed by a GTI. In some embodiments, power subsystem 322 includes batteries, capacitors, or both, for storing electrical energy from the linear generator system, an external source (e.g., the electric grid), or both, and for discharging the stored electrical energy to support the operation of the linear generator system (e.g., for start-up, for output load). In an illustrative example, power subsystem 322 may include, or be similar to, electrical system 105 of FIG. 1. Accordingly, referencing FIG. 1, control system 104 and electrical system 105 may be combined.

Although not shown in FIG. 3, control system 310 may include one or more system interfaces for controlling, monitoring, receiving information from, or a combination thereof, any suitable system. For example, a control system may include a motor controller for controlling a boost blower motor. In a further example, a control system may include a motor controller for controlling a fan of the cooling system.

In an illustrative example, control system 310 may be configured to control a force interaction between a translator and a stator. The force may be applied to the translator by controlling currents (e.g., magnitude and direction) in one or more phases that interact electromagnetically with the translator. In some embodiments, a desired force is determined based on position information, velocity information, acceleration information or a combination thereof, and control system 310 applies current to one or more phase to achieve the desired force on the translator (e.g., the achieved force may be, but need not be equal to the desired force). An encoder may be used to determine a position of the translator relative to the stator, a velocity of the translator (e.g., by calculating a suitable time derivative or second time derivative using any suitable analytical or numerical differentiation technique), an acceleration of the translator (e.g., by calculating a time derivative using any suitable analytical or numerical differentiation technique), any other suitable information, or any combination thereof.

In a further illustrative example, control system 310 may be configured to control the storage, accumulation, and conversion of energy in a gas spring during operation of the linear generator system (e.g., during a cycle of the generator assembly). In some embodiments, the operation of a gas spring may be adjustable (e.g., the amount of energy stored, the maximum pressure, or the minimum pressure may be adjustable). In some embodiments, a low-pressure port, a high-pressure port, or both, may be utilized to control characteristics of the gas spring. For example, the low-pressure port, the high-pressure port, or both, may be used to control the amount, temperature, pressure, any other suitable characteristics, and/or any combination thereof of the gas in the gas spring. In some embodiments, adjusting any of the aforementioned characteristics, and thus adjusting the amount of mass in the gas spring, may vary the effective spring constant of the gas spring. The effective spring constant may depend on, for example, gas temperature, gas pressure, gas composition, a quantity derived thereof (e.g., density), or a combination thereof. For example, to effect a change in stored energy, one may change the effective spring constant, the displacement, or both. Two illustrative approaches include: (1) for a fixed effective spring constant (e.g., which may still include a known position dependence), displacement may be used to control the amount of energy stored in the gas spring, and (2) for a fixed displacement (e.g., fixed TDC and BDC positions), the effective spring constant may be used to control the amount of energy stored in the gas spring. To illustrate, in some embodiments, control system 310 is configured to control axial displacement of the translator to control the storage of energy in a gas spring. For example, control system 310 may control the BDC position (i.e., the outboard apex position which is the TDC of the gas spring) of a translator during a stroke to store a desired amount of energy in the corresponding gas spring (e.g., at least a sufficient amount of energy to perform a subsequent stroke without requiring net electrical input during the subsequent stroke). Further, in some circumstances, a more outboard BDC position may correspond to a relatively larger energy being stored in the gas spring (e.g., such that it is possible to produce net electrical output from generator assembly 350 to power subsystem 322 during a subsequent stroke while providing enough energy to perform the subsequent stroke). Further, control system 310 may determine, or estimate, the required energy to perform a subsequent stroke, and may control the storage of energy in the gas spring to store at least the required energy during an expansion stroke (i.e., during expansion of a reaction section and simultaneous compression of the gas spring). In some embodiments, one or more parameters associated with an auxiliary system is adjusted to effect flow in to, or out of, a gas spring. For example, gas spring supply tank pressure, a regulator pressure, or other parameter may be adjusted to effect a flow of gas to a low-pressure port (e.g., flow into a gas spring) or a high-pressure port (e.g., flow out of a gas spring) of a gas spring system.

In some embodiments, the geometry of a gas spring may be adjusted to obtain desirable operation. For example, the volume of the gas spring may be increased or decreased by controlling the gas exchange with the gas spring via the low-pressure port, the high-pressure port, or both, and the characteristics of the gas flowing therein. In some embodiments, the dead volume within the cylinder may be adjusted to vary the spring constant of the gas spring (e.g., another form of affecting change in position or volume of the gas spring). It will be understood that any of the aforementioned control and adjustment of the gas spring therein may provide for control of the amount of energy stored by the gas spring during an expansion stroke of the generator assembly. It will also be understood that the aforementioned control of the characteristics of the gas spring may also provide for variability in the frequency of cycles of the generator assembly.

In some embodiments, an exhaust system may be tuned along with an intake system to affect the breathing process. In some embodiments, one or more intake runners and one or more exhaust tuned pipes may be configured to provide a breathing process having particular breathing characteristics. For example, one or more intake runners and one or more exhaust tuned pipes may include predetermined lengths, diameters, or both, to generate desired breathing characteristics. In an illustrative example, a desired breathing characteristic may include an instant pressure profile in the intake manifold and an instant pressure profile in the exhaust manifold that cause intake gas to be drawn into the bore (e.g., a high intake manifold pressure occurring when an exhaust suction wave occurs). In a further illustrative example, a desired breathing characteristic may include a plugging pulse from the exhaust system that limits, reduces, or prevents substantial blow-through of unreacted fuel in the exhaust (e.g., prevents greater than one, ten, one hundred, or one thousand parts per million increase in fuel in the exhaust gas). Desired breathing characteristics may allow lower boost pressures (e.g., as generated by boost blower 704 of FIG. 7), lower blower power requirement, lower emissions, higher indicated power, higher indicated efficiency, lower fuel consumptions, or a combination thereof.

In some embodiments, the exhaust system, the intake system, and the generator assembly may be configured to exhibit desired breathing characteristics. For example, the axial arrangement and design of intake and exhaust breathing ports (e.g., positions of the breathing ports along the axis of the cylinder), the design of the intake system (e.g., size and shape of the intake manifold or the type of fuel injection strategy), the design of the exhaust systems (e.g., size and shape of the exhaust manifold or the length of the tuned pipe), intake boost pressure, along with other suitable system properties and operational modes, may affect breathing characteristics. In some embodiments, desired breathing and exhaust characteristics may be achieved by configuring various geometric properties such as intake breathing ports' open and close positions, intake runner length and cross section, exhaust breathing ports' open and close positions, tuned pipe length and cross-section, exhaust runner length and cross-section, manifold volumes and lengths scales, or any combination thereof. It will be understood that a port's opening or closing is referred to in the context of its coupling to a compression/expansion volume (e.g., in front of a seal, such as the forward portion of a piston). For example, a port may be closed by a piston, but still open to a volume behind the piston seal, near a translator tube (e.g., a reaction back section). In a further example, ports being open or closed refers to the pathway for gas exchange between the respective manifolds/plenums and the volume of the cylinder bore between the intake and exhaust ports. To illustrate, the compression/reaction section volume "V" may be given by:

$$V = A_{Cyl}(x_{ip} + x_{ep})$$

where "Acyl" is the nominal cross sectional area of the bore, "$x_{ip}$" is the axial position of the intake piston face, "$x_{ep}$" is the axial position of the exhaust piston, with axial positions measured from a centerline of the cylinder (e.g., axial centerline 207 of FIG. 2). The volume behind a piston may also undergo compression and expansion in some circumstances. Breathing characteristics such as the amplitudes of a blow-down pulse, plugging pulse, and a suction wave, and the timing thereof during the breathing process, may be affected by geometric properties of the system. Further, operational properties may be configured to cause desired breathing characteristics and may include intake gas pressure generated by a boost blower, in-bore gas pressure when exhaust breathing ports are uncovered, equivalence ratio, top dead center (TDC) position of piston faces when the reaction cylinder volume is at a minimum during an operating cycle (e.g., near the center), bottom dead center (BDC) position of piston faces when the reaction cylinder volume is at a maximum during an operating cycle (e.g., away from the center of the cylinder), fuel pressure, and frequency (e.g., inverse of cycle time) of the translator reciprocation. For example, TDC and BDC positions may affect the timing and duration of the breathing process. In a further example, the equivalence ratio may affect the amplitude of the blow-down pulse and the wave characteristics in the tuned pipe. In some embodiments, the TDC position of a piston face may be adjusted relative to a centerline to affect breathing, the BDC position may be adjusted relative to the ports to affect breathing, or both. For example, for an opposed piston configuration, the TDC and BDC positions of each translator may be adjusted to affect breathing or other engine performance.

Figure 4:
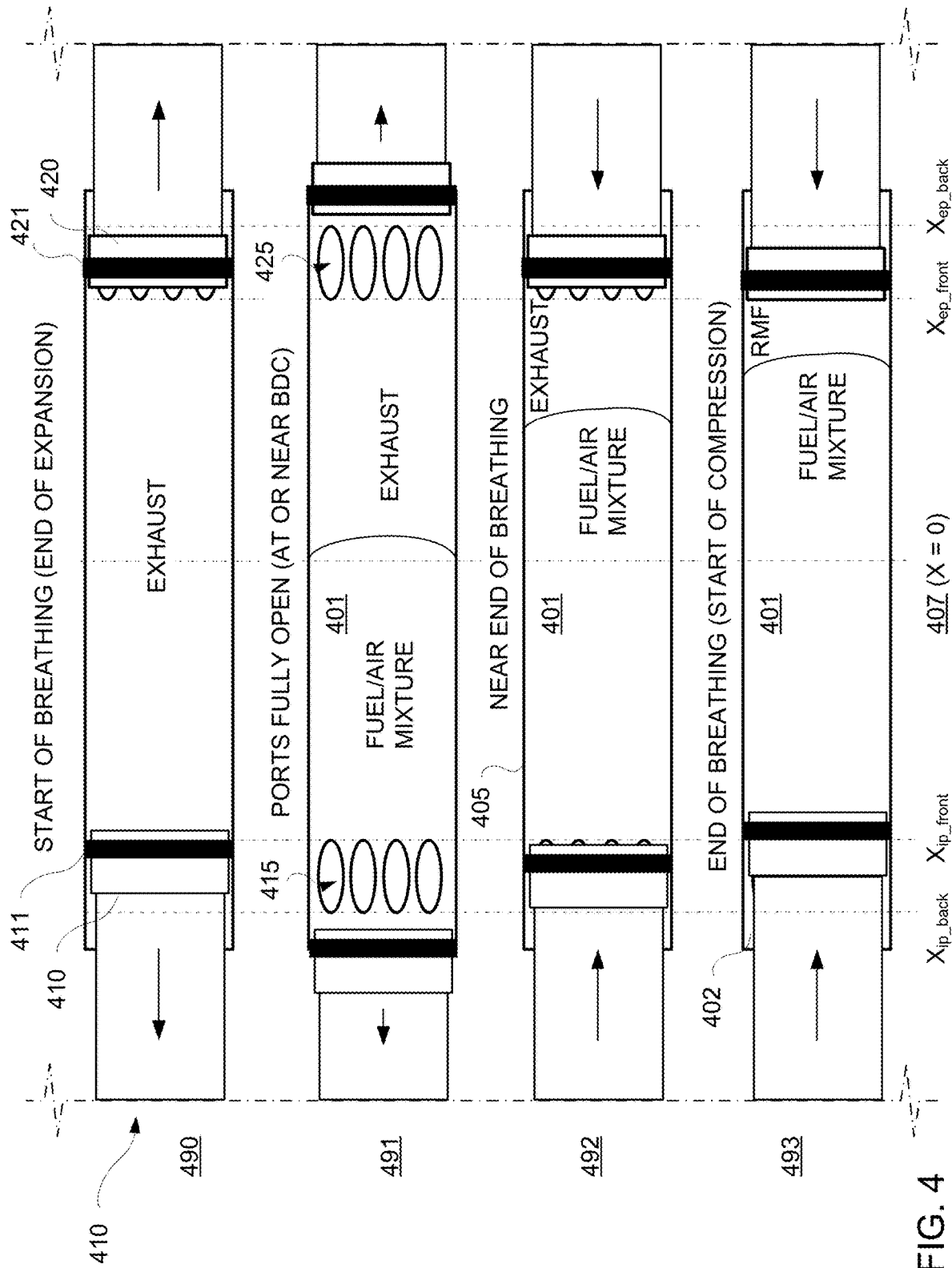
FIG. 4 shows a portion of an illustrative generator assembly, with reaction section pistons at various respective axial positions, in accordance with some embodiments of the present disclosure.

FIG. 4 shows a portion of an illustrative generator assembly 400, with reaction section pistons 410 and 420 at various respective axial positions, in accordance with some embodiments of the present disclosure. Intake piston 410 and exhaust piston 420 move within a bore of cylinder 405, along axis 406. The axial positions of reaction section pistons 410 and 420 may be referenced to any suitable datum including, for example, axial centerline 407. Intake ports 415 and exhaust ports 425 are arranged axially at respective positions of cylinder 405. The axial positions of intake ports 415 and exhaust ports 425 may be, but need not be, equidistant from axial centerline 407. For example, as illustrated, exhaust ports 425 are nearer axial centerline 407 than intake ports 415.

Panel 490 shows an illustrative start of breathing, with intake piston 410, having seal 411, axially positioned inboard of intake ports 415 (e.g., intake ports 415 are just opened to volume 401 of cylinder 405). Panel 491 shows exhaust piston 420, having seal 421, axially positioned just within the axial extent of exhaust ports 425 (e.g., exhaust ports 425 are partially opened to volume 401 of cylinder 405).

Panel 491 shows intake piston 410, having seal 411, axially positioned outboard of intake ports 415 (e.g., intake ports 415 are opened to volume 402 of cylinder 405). Panel 491 shows exhaust piston 420, having seal 421, axially positioned outboard of exhaust ports 425 (e.g., exhaust ports 425 are opened to volume 401 of cylinder 405).

Panel 492 shows intake piston 410, having seal 411, axially positioned at the open/close threshold of intake ports 415 (e.g., intake ports 415 are closed to volume 401 of cylinder 405), near the end of breathing. Panel 492 shows exhaust piston 420, having seal 421, axially positioned toward the middle of exhaust ports 425, since exhaust ports 425 are axially further inboard than intake ports 415.

Panel 493 shows intake piston 410, having seal 411, axially positioned inboard of intake ports 415 (e.g., intake ports 415 are closed to volume 401 of cylinder 405), at the end of breathing and start of compression. Panel 493 shows exhaust piston 420, having seal 421, axially positioned inboard of exhaust ports 425. Panel 493 shows both intake ports 415 and exhaust ports 425 closed to volume 401.

Figure 5:
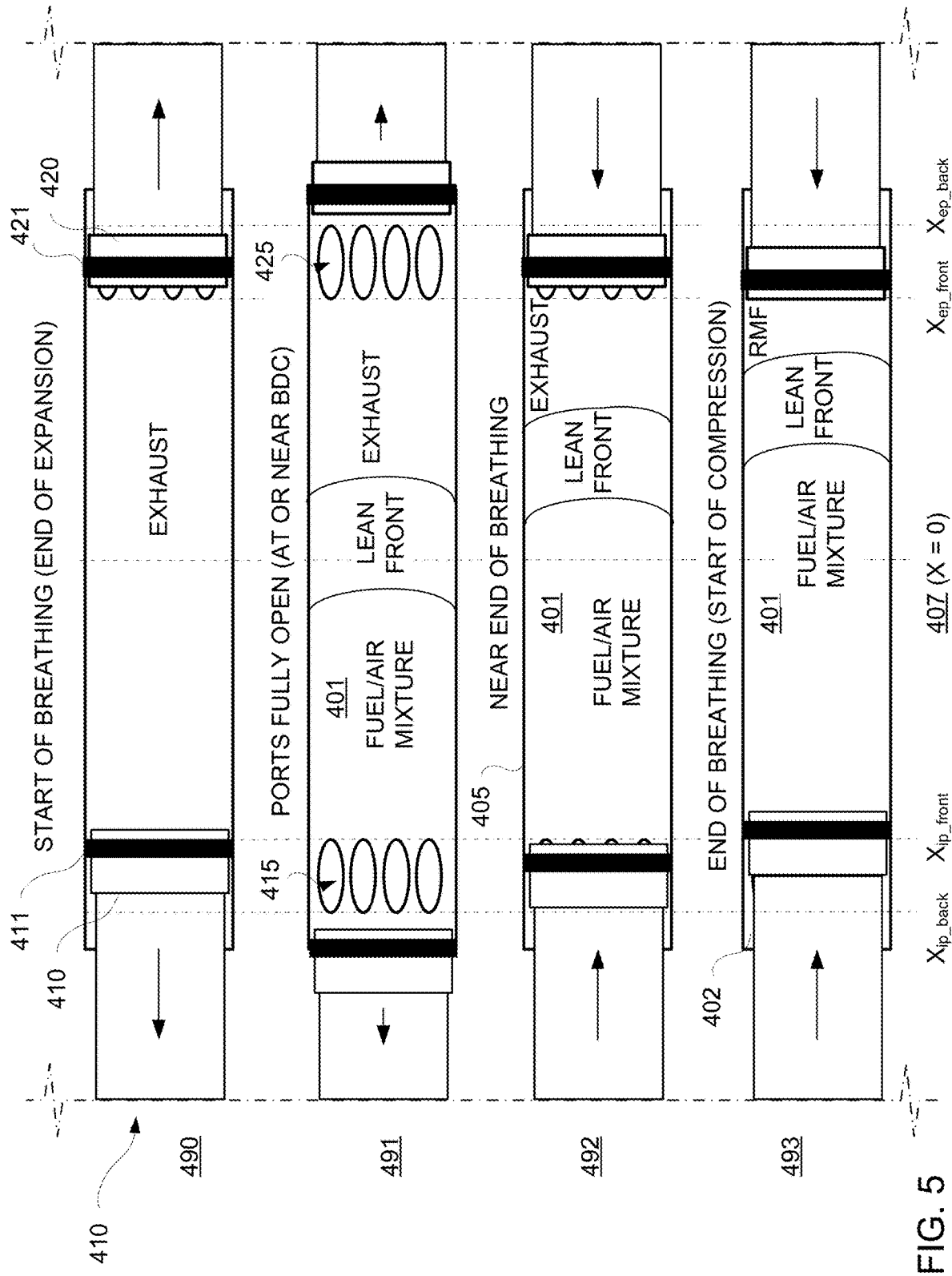
FIG. 5 shows a portion of an illustrative generator assembly, with lean-fronting, in accordance with some embodiments of the present disclosure.

FIG. 5 shows a portion of illustrative generator assembly 500, with lean-fronting, in accordance with some embodiments of the present disclosure. Lean-fronting is the process of causing a relatively leaner intake gas to "lead" a relatively richer intake gas during the breathing process such that blow through is reduced, residual mass fraction (RMF) is lowered, or both. For example, during a breathing process, it may be desired to have portions of the slug of intake gas entering the cylinder have relatively leaner portions at the beginning and the end. The relatively leaner portions reduce the tendency for fuel to blow through into the exhaust system near the end of the breathing process. For example, this non-uniform intake gas concentration profile may allow for a lower amount of residual exhaust gas being trapped while limiting or eliminating fuel flow through. In some embodiments, control of the piston position in time may allow control of breathing behavior. For example, synchronization of opposed piston positions may allow for the timing of port openings and closings to generate desired breathing behavior (e.g., a blow-down pulse, a section pulse, a plugging pulse, or other behavior). In a further example, lean-fronting may allow greater boost pressures, and reduced RMF (e.g., thus increasing power density, compression ratio, other operating performance or a combination thereof) Panel 590 shows reaction section piston 510 with seal 511 (e.g., an intake piston) and reaction section piston 520 with seal 521 (e.g., an exhaust piston) towards the end of a breathing process. Intake gas includes a fuel and air mixture, as illustrated, which enters volume 501 of cylinder 505 from intake ports 515. The intake gas displaces exhaust formed during reaction of gas in the previous cycle. The displaced exhaust gas exits volume 501 through exhaust ports 525. At the end of the breathing process, some exhaust gas remains in volume 501. This remnant gas is referred to as residual gas, which may be characterized by the RMF when considered with the trapped intake gas at the end of the breathing process. In some embodiments, reduction of RMF is desired. Panel 591 illustrates the end of breathing (e.g., and start of compression) with lean fronting applied to generator assembly 500. Residual gas, a lean front, and trailing intake gas are trapped in volume 501. Together the lean front and trailing intake gas are the "intake gas." Lean-fronting allows axial stratification of the gases of volume 501 to prevent fuel of the trailing intake gas from exiting exhaust ports 525 during breathing. In an illustrative example, the configurations illustrated in FIGS. 16-17 may be used to achieve lean fronting.

In some embodiments, an injector may be configured to inject gaseous fuel, liquid fuel, or both. For example, an injector may be configured to inject natural gas, methane, propane, biogas, hydrogen, or other suitable gaseous fuel into the intake system. In some embodiments, for example, an injector may include a carburetor-type injector, configured to inject fuel at a relatively low supply pressure. An Injector may inject fuel at a constant rate, at a variable rate, at a rate dependent on a local intake gas pressure, at a frequency (e.g., pulsed), at any other suitable time schedule, or any combination thereof. For example, an injector may exhibit pulsed operation, continuous operation, pulsed operation timed with piston position, any other suitable operation mode, or any combination thereof. An injector may cause or experience any suitable flow properties (e.g., average or local flow velocity, pressure drop, or other property), and may be controlled using any suitable control technique based on any suitable flow property. For example, an injector may be driven by pulse-width modulation (PWM), pulse density modulation (PDM), DC pulses (e.g., from an injector drive), any other suitable actuation technique, or any combination thereof. In a further example, the drive signal to the injector may be controlled based on fuel flow rate, fuel pressure, boost pressure, in-runner pressure, in-cylinder pressure, a pressure-drop (e.g., across the injector or other suitable component), exhaust composition, load requirements (e.g., linear generator electrical output), reaction timing (e.g., to advance, maintain, or retard timing), translator position (e.g., as related to port openings and closings), breathing characteristics (e.g., timing and amplitude of pressure waves during breathing), any other suitable operating parameters, or any combination thereof.

The description above is merely illustrative, and it will be understood that any suitable geometric property, operational property, or other system property may be configured to affect a breathing characteristic.

FIG. 6 shows two cross-sectional views of illustrative translators having reservoirs, in accordance with some embodiments of the present disclosure. For example, panels 600 and 650 show illustrative enlarged sections behind seal 262 and seal 263 of FIG. 2. In a further example, pistons 211 and 221 of FIG. 2 may include collars, diffusers, reservoirs, restrictions, or a combination thereof as described in the context of FIG. 6.

Panel 600 shows a translator that includes tube 622, piston 620, seal 621 (e.g., a piston ring), and collar 610, all substantially rigidly coupled to move as a substantially rigid body along an axis of cylinder 602. Cylinder 602 includes bore 603 configured to house reaction section 697. As illustrated, piston 620 is affixed to collar 610 using fasteners 613, and collar 610 is affixed to tube 622 using fasteners 614. Panel 650 shows a translator that includes tube 672, piston 670, seal 671 (e.g., a piston ring), and collar 660, all substantially rigidly coupled to move as a substantially rigid body along an axis of cylinder 652. As illustrated, piston 670 is affixed to collar 660 using fasteners 663, and collar 660 is affixed to tube 672 using fasteners 664.

As illustrated in panel 600, collar 610 forms reservoir 606 with bore 603, wherein reservoir 606 affects the flow of blow-by gases bearings. Collar 610 also forms a restriction 612 with bore 603 (e.g., a labyrinth restriction as illustrated), wherein restriction 612 affects the flow of gas out of reservoir 606. For example, if a leak path opens in seal 621, relatively hot gases from reaction section 697 may jet along bore 603 and may cause axially asymmetric thermal deformation of tube 622 (e.g., in approximately the same azimuthal location as the leak path). Collar 610 is configured to reduce the velocity of leak gases (e.g., blow-by gases) and azimuthally distribute the gases to reduce asymmetric thermal deformation downstream of the collar (e.g., to a translator tube). As illustrated in panel 600, piston 620 includes a diffuser 624. Diffuser 624 may be optionally included to improve the effectiveness of reservoir 606 by decreasing the velocity of leak gases before reaching reservoir 606. Reservoir 606 includes a volume that extends azimuthally around collar 610, and allows for the accumulation and azimuthal distribution of leak gases. Restriction 612 restricts the flow of gases out of reservoir 606 and allows leak gas to accumulate in reservoir 606. As illustrated in panel 600, restriction 612 includes a labyrinth restriction that extends azimuthally around collar 610 and provides some suitable axial pressure drop and azimuthal distribution with each groove of the labyrinth.

As illustrated in panel 650, collar 660 forms reservoir 656 with bore 603, wherein reservoir 656 affects the flow of blow-by gases bearings.

Collar 660 includes restriction 662, which includes a ring that restricts the flow of gases out of reservoir 656 and along the tube 672. In some embodiments, a ring restriction such as restriction 662 provides an improved thermal pathway to bore 603 of cylinder 602. In some embodiments, one or more ring restrictions may be included to provide a larger pressure drop, although the addition of ring restrictions may increase frictional losses. In some embodiments, restriction 662 may be configured to not be energized by leak gases and may have limited or no contact with bore 603. In some embodiments, restriction 662 may be configured to not contact bore 603 during normal operation. In some embodiments, restriction 662 may include features configured to introduce swirl (e.g., azimuthal distribution) downstream of collar 660 to further reduce asymmetric thermal deformation of tube 672. In some embodiments, restriction 662 may include one or more gear-shaped teeth and groves azimuthally around the collar 660 to further distribute flow downstream of the collar. For example, a collar may include a labyrinth restriction (e.g., restriction 612), a contact or non-contact ring restriction (e.g., restriction 662), a restriction with features that introduces swirl downstream one or more gear-shaped teeth and groves any other suitable restriction, or any combination thereof.

Although illustrated as separate components, piston 620 and collar 610 (e.g., or piston 670 and collar 660) may be a single component (e.g., a piston may form a reservoir with a cylinder bore), separate components (e.g., as illustrated), or a collections of more than two components (e.g., a multi-part collar). In some embodiments, collar 610 may include a diffuser, reservoir, and restriction, or any combination thereof. In some embodiments, piston 620 may include a diffuser, reservoir, and restriction, or any combination thereof. A collar, or collar-like section of a piston, may include any suitable material such as, for example, metal, ceramic, plastic, a composite, any other suitable material, or any combination thereof. In some embodiments, piston 620 is comprised of a high-temperature alloy metal (e.g., inconel) and collar 610 is comprised of a different type of metal. In some embodiments, collar 610 is comprised of a metal with a similar coefficient of thermal expansion to fasteners 613 and 614.

The intake system is configured to introduce reactants to the cylinder of a generator assembly. For example, the intake system may be configured to provide a controlled air and fuel mixture to the cylinder during breathing (e.g., the intaking and expelling of gases from the bore of the cylinder). In a further example, the intake system may be configured to provide a controlled amount of air (e.g., via breathing) and a controlled amount of fuel (e.g., via direct injection, near-port injection, or other suitable fuel injection type) to the cylinder. In a further example, the intake system may be configured to provide a controlled amount of air/fuel mixture to the cylinder. In a further example, the intake system may be configured to provide a controlled amount of air to the cylinder and, separately, a controlled amount of fuel to the cylinder. The intake system may be configured to provide reactants at a suitable condition such as, for example, at a suitable pressure, temperature, velocity, composition (e.g., equivalence ratio, humidity, residual trapped exhaust gases, exhaust gas recirculation content), or at any other suitable property, or any combination thereof. FIGS. 7-17 show illustrative intake systems, and components thereof, in accordance with the present disclosure. It will be understood that while the following descriptions are primarily in terms of air, the present disclosure may be applied to any intake gas (e.g., vitiated air, oxygen, other oxidizers, inert constituents, or other gases), in accordance with the present disclosure. It will also be understood that the present disclosure may be applied to any suitable fuel including gaseous fuel, liquid fuel, an aerosolized fuel, a slurry fuel, any other suitable fuel, or any suitable combination thereof.

Figure 7:
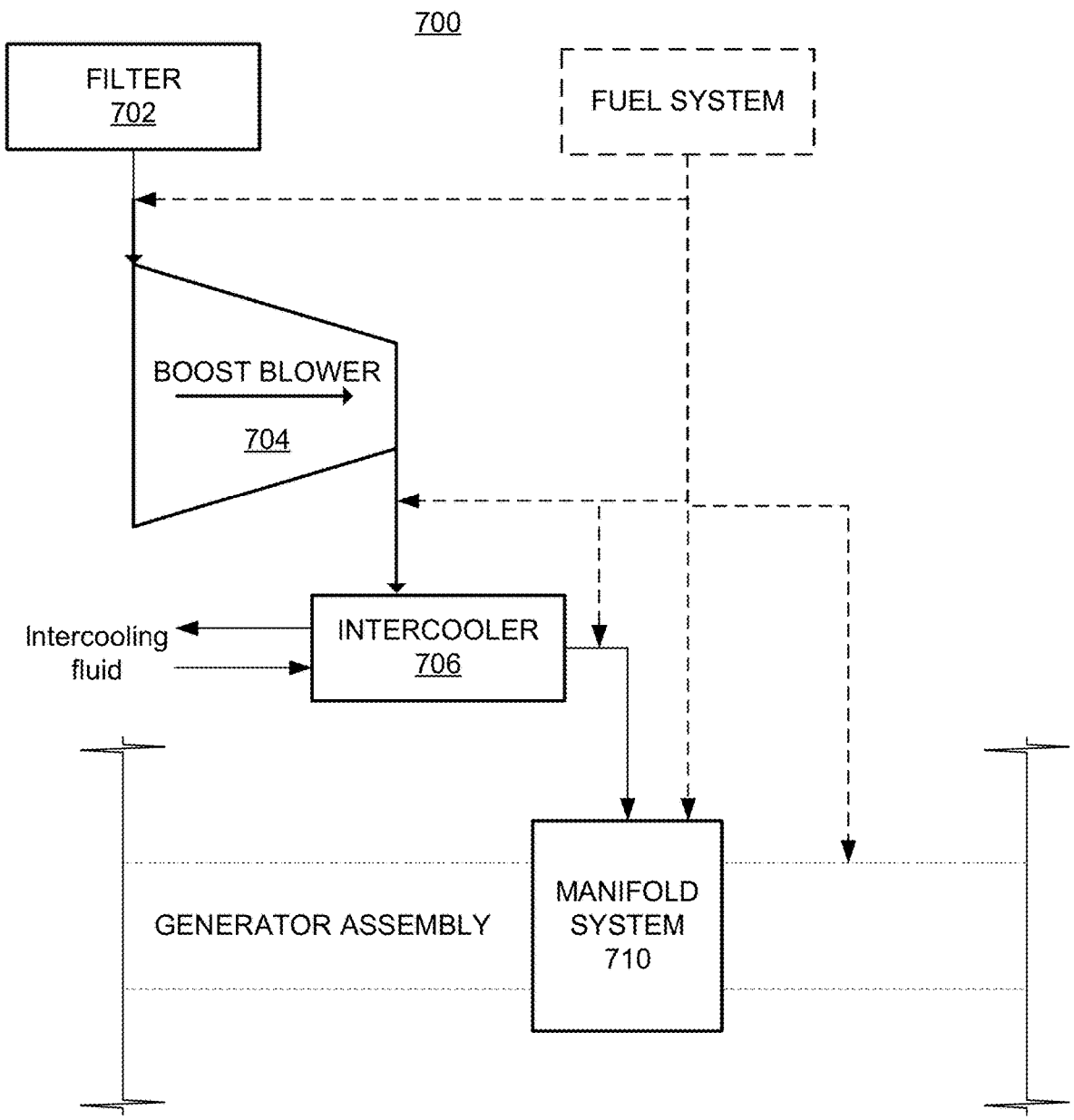
FIG. 7 shows a system diagram of an illustrative intake system, in accordance with some embodiments of the present disclosure.

FIG. 7 shows a system diagram of illustrative intake system 700, in accordance with some embodiments of the present disclosure. Intake system 700 optionally includes, for example, filter 702, boost blower 704, intercooler 706, manifold system 710, corresponding ducting (e.g., runners and fittings), sensors, any other suitable components, or any suitable combination thereof.

Filter 702 is configured to restrict one or more components in an intake gas supply from entering the rest of intake system 700 and the corresponding generator assembly. As illustrated, filter 702 is arranged upstream of boost blower 704, intercooler 706, and manifold system 710. In some embodiments, filter 702 is located downstream of intercooler 706 and upstream of manifold system 710. In some embodiments, filter 702 is located downstream of boost blower 704 or any other suitable location in the intake system. In some embodiments, multiple filters 702 may be included and located at various locations of the intake system. For example, filter 702 may be configured to filter particles, dust, particulate matter, debris, humidity (e.g., a desiccant or coalescing type filter), or other materials which may be in the intake gas supply. Filter 702 may include any suitable number of filters (e.g., one or more) arranged in any suitable configuration (e.g., series or parallel, at one or more locations along the intake system). For example, multiple filters can be used in series, in parallel, or a combination thereof.

Boost blower 704 is configured to increase the pressure of the intake air, velocity of the intake air, or both. For example, boost blower 704 may allow intake air to more completely purge exhaust from the cylinder during breathing processes (e.g., during a uni-flow scavenging process). In a further example, boost blower 704 may enable higher in-cylinder pressure when ports are closed, thereby increasing power density of the generator system (e.g., by increasing the trapped pressure, reducing residual gas trapping, or both). Boost blower 704 may include any suitable type of blower such as, for example, a centrifugal blower, a positive displacement compressor, a fan, a reciprocating compressor, any other suitable compressor having any number of suitable stages, or any suitable combination thereof. In some embodiments, boost blower 704 includes an electric motor configured for driving the compressor either directly (e.g., direct drive) or indirectly (e.g., through the use of gears, belts, pulleys, and other linkages). In some embodiments, for example, boost blower 704 includes a centrifugal compressor driven by an electric motor. For example, the electric motor may be driven by a variable frequency drive (e.g., controlled by control system 310 of FIG. 3). In some embodiments, boost blower 704 includes a centrifugal compressor coupled via a shaft to a radial gas turbine (e.g., as a turbocharger coupled to the intake system and the exhaust system). In some embodiments, referencing FIG. 2 for example, boost blower 704 may be replaced or complemented by air redirected from gas spring 298 or 299 of driver sections 258 and 250, respectively. In some embodiments, boost blower 704 provides air, or an air-fuel mixture, at a desired pressure to manifold system 710. A linear generator system may include any suitable type of boost blower (e.g., a turbocharger, a supercharger), any suitable number of boost stages (e.g., one or more compression stages), having any suitable auxiliary systems (e.g., intercooling systems, oil systems, blow-off safety systems), in accordance with the present disclosure.

Intercooler 706 is configured to cool the intake air, intake fuel, or air-fuel mixture, downstream of boost blower 704. Boost blower 704 will generally raise the temperature of the intake gas from work input due to, for example, thermodynamic and/or machine inefficiencies. This temperature increase is generally undesired because it lowers the density of the intake gas and, in some circumstances, it affects the amount of trapped mass that may be achieved in the cylinder, and it may also affect ignition in the reaction section. For example, increased gas temperatures of the trapped gases may cause compression ignition to occur at relatively advanced timings, reduce an operational compression ratio, or both, which each may be undesirable. Intercooler 706 may be air-cooled (e.g., by an air cooling system), liquid-cooled (e.g., by a liquid cooling system), or both. In some embodiments, intercooler 706 includes a radiator-style heat exchanger having a fan to blow gas (e.g., atmospheric air) across cooling fins. In some embodiments, intercooler 706 may be enclosed and include flowing-fluid-to-flowing-fluid heat transfer (e.g., a cross-flow heat exchanger, a counter-flow heat exchanger, or a co-flow heat exchanger). In some embodiments, intercooler 706 includes one or more heat pipes configured to transfer heat from an intake gas. For example, a liquid-filled heat pipe may be used to transfer heat from the intake gas with or without phase change. In a further example, a heat pipe may be closed, having no in or out flow (e.g., a sealed tube containing a fluid operating via a capillary effect). In a further example, a heat pipe may be open, thus allowing a fluid to flow (e.g., including a flow channel and separate heat sink). Intercooler 706 may include any suitable intercooling fluid that is capable of accepting energy from the intake gas. For example, intercooling fluid may include water, air, propylene glycol, ethylene glycol, refrigerant, corrosion inhibitor, any other suitable fluid, any other suitable additive, or any combination thereof.

Manifold system 710 interfaces to the cylinder and is configured to manage the flow of the intake gas to the intake breathing ports of the cylinder. Intake gas may include intake air, fuel (e.g., gaseous or dispersed liquid droplets), air and fuel mixtures, oxidizer and fuel mixtures, along with any other suitable fluids such as, for example, recirculated exhaust gas, water vapor, or other suitable fluids. In some embodiments, manifold system 710 includes runners, swirl-inducing elements, mixing-inducing elements, flow dividers, or other features that may collect, distribute, mix, or otherwise provide a suitable intake gas to the bore of the cylinder. In some embodiments, an intake system need not include a manifold, and may include a plenum or other suitable component. In some embodiments, manifold system 710 is configured to work in concert with intake ports of the cylinder of the generator assembly to provide the intake gas to the cylinder.

In some embodiments, a fuel system is configured to supply fuel to intake system 700. As illustrated in FIG. 7, the fuel system is not included as part of the intake system, however, in some embodiments, the fuel system may be integrated into intake system 700. In some embodiments, fuel is supplied to the intake air downstream of filter 702, downstream of boost blower 704, downstream of intercooler 706, or into manifold system 710 to form an air-fuel mixture (e.g., prior to flowing through intake breathing ports). In a further example, in some embodiments, fuel is supplied into manifold system 710 for manifold injection, near-port injection, port injection, or a combination of injection arrangements. In some embodiments, intake system 700 need not interface to a fuel system. For example, fuel injection may be directly injected into the bore of the cylinder (e.g., direct injection). Further details regarding the fuel system are included in the description in the context of FIG. 15, for example.

It will be understood that an integrated linear generator system may include any, all, or none of the components discussed in the context of the intake system. For example, intake breathing ports of the generator assembly may be coupled to the atmosphere (e.g., to achieve natural aspiration). FIGS. 4-17 show illustrative breathing ports and breathing port arrangements, which may correspond to any of intake breathing ports, exhaust breathing ports, and gas spring breathing ports.

Figure 8:
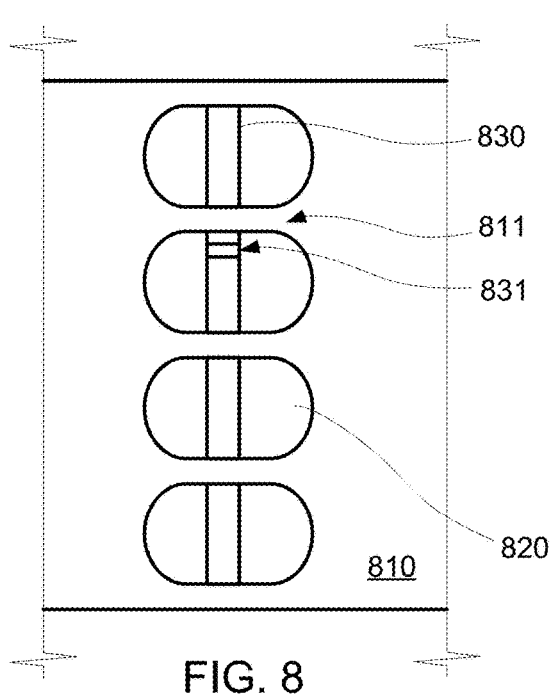
FIG. 8 shows a side view of illustrative breathing ports in a cylinder, in accordance with some embodiments of the present disclosure.
Figure 9:
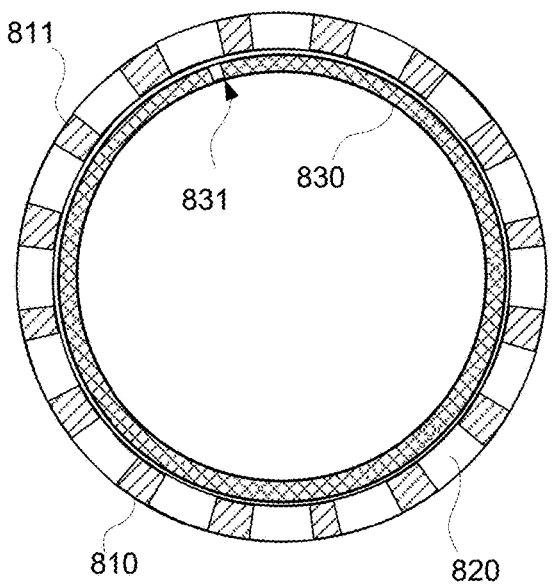
FIG. 9 shows a cross-sectional end view of the illustrative cylinder of FIG. 8, in accordance with some embodiments of the present disclosure.

FIG. 8 shows a side view of illustrative breathing ports 820 in cylinder 810, in accordance with some embodiments of the present disclosure. FIG. 9 shows an axial cross-sectional view of illustrative cylinder 810 of FIG. 8, in accordance with some embodiments of the present disclosure. As illustrated, breathing ports 820 includes a plurality of illustrative oblong openings (e.g., elongated in the axial direction) extending through the sidewall of cylinder 820 and arranged at an axial location of cylinder 810 (e.g., having an end position or center position aligned with a particular spatial position along the cylinder axial direction). Also shown in FIGS. 8-9 is piston ring 830 at a position where piston ring 830 is axially overlapping with breathing ports 820 (e.g., ports are open or partially-open). In some embodiments, as illustrated, piston ring 830 includes ring gap 831. If ring gap 831 is azimuthally clocked to be covered by a port bridge of port bridges 811 (i.e., the solid material between ports of breathing ports 820), the ends of piston ring 830 are supported during axial motion over the length of the breathing port. However, if ring gap 831 clocks (e.g., azimuthally rotates about the axis defining the axial direction) into a breathing port of breathing ports 820 (e.g., as illustrated in FIGS. 8-9), there may be a risk of radial movement and large shear stresses (e.g., that can damage the ends of piston ring 830). In some circumstances, breathing ports having large azimuthal openings (e.g., short bridges) may be relatively more susceptible to a ring gap being misaligned with a bridge. In some embodiments, the ring includes anti-rotation features to keep the ring from clocking such that a ring gap remains azimuthally aligned with a port bridge.

Figure 10:
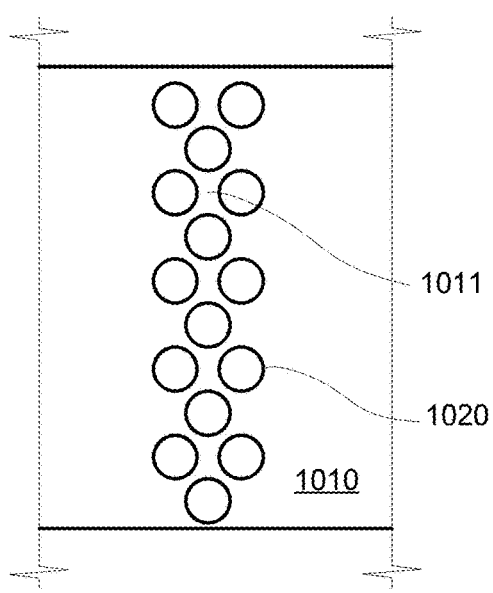
FIG. 10 shows a side view of illustrative breathing ports in a cylinder, sized and arranged to reduce ring stresses, in accordance with some embodiments of the present disclosure.

FIG. 10 shows a side view of illustrative breathing ports 1020 in cylinder 1010, sized and arranged to reduce ring stresses, in accordance with some embodiments of the present disclosure. Illustrative breathing ports 1020 of FIG. 10 includes staggered holes (e.g., in a hexagonal array, as illustrated), separated by port bridges 1011, wherein each hole has a diameter smaller than the azimuthal width of breathing ports 820 of FIG. 8. Because the length scale (e.g., diameter, as illustrated) of breathing ports 1020 is relatively smaller than that of breathing ports 820, a ring gap may be less susceptible to becoming fully located in a breathing port of breathing ports 1020 (e.g., at least a portion of the ring gap is always covered by a bridge). In some embodiments, having relatively smaller port sizes, a ring need not be pinned or otherwise constrained against rotation in a piston ring groove (e.g., need not include an anti-rotation feature). The bridges in FIG. 10 are more web-like than those illustrated in FIG. 8. Accordingly, ports and corresponding bridges may be any suitable shape. In some embodiments, the relatively large port openings breathing ports 820 of FIG. 8 may be used. For example, large openings (e.g., larger than a length scale of the ring such as the axial thickness) may reduce flow losses from surface friction. In some embodiments, the relatively smaller and staggered openings of breathing ports 1020 of FIG. 10 may be used. For example, small openings (e.g., smaller than a length scale of the ring such as the axial thickness) may help reduce the likelihood of ring damage. In some embodiments, alternative port shapes may be used to satisfy one or more competing criteria including, for example, improved breathing and improved ring wear. For example, in some embodiments, ports may have oblong shapes similar to the ports shown in FIG. 8, but with each port having a narrower width in the lateral or azimuthal direction, and/or longer dimension in an axial direction (e.g., similar to ovals). These oval-shaped or otherwise oblong ports may provide a greater open surface area compared to breathing ports 1020, while providing greater ring wear properties compared to breathing ports 820. A cylinder may include any suitable port shape and size, or combination of shapes and sizes, in accordance with the present disclosure. For example, a port may include a hole, a slot, an oval, a polygon, a rounded polygon, a compound shaped opening, any other suitable opening, or any combination thereof. In some embodiments, the size and/or shape of breathing ports may be configured to reduce pressure drop of gases flowing through the ports, prevent an unsupported ring gap, reduce ring wear, cause desired breathing behavior, or a combination thereof. In some embodiments, breathing ports may be axially long enough such that a piston seal does not move completely axially outboard of the breathing ports. For example, when a piston is at BDC, the ports may be long enough (in the axially outward direction from TDC) such that at least a portion of the port is open to the front a sealing ring on the piston (e.g., allowing exhaust gases in the cylinder to flow into the exhaust manifold) and at least a portion of the port is open to the back of the sealing ring on the piston (e.g., allowing gases in the back section of the piston to flow out of the cylinder and into the exhaust manifold).

Figure 11:
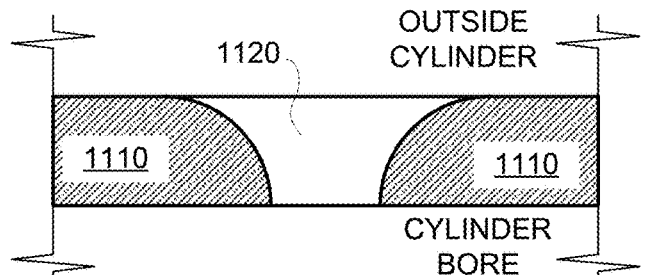
FIG. 11 shows a cross-sectional end view of an illustrative shaped breathing port in a cylinder, in accordance with some embodiments of the present disclosure.
Figure 12:
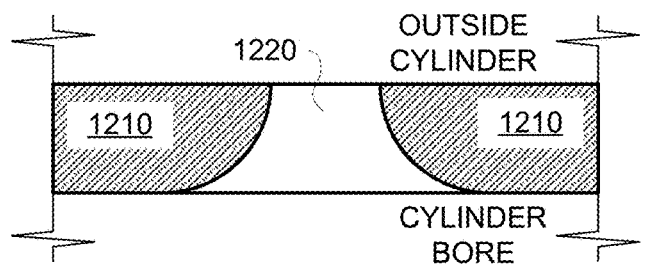
FIG. 12 shows a cross-sectional end view of an illustrative shaped breathing port in a cylinder, in accordance with some embodiments of the present disclosure.

FIG. 11 shows a cross-sectional end view of illustrative shaped breathing port 1120 in cylinder 1110, in accordance with some embodiments of the present disclosure. Breathing port 1120 includes a larger cross-sectional area at the outer face (e.g., at the outside of cylinder 1110) than the inner face (e.g., at the bore cylinder 1110). FIG. 12 shows a cross-sectional end view of illustrative shaped breathing port 1220 in a cylinder, in accordance with some embodiments of the present disclosure. Breathing port 1220 includes a smaller cross-sectional area at the outer face (e.g., at the outside of cylinder 1210) than the inner face (e.g., at the bore cylinder 1210). For example, in some embodiments, intake breathing ports may be shaped similar to breathing port 1120 illustrated in FIG. 11, to reduce pressure loss across the port (e.g., to reduce the boundary layer of the flow through the port from outside to inside) as compared to a sharp edge. In a further example, in some embodiments, exhaust breathing ports may be shaped similar to breathing port 1220 illustrated in FIG. 12, to reduce pressure loss across the port (e.g., to reduce the boundary layer of the flow through the port from inside to outside) as compared to a sharp edge. Accordingly, the expected direction of average flow may provide an indication to how a breathing port is contoured to reduce losses (e.g., with the port shaped as a nozzle rather than a diffuser relative to the flow direction). In some embodiments, a breathing port may include a composite shape of those shown in FIGS. 11-12 (e.g., having a wide-narrow-wide cross-sectional area profile). For example, a breathing port may include a compound curve, a piecewise profile, any other suitable profile, or any combination thereof. In some embodiments, breathing ports may include an azimuthal path or feature (e.g., to introduce an azimuthal component or "swirl" to the flow). In some embodiments, breathing ports may include an axial path or feature (e.g., being tilted axially forward or backward to introduce an axial component to the flow).

Figure 13:
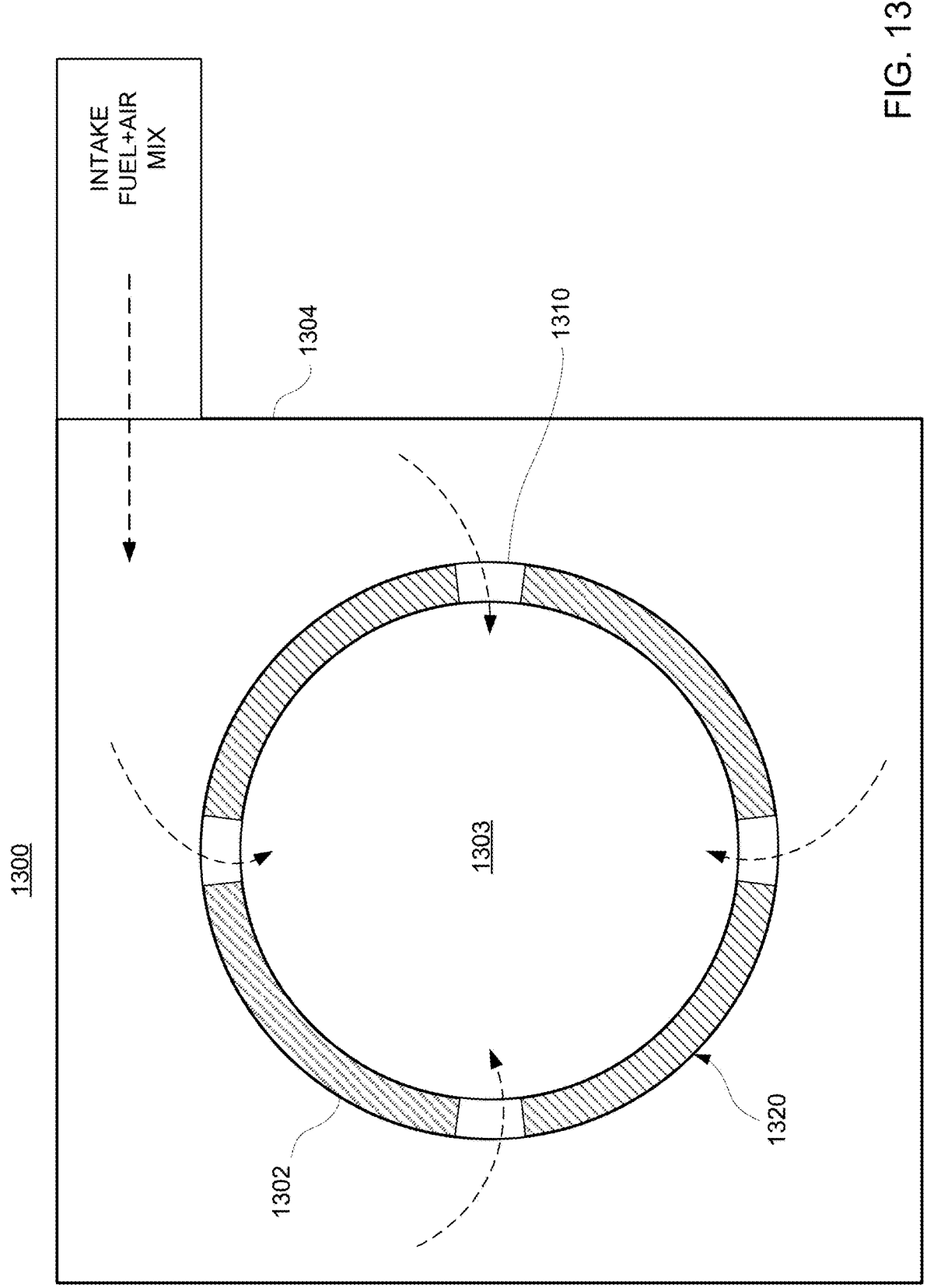
FIG. 13 shows a cross-sectional view of an illustrative integrated linear generator system portion, configured for premixed air and fuel, in accordance with some embodiments of the present disclosure.

FIG. 13 shows an axial cross-sectional view of illustrative integrated linear generator system portion 1300, configured for premixed air and fuel, in accordance with some embodiments of the present disclosure. Integrated linear generator portion 1300 includes cylinder 1302 and manifold 1304. Cylinder 1302 includes intake breathing ports 1310. While four intake breathing ports 1310 spaced ninety degrees apart are illustratively shown in FIG. 13 for discussion purposes, any suitable number of intake breathing ports may be included at any suitable spacing and separation, in accordance with the present disclosure. Intake breathing ports may be shaped to reduce ring wear and/or, to direct the flow of air or air-fuel mixture. In some embodiments, the intake ports may be replaced with a design including a plurality of smaller diameter holes or any other suitable shape. For example, smaller diameter holes (e.g., such as those shown in FIG. 10) may reduce piston ring wear and improve uniform premix air and fuel injection into the manifold. Premixed air and fuel enter manifold 1304, are distributed in the volume between manifold 1304 and cylinder 1302 (referred to herein as the "manifold volume"), enter intake breathing ports 1310, and flow into bore 1303 when the corresponding piston uncovers intake breathing ports 1310 and the pressure field directs flow into bore 1303 (e.g., during the breathing process). The flow in the manifold volume may be unsteady, due to the opening and closing of intake breathing ports 1310 by a piston (not shown in FIG. 13), exhaust breathing ports by a piston (not shown in FIG. 13), or both, during engine cycles. In some embodiments, the manifold volume, manifold geometry, or both, may be selected to enhance breathing, make the flow field more symmetric among intake breathing ports, reduce pressure loss, introduce swirl, tumble, or a combination thereof. For example, features such as veins may be used to promote swirl or tumble. Introduction of swirl or tumble may improve scavenging of residual gases from the reaction cylinder bore and/or improve fuel and air mixing of the intake. Seal 1320 is configured to seal between manifold 1304 and cylinder 1302. For example, seal 1320 may include a gasket, an O-ring, a bead of cured sealant, a press-fit, any other suitable seal, or any combination thereof. In some embodiments, breathing ports 1310 are sized such the flow incurs a larger pressure drop through breathing ports 1310 than in the manifold volume. In some embodiments, manifold 1304 may be sized to ensure a desired level of air and fuel mixing (i.e., homogeneity) prior to intake into cylinder 1302.

Figure 14:
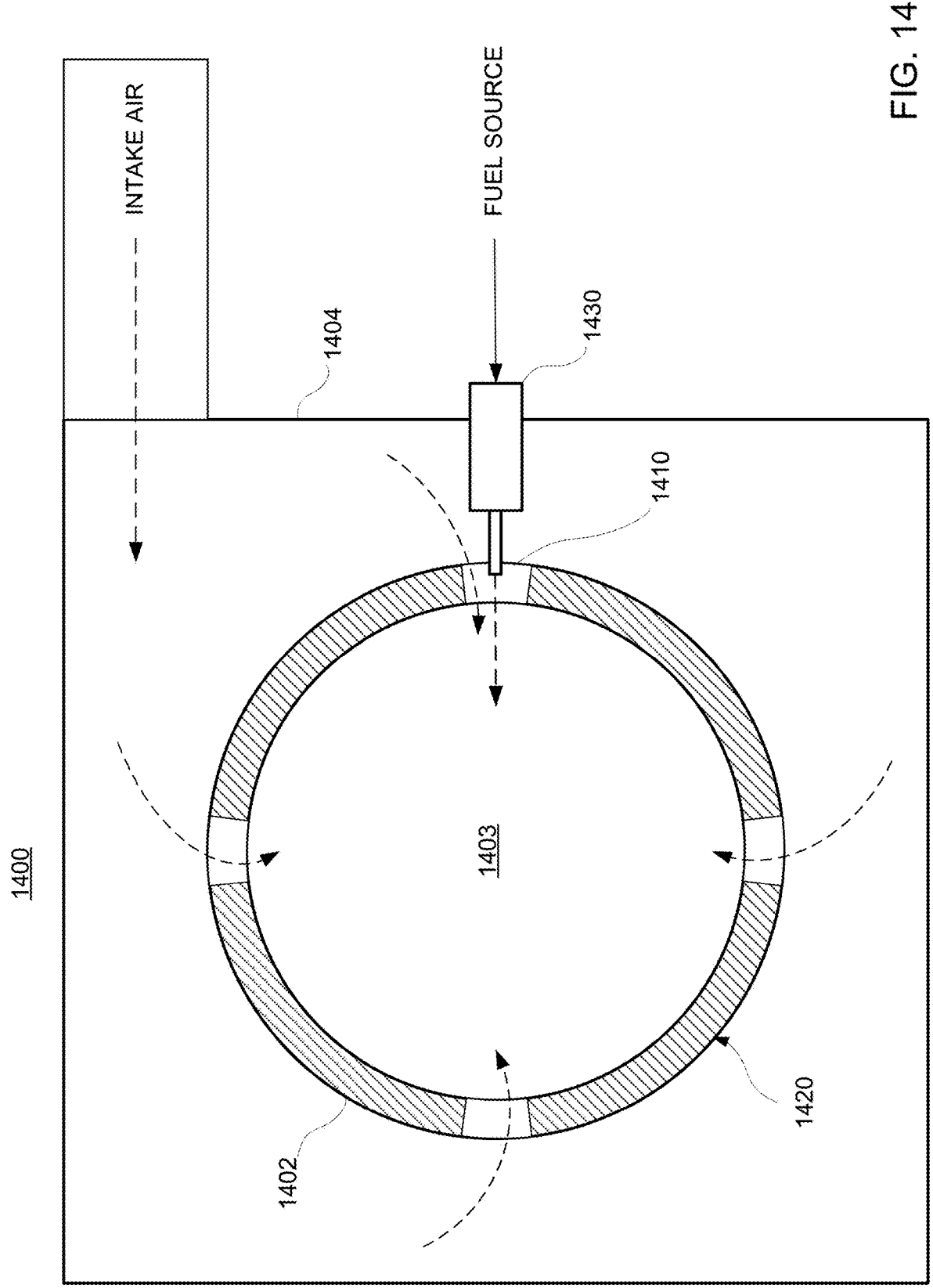
FIG. 14 shows a cross-sectional view of an illustrative integrated linear generator system portion, configured for in-port injection, in accordance with some embodiments of the present disclosure.

FIG. 14 shows a cross-sectional view of illustrative integrated linear generator system portion 1400, configured for near-port or in-port injection, in accordance with some embodiments of the present disclosure. Integrated linear generator portion 1400 includes cylinder 1402 and manifold 1404. Cylinder 1402 includes intake breathing ports 1410. While four intake breathing ports 1410 spaced ninety degrees apart are illustratively shown in FIG. 14 for clarity, any suitable number of intake breathing ports may be included at any suitable separation, in accordance with the present disclosure. Air enters manifold 1404, is distributed in the manifold volume between manifold 1404 and cylinder 1402, enters intake breathing ports 1410, and flows into bore 1403 when the corresponding piston uncovers intake breathing ports 1410 and the pressure field directs flow into bore 1403 (e.g., during a breathing process). The flow in the manifold volume may be unsteady, due to the opening and closing of intake breathing ports 1410 by the piston (not shown in FIG. 14), exhaust breathing ports by a piston (not shown in FIG. 14) during engine cycles. In some embodiments, the manifold volume, manifold geometry, or both, may be selected to enhance breathing, make the flow field more symmetric among intake breathing ports, reduce pressure loss, introduce swirl, tumble, or a combination thereof. Fuel injector 1430 is configured to deliver fuel into a corresponding intake breathing port of intake breathing ports 1410. In some embodiments, each of intake breathing ports 1410 may have, but need not have, a corresponding fuel injector (e.g., similar to fuel injector 1430). In some embodiments, fuel injector 1430 is configured to deliver fuel during predetermined time periods. For example, fuel injector 1430 may be configured to inject fuel only during the breathing process (e.g., when intake breathing ports 1410 are uncovered by the corresponding piston). In a further example, fuel injector 1430 may be configured to inject fuel only during a time window of a breathing process to limit the amount of fuel that does not enter bore 1403 during the breathing process (e.g., so that fuel does not accumulate in manifold 1404)), limit the amount of fuel that blows through the cylinder during the breathing process (e.g., so that fuel does not enter and exit the boor 1403 during the breathing process), or both. In some embodiments, fuel injector 1430 is configured to continuously deliver fuel. While shown as partially inserted into an intake breathing port of intake breathing ports 1410, fuel injector 1430 need not be inserted in an intake breathing port of intake breathing ports 1410. For example, fuel injector 1430 may generate a jet of fuel that is directed towards an intake breathing port, and enters the intake breathing port due to momentum effects (e.g., the velocity of the jet). Fuel injector 1430 may include any suitable type of fuel injector that is capable of delivering fuel to an intake breathing port. For example, fuel injector 1430 may be configured to near port injection, in-port injection, or both. Seal 1420 is configured to seal between manifold 1404 and cylinder 1402. For example, seal 1420 may include a gasket, an O-ring, a bead of cured sealant, a press-fit, any other suitable seal, or any combination thereof. Although illustrated as sealing directly against cylinder 1402, seal 1420 need not be engaged directly against cylinder 1402. For example, seal 1420 may seal against another component of the integrated linear generator system (e.g., a bearing housing, a rod seal).

Figure 15:
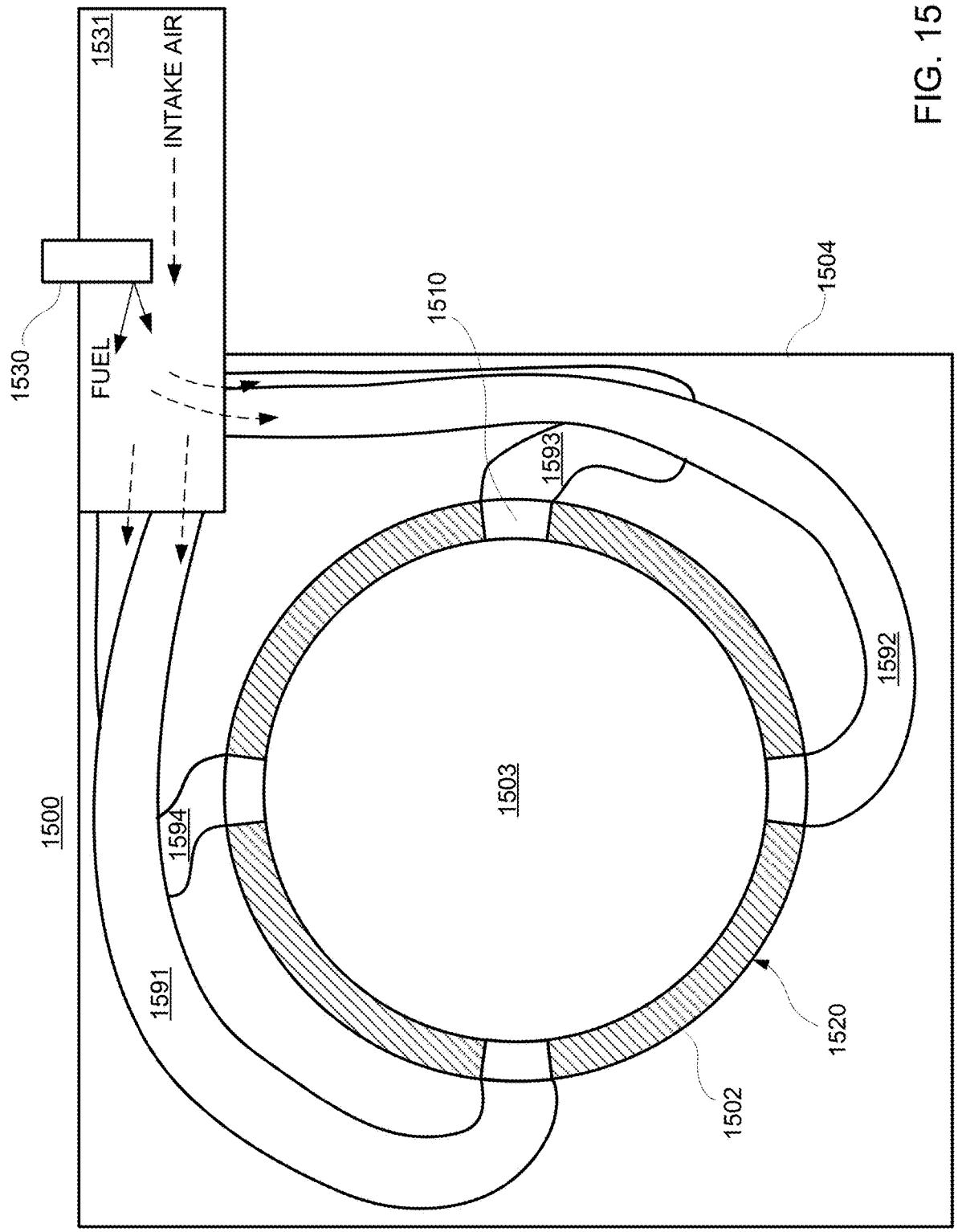
FIG. 15 shows a cross-sectional view of an illustrative integrated linear generator system portion, configured for injection, in accordance with some embodiments of the present disclosure.

FIG. 15 shows a cross-sectional view of illustrative integrated linear generator system portion 1500, configured for injection upstream of intake breathing ports 1510, in accordance with some embodiments of the present disclosure. Integrated linear generator portion 1500 includes cylinder 1502, manifold 1504, plenum 1531, intake runners 1591-1594, fuel injector 1530, and seal 1520. Seal 1520 is configured to seal between manifold 1504 and cylinder 1502 (e.g., to prevent from leaking in or out of the intake system). For example, seal 1520 may include a gasket, an O-ring, a bead of cured sealant, a press-fit, any other suitable seal, or any combination thereof. In some embodiments, fuel injector 1530 is configured to inject fuel into plenum 1531, which receives intake air (e.g., from a boost blower and/or intercooler, and/or a filter). The air and fuel mixture flows from plenum 1531 through intake runners 1591, 1592, 1593, and 1594 to corresponding intake breathing ports 1510. In some embodiments, intake runners 1591-1594 have the same, or similar, lengths, thus imparting similar residence times of intake gas within the respective intake runners. For example, intake runners 1591-1594 may be tuned (e.g., have geometric properties such as length and cross-sectional area), having a flow path that causes particular breathing characteristics. The air and fuel mixture is discussed further in the context of FIG. 18. An intake system may include any suitable number (e.g., one or more than one) of plenums, fuel injectors, breathing ports, breathing enhancement features, in any suitable arrangement, in accordance with the present disclosure.

In some embodiments, intake runners 1591-1594 are sealed to corresponding ports of intake breathing ports 1510, such that intake gas flow in the intake runners does not leak into manifold 1504. In some embodiments, plenum 1531 is open to manifold 1504 (e.g., plenum 1531 and manifold 1504 are the same). In some embodiments, manifold 1504 need not be included (e.g., intake runners 1591-1594 are sealed to plenum 1531). In some embodiments, intake runners 1591-1594 need not be engaged directly against cylinder 1502 or intake breathing ports 1520. For example, ends of intake runners 1591-1594 may be arranged close to, but not sealed against, respective intake breathing ports 1520.

Figure 16:
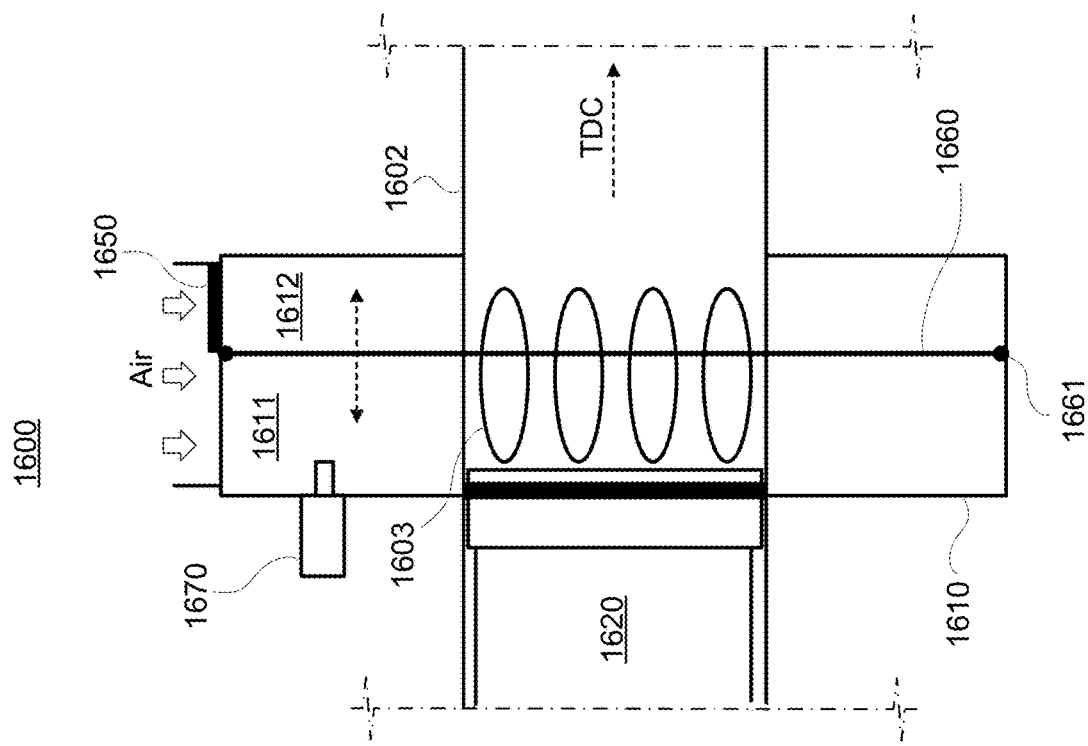
FIG. 16 shows a cross-sectional side view of an illustrative intake portion of a linear generator, in accordance with some embodiments of the present disclosure.

FIG. 16 shows a diagram of illustrative intake manifold arrangement 1600, in accordance with some embodiments of the present disclosure. Arrangement 1600, shown from the side of a generator assembly, on the intake side, illustrates a partitioned intake. The partitioned intake is an approach to selectively inject a relatively leaner or richer air/fuel mixture into a reaction cylinder during the breathing process (e.g., lean-fronting). Air and fuel are provided to intake manifold 1610, as illustrated. Screen 1650 and partition 1660 separate regions 1611 and 1612 from each other. Fuel is provided to region 1611 (e.g., using injector 1670) and air is provided to region 1612. Screen 1650 allows some air from region 1612 to enter region 1611 and mix with fuel in region 1611. Accordingly, the gas mixture in region 1611 is richer than the gas mixture in region 1612 (e.g., the equivalence ratio in region 1611 is greater than the equivalence ratio in region 1612). Partition 1660 provides axial partitioning of the flow of intake gases into the bore of cylinder 1602. Partition 1660, as illustrated may be porous, perforated, or otherwise permeable to gases (e.g., as shown by the arrows) although providing at least some restriction to mixing between regions 1611 and 1612. The arrangement of region 1612 axially inboard (e.g., towards TDC as indicated) of region 1611, allows a relatively leaner intake gas to enter the bore of cylinder 1602 during breathing. This axial partitioning of intake gas may reduce the concentration of unreacted fuel in the exhaust due to blow-through. For example, the intake gas charge in the bore of cylinder 1602, when the exhaust ports close, may be relatively leaner towards the exhaust side of cylinder 1602. In some embodiments, partition 1660 extends radially inward to the outside surface of cylinder 1602 at intake ports 1603. In some embodiments, as illustrated, partition 1660 is sealed to intake manifold by seal 1661.

In an illustrative example, during a power stroke of the linear generator, the intake translator 1620 moves away from TDC (e.g., away from the exhaust breathing ports). When sealing rings uncover intake breathing ports 1603, gases from region 1612 of intake manifold 1610 begin to enter the cylinder 1602. Region 1612, which is closest to the centerline of cylinder 1602, contains gas having a relatively lower concentration of fuel. The gas of region 1612 enters cylinder 1602 first as translator 1620 begins to open intake breathing ports 1603. Fuel is injected (e.g., using injector 1670) into region 1611, which is farther from the centerline of cylinder 1602 (e.g., away from TDC), such that region 1611 includes a fuel richer zone. Gases in region 1611 enter cylinder 1602 later in the breathing cycle, as it takes some time for translator 1620 to uncover that portion of intake breathing ports 1603 that corresponds to region 1611. Screen 1650 may be used to control the relative flow of fresh air into region 1611 from region 1612. For example, the porosity or open area of screen 1650, the position of screen 1650 (e.g., axial or radial position), the porosity or open area of partition 1660, the position of partition 1660 (e.g., the axial position of partition 1660), or a combination thereof, affect the partitioning of intake gas flowing from intake manifold 1610 to cylinder 1602.

Figure 17:
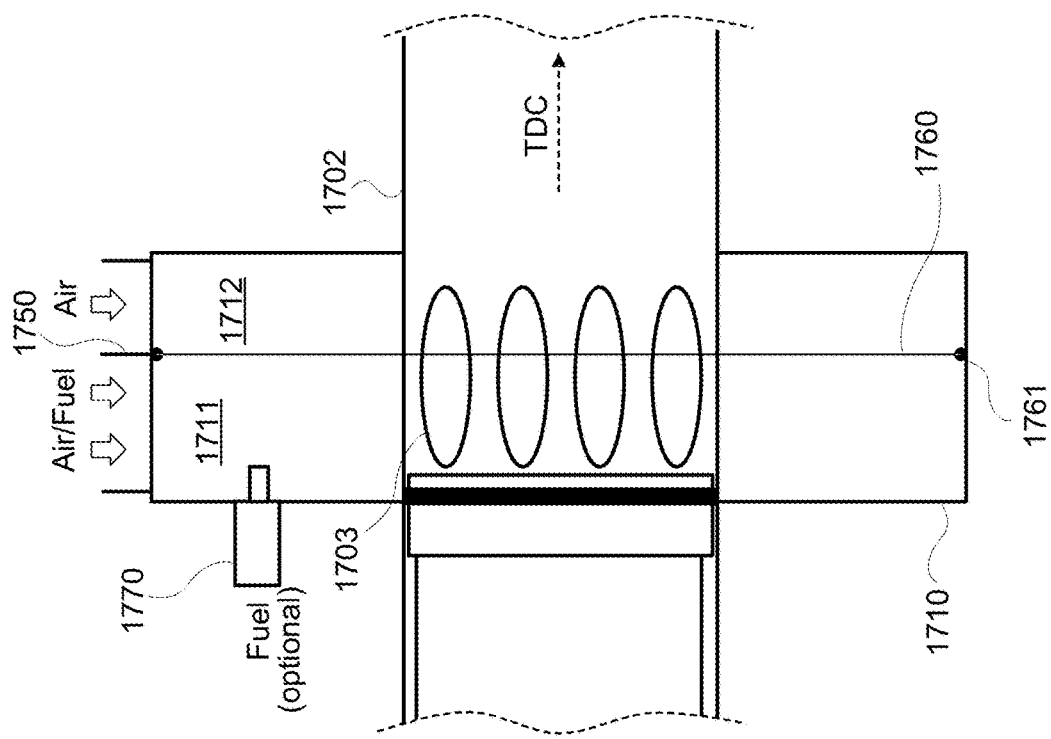
FIG. 17 shows a cross-sectional side view of an illustrative intake portion of a linear generator, in accordance with some embodiments of the present disclosure.

FIG. 17 shows a cross-sectional side view of illustrative intake portion 1700 of a linear generator, in accordance with some embodiments of the present disclosure. Intake portion 1700 is similar to intake portion 1600, except partition 1760 is impermeable to intake gas while partition 1660 is permeable to intake gas. Air and fuel are provided to region 1711 of intake manifold 1710, as illustrated. Screen 1750 and partition 1760 separate regions 1711 and 1712 from each other. Fuel and air are provided to region 1711 and air is provided to region 1712. Screen 1750 allows partitions the intake gas into a first stream of air provided to region 1612 and a second stream of air or air and fuel provided to region 1711. In some embodiments, screen 1750 partitions intake are to regions 1711 and 1712, and fuel is provided to region 1711 using optional fuel injector 1770. Accordingly, the gas mixture in region 1711 is richer than the gas mixture in region 1712 (e.g., the equivalence ratio in region 1711 is greater than the equivalence ratio in region 1712). For example, the equivalence ratio in region 1712 may be zero, or near zero (e.g., region 1712 may include air without fuel). Partition 1760 provides axial partitioning of the flow of intake gases into the bore of cylinder 1702. Partition 1760 is impermeable to intake gases (e.g., as shown by the arrows) preventing mixing between regions 1711 and 1712. The arrangement of region 1712 axially inboard (e.g., towards TDC as indicated) of region 1711, allows a relatively leaner intake gas to enter the bore of cylinder 1702 during breathing. This axial partitioning of intake gas may reduce the concentration of unreacted fuel in the exhaust due to blowthrough. For example, the intake gas charge in the bore of cylinder 1702, when the exhaust ports close, may be relatively leaner towards the exhaust side of cylinder 1702. In some embodiments, partition 1760 extends radially inward to the outside surface of cylinder 1702 at intake ports 1703. In some embodiments, as illustrated, partition 1760 is sealed to intake manifold by seal 1761.

FIG. 18 shows a system diagram of illustrative fuel system 1800, in accordance with some embodiments of the present disclosure. In some embodiments, intake system 400 includes fuel system 1800. In some embodiments, fuel system 1800 need not be included in an intake system. Fuel system 1800 as illustratively shown in FIG. 18 includes fuel filter 1802, fuel compressor 1804, and fuel valve 1806. Fuel system 1800 receives a suitable fuel from a fuel supply which may include, for example, a tank (e.g., a propane tank, a diesel tank, a storage tank), a pipe or pipeline (e.g., a natural gas or biogas pipeline), or any other suitable source of fuel. In an illustrative example, fuel system 1800 may be the same as the fuel system of FIG. 7.

Fuel filter 1802 is configured to filter unwanted components from the fuel such as, for example, water, particulates, condensable vapors, sulfur, siloxanes, or other constituents. In some embodiments, fuel system 1800 need not include fuel filter 1802. For example, a fuel supply, source, or reservoir may provide fuel with a sufficient composition or cleanliness and accordingly need not require further filtering (e.g., utility pipeline natural gas). Optional fuel compressor 1804 is configured to increase the pressure of the fuel. In some embodiments, fuel compressor 1804 is configured to provide a large increase in pressure of the fuel for use in a high-pressure drop fuel injector (e.g., for gas or liquid fuel). In some embodiments, fuel compressor 1804 is configured to provide a relatively small increase in pressure. For example, fuel valve 1806 may include a carburetor-type fuel valve, and fuel compressor 1804 may increase the pressure of the fuel enough for fuel valve 1806 to operate. In some embodiments, fuel system 1800 need not include fuel compressor 1804. For example, the fuel supply, source, or reservoir may provide fuel at a sufficient pressure and accordingly may not require further boosting. Fuel compressor 1804 may be selected based on the fuel injection technique used. For example, fuel compressor 1804 may be capable of generating relatively high pressures (e.g., much larger than a boost pressure of intake gas) to achieve direct injection or near-port injection over suitable time scales (e.g., time scales less than a cycle period). In a further example, fuel compressor 1804 need not be capable of generating high pressure, and rather may generate pressures larger than an air boost pressure, especially when the time scale of injection is relatively longer or fuel injection is continuous. In some embodiments, one or more gas springs (e.g., 204 and/or 205 in FIG. 2), gas spring reservoirs (e.g., 273 and/or 274 in FIG. 2), or a combination thereof, may be configured to compress fuel to supplement, complement, or negate the need for fuel compressor 1804.

Figure 19:
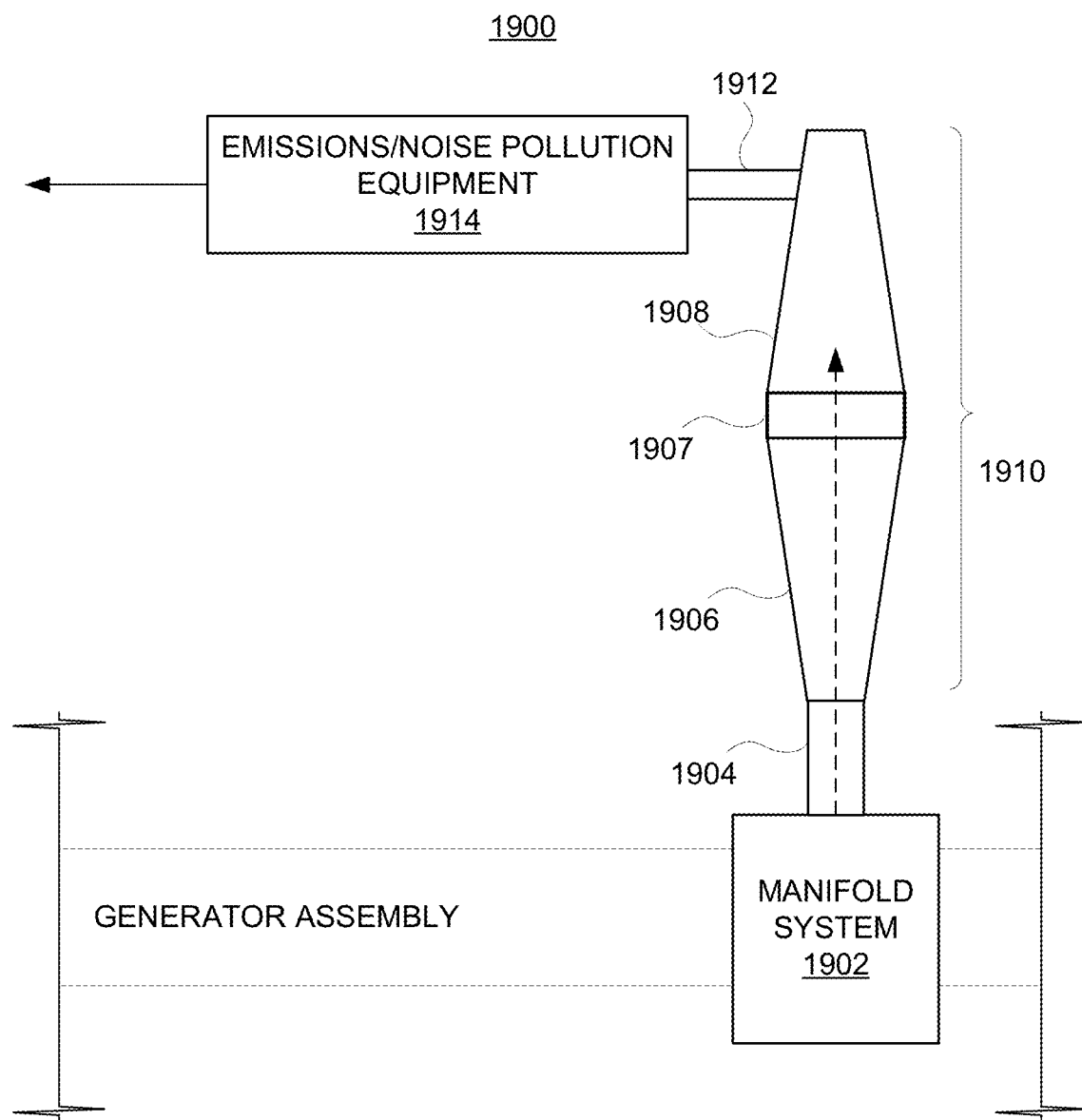
FIG. 19 shows a system diagram of an illustrative exhaust system, in accordance with some embodiments of the present disclosure.

The exhaust system is configured to facilitate removal of reaction products from the cylinder to the atmosphere. For example, the exhaust system is configured to guide the removal of reaction products during breathing. FIGS. 17-19 show illustrative exhaust systems, and components thereof, in accordance with the present disclosure. The exhaust system may be configured to reduce or prevent blowthrough (i.e., intake gas flowing into the intake breathing ports and out of the exhaust breathing ports during a breathing process). For example, blow-through may allow unreacted fuel to reach the exhaust system in some circumstances. Further, the exhaust system may be configured to aid in drawing intake gas into the cylinder during a breathing process.

FIG. 19 shows a system diagram of illustrative exhaust system 1900, in accordance with some embodiments of the present disclosure. Exhaust system 1900 optionally includes, for example, exhaust manifold system 1902, tuned pipe 1910, stinger 1912, optional emissions/noise pollution equipment 1914, corresponding ducting, sensors, any other suitable components, or any suitable combination thereof. In some embodiments, exhaust system 1900 may include heat exchangers (not shown in FIG. 19) to produce useful thermal energy that can be later utilized in or stored for combined-heat-and-power applications, additional electricity production (e.g., through a bottoming cycle), other thermal applications, or any combination thereof. Exhaust gases flow from the bore of the cylinder through exhaust breathing ports (not shown in FIG. 19, covered by manifold system 1902) when uncovered by the corresponding piston (e.g., during the breathing process) to manifold system 1902. In some embodiments, when the piston uncovers the exhaust breathing ports, the gas pressure in the cylinder is greater than the gas pressure in manifold system 1902 (e.g., in some circumstances enough to create choked flow at the exhaust breathing ports), and a blow-down pulse occurs (e.g., a pressure wave that propagates through the exhaust gas). Tuned pipe 1910 is configured to take advantage of the blow-down pulse (e.g., the energy in the pressure wave) to enhance the breathing process. For example, tuned pipe 1910 may be configured to produce a suction pulse (e.g., to aid in drawing intake gas into the cylinder) and a plugging pulse (e.g., to reduce blow-through and increase in-cylinder pressure) in response to a blow-down pulse during the breathing process. Accordingly, the transient breathing process and the tuned pipe cause the flow in manifold system 1902 to be non-steady. A blow-down pulse, a suction pulse, and a plugging pulse are examples of pressure waves (e.g., having peaks, troughs, or other features in pressure) that propagate through gases in the exhaust system and cylinder bore.

Tuned pipe 1910 includes runner 1904, diverging section 1906, optional section 1907 having a fixed cross-sectional area, and converging section 1908. In some embodiments, runner 1904 may include a length of duct having a fixed diameter, cross-sectional area, or both, at either end of tuned pipe 1910 (e.g., separate from section 1907). In some embodiments, diverging section 1906 has a predetermined length, a predetermined first diameter or first cross section area, and a predetermined second diameter or second cross section area. For example, diverging section 1906 may be shaped as a hollow frustum section (e.g., a right or oblique frustum), with the smaller cross section area nearer manifold system 1902. Converging section 1908 is downstream of diverging section 1906, and may be shaped as a hollow frustum section (e.g., a right or oblique frustum), with the smaller cross section area directed downstream. The length, cross section areas and arrangement of tuned pipe 1910 may impact performance of the generator assembly, and particularly may impact the breathing process. For example, the length of tuned pipe 1910 may be configured to affect breathing characteristics (e.g., timing of a suction wave or a plugging pulse). In some embodiments, section 1907 includes a constant diameter. In some embodiments, the spatial dimensions of a tuned pipe may be determined based on a desired operating characteristic of a linear generator such as, for example, a power output, air and/or fuel flow, operating frequency, emissions, or any other suitable operating characteristic. In some embodiments, the tuning of tuned pipe 1910 is unique to, or otherwise based on, the frequency of operation of a generator assembly. For example, the timing and phasing of pressure waves may be tuned to a particular engine frequency or range of frequencies. In an illustrative example, a generator assembly may be configured to operate in a relatively limited range of frequencies, for which tuned pipe 1910 is tuned. For example, tuned pipe 1910 may be tuned for ranges of frequency from ideal to full load of less than 10%, 20%, 30%, 40%, or 50%.

Downstream of converging section 1908 is stinger 1912. In some embodiments, stinger 1912 includes a duct having a relatively smaller diameter or cross section area than portions of tuned pipe 1910. Stinger 1912 may be arranged at any suitable location of tuned pipe 1910 and provides the outlet for exhaust gas to flow out of tuned pipe 1910. In some embodiments, diverging section 1906 connects to an expansion volume (e.g., an expansion tank) that replaces section 1907 and converging section 1908, and stinger 1912 is connected to such expansion volume.

Optional emissions/noise pollution equipment 1914 is arranged downstream of stinger 1912. Emissions/noise pollution equipment 1914 may be configured to aid in equilibrating the chemical composition of the exhaust (e.g., by selectively catalyzing reactions), reducing noise output, or both. For example, in some embodiments, emissions/noise pollution equipment 1914 includes an oxidation catalyst configured to aid in oxidizing unburned hydrocarbons, carbon monoxide, or any other suitable fuels or partial combustion products. In a further example, in some embodiments, emissions/noise pollution equipment 1914 includes a three-way catalyst configured to aid in oxidizing unburned hydrocarbons, carbon monoxide, or any other suitable fuels or partial combustion products as well as reducing nitrogen oxides (e.g., to reduce the NOx content). In a further example, in some embodiments, emissions/noise pollution equipment 1914 includes a selective catalytic reduction (SCR) system configured to aid in reducing nitrogen oxides. In some embodiments, emissions/noise pollution equipment 1914 includes a SCR system, a catalyst, a muffler, a combination thereof, or none of these components. In some embodiments, an exhaust system need not include emissions/noise pollution equipment 1914. For example, the exhaust breathing ports or tuned pipe may directly exhaust to the atmosphere. In some embodiments, the exhaust system need not include a muffler, and exhaust ducting is used to muffle noise. In some embodiments, volume or space of the package (e.g., an enclosure of the linear generator system) is used to muffle noise and a separate muffler component need not be included (e.g., the exclusion of a muffler may provide for more available space in the package/enclosure). In some embodiments, emissions/noise pollution equipment 1914 includes suitable ducting (e.g., acoustic ducting) inside of or outside of the package/enclosure, sound-muffling or acoustic panels, any other suitable features configured to reduce the intensity of sound wave, any other suitable features configured to reduce audible noise outside the package, or any combination thereof.

A tuned pipe may include simple bends, compound bends, or both, of any suitable path and shape, in accordance with some embodiments of the present disclosure. For example, a tunes pipe may be bent, wrapped, coiled, or otherwise reduced or modified in overall footprint to accommodate packaging constraints.

Figure 20:
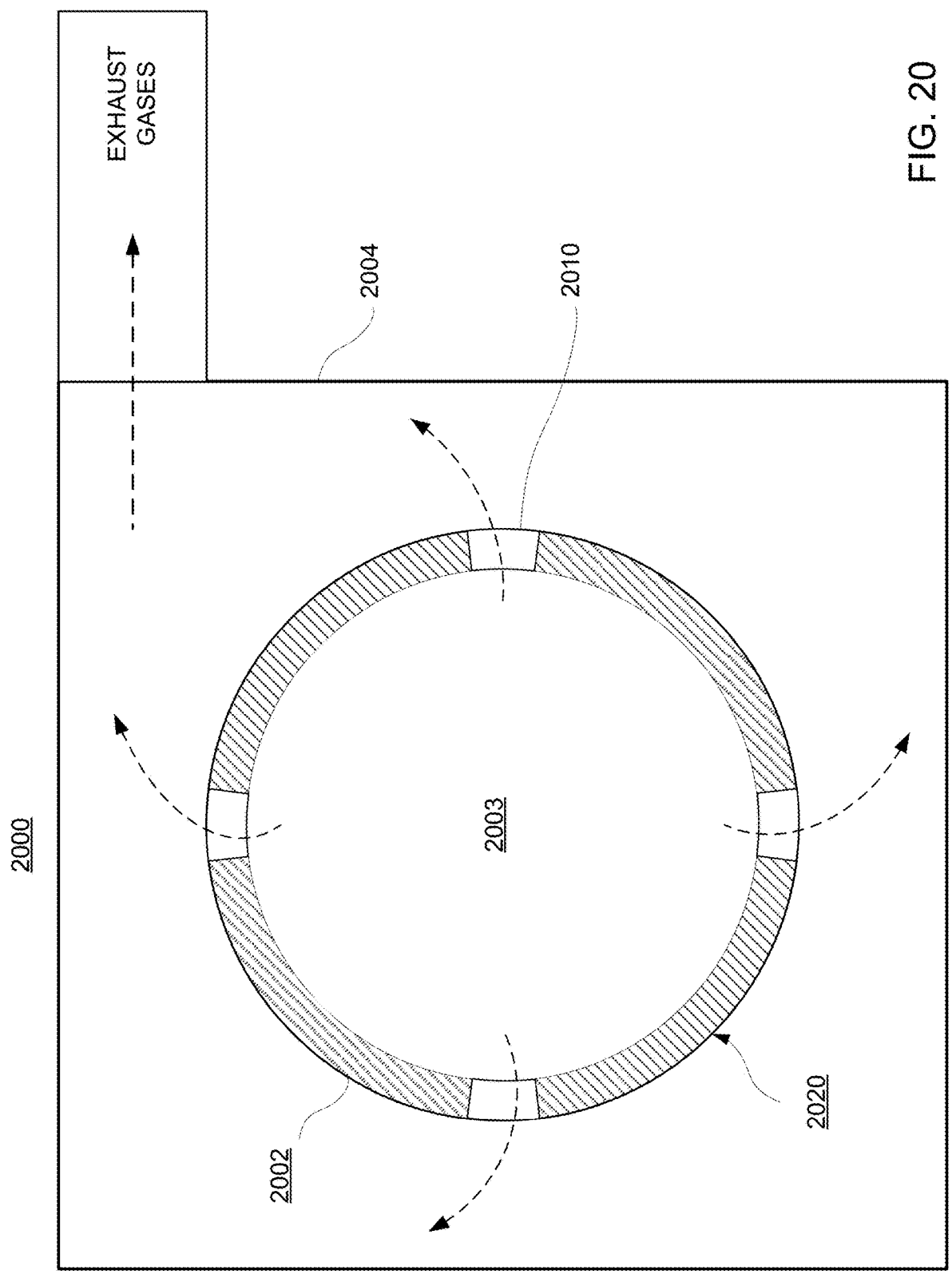
FIG. 20 shows a cross-sectional view of an illustrative integrated linear generator system portion, configured for exhaust gas, in accordance with some embodiments of the present disclosure.

FIG. 20 shows an axial cross-sectional view of illustrative integrated linear generator system portion 2000, configured for exhaust gas, in accordance with some embodiments of the present disclosure. Integrated linear generator portion 2000 includes cylinder 2002 and manifold 2004. Cylinder 2002 includes exhaust breathing ports 2010. While four exhaust breathing ports 2010 spaced ninety degrees apart are illustratively shown in FIG. 20 for clarity, any suitable number of exhaust breathing ports may be included at any suitable spacing and separation, in accordance with the present disclosure. Although shown as having a single outlet, an exhaust manifold may include any suitable number outlets (e.g., one or more outlets). Exhaust breathing ports may be shaped to reduce ring wear and/or, to direct the flow of exhaust (e.g., as described in the context of FIGS. 11 and 12). In some embodiments, the exhaust ports may include a plurality of small diameter holes or any other suitable shape, which may reduce piston ring wear and improve uniform flow into the manifold (e.g., as described in the context of FIGS. 8-12). Exhaust gas flows out of bore 2003 and enters manifold 2004, flowing into the volume between manifold 2004 and cylinder 2002 (referred to herein as the "manifold volume"), when the corresponding piston uncovers exhaust breathing ports 2010 and the pressure field directs flow from bore 2003 (e.g., during the breathing process). The flow in the manifold volume may be unsteady, due to the opening and closing of exhaust breathing ports 2010 by the piston (not shown in FIG. 20) during engine cycles. In some embodiments, the manifold volume, manifold geometry, or both, may be selected to enhance breathing, make the flow field more symmetric among exhaust breathing ports, reduce pressure loss, introduce swirl, or a combination thereof. Seal 2020 is configured to seal between manifold 2004 and cylinder 2002. For example, seal 2020 may include a gasket, an O-ring, a bead of cured sealant, a press-fit, any other suitable seal, or any combination thereof.

Figure 21:
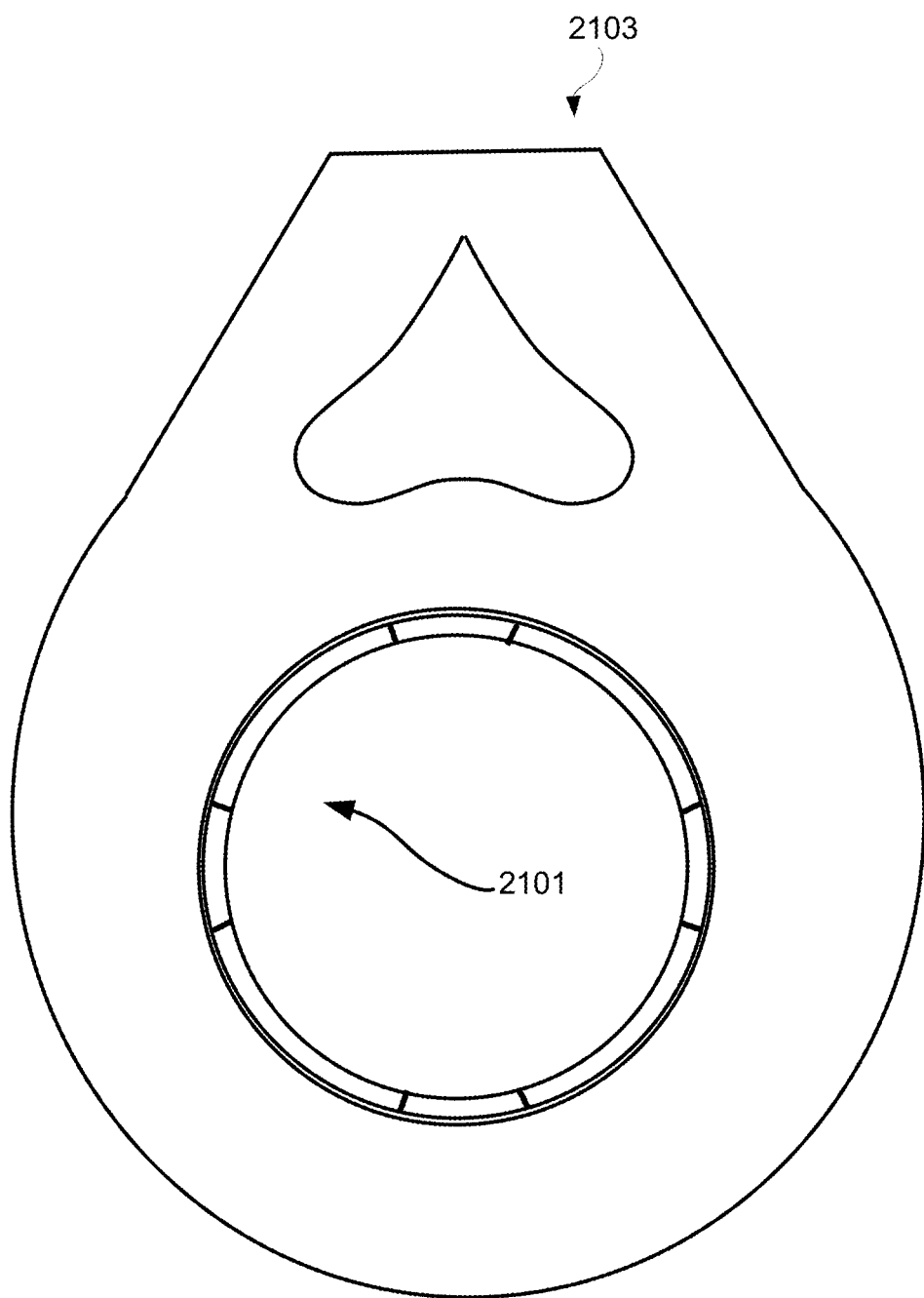
FIG. 21 shows a cross-sectional view of an illustrative exhaust manifold, in accordance with some embodiments of the present disclosure.

In some embodiments, the exhaust manifold and the exhaust breathing ports are designed to merge the flows from all of the exhaust breathing ports into one or more outlets with a desire to maintain a low pressure loss, an efficient transmission of pressure waves, a substantially uniform azimuthal pressure profile, a substantially uniform azimuthal temperature profile, or any combination thereof. In some embodiments, this performance is achieved by avoiding sharp bends or sudden changes in cross-sectional area of the manifold systems. In an illustrative example, each exhaust breathing port may include a respective flow channel bounded by one or more curved vanes extending from the cylinder port bridges. The curved vanes guide the flow of exhaust gas from each exhaust breathing port into an annular volute. The flow from each exhaust breathing port is merged sequentially with the volute, and its cross-sectional area increases along its length to accommodate the combined flows. The volutes (e.g., one, two, or more volutes) transition to a single outlet (e.g., a D-shaped outlet) having a total cross-sectional area at least as large as the combined area of the ports. FIG. 21 shows a cross-sectional view of illustrative exhaust manifold 2100, in accordance with some embodiments of the present disclosure. Exhaust manifold 1900 includes inner interface 2101 configured to seal against a cylinder, vanes 2102, and outlet 2103. In some embodiments, exhaust manifold 1900 is configured to maintain a sufficiently smooth (e.g., uniform) azimuthal pressure field, a sufficiently smooth (e.g., uniform) azimuthal temperature field, or both. For example, a more uniform pressure field may help maintain a more azimuthally uniform flow of exhaust gases (e.g., and thus more uniform convective heat of components). In a further example, a more uniform temperature field may help maintain a more azimuthally uniform temperature profile of components (e.g., and thus thermal expansion or deformation). In some embodiments, exhaust manifold 1900 helps eliminate or otherwise reduce bending of a translator (e.g., thus potentially causing misalignment and increased wear on bearing housings) due to the effects of uneven heating. In some embodiments, the exhaust system may include a translator cooling system to provide cooling to an exhaust translator. For example, a flow of compressed gas may be used to impinge or otherwise flow along a surface of the translator to provide convective cooling. In some embodiments, one or both the intake and exhaust translators are provided cooling gas to provide translator cooling. In some embodiments, the translator cooler may include features configured for preferential cooling of the surface of the translator. For example, the translator cooler may be configured to cool one or more surface areas of the translator preferentially over the one or more other surface areas of the translator. For example, the translator cooler may include features configured to preferentially cool a side or sides of the translator that are closest to exhaust manifold gas exit locations (e.g., the top right in FIG. 20 or the top in FIG. 21). In some embodiments, the translator cooler may include features configured for uniform cooling of a translator.

The gas spring (GS) system is configured to convert energy from the motion of the corresponding translators into potential energy used to at least slow the translators during an expansion stroke. In some embodiments, the GS system is used to at least partially return the translators (e.g., from BDC). In some embodiments, the GS system is used to partially return the translators (e.g., from BDC), provide compressed gas for use in other areas of the linear generator the system (e.g., the bearing system), or both. In some embodiments, the gas spring system is configured to store a sufficient amount of energy during an expansion stroke to at least fully return the translators (e.g., from BDC to TDC) for the subsequent stroke such that no net electrical input is required. For example, the gas of the gas spring may include air, which may be provided to air bearings that interface with one or more translators. The gas spring system may include a gas spring assembly (i.e., the hardware including a cylinder) which houses a gas spring (i.e., a volume of suitable gas which may be acted upon in the form of boundary work). For example, as the translators move away from TDC (i.e., outward from center), pressure in each respective gas spring increases (e.g., during a compression stroke of the gas spring and expansion stroke of a reaction section). The compression work done by the translator onto the gas spring is at least partially stored as internal energy of the gas in the gas spring. This stored energy may be subsequently converted to work (e.g., electrical energy) during the same stroke, a subsequent stroke (e.g., during an expansion of the gas spring), or both. In some embodiments, a control system is configured to manage the storage and release of energy in one or more gas springs. For example, in some embodiments, the control system is configured to manage the storage and conversion of energy in one or more gas springs to avoid the need for net electrical energy input over a stroke (i.e., provide net electromagnetic work output over a stroke), and thus the integrated linear generator system extracts net electrical energy from the generator assembly from each stroke of a cycle. In a further example, in some embodiments, the control system is configured to avoid the need to input electrical energy during a stroke, and is always extracting electrical energy during each stroke of a cycle. To illustrate, as a translator undergoes an expansion stroke, kinetic energy of the translator is both partially converted to electrical power by the LEM(s) and partially converted to internal energy stored in the gas spring. Further, as the translator undergoes a compression stroke, energy stored in the gas spring is partially converted to kinetic energy of the translator, which is partially converted to electrical energy by the LEM and partially converted to internal energy in the reaction section (e.g., used to compress the reaction mixture). In some embodiments, the control system is configured to provide net electrical energy to the generator assembly, for example, when the free piston linear generator is operating as a motor (e.g., during startup). For example, net electrical energy may be input to build up energy (e.g., kinetic, internal, and potential energy) in the linear generator system prior to the introduction of a fuel. In some embodiments, the LEM may be operated as an electric motor, in which case the control system is configured to supply electrical energy to the translator to move the translator to a desired position. For example, electric energy may be used by the stator to actuate or assist in the actuation of the translator to a desired position that is nearer or further than the position the translator would have reached without the input of the electric energy. In some embodiments, for which there is net electrical output over a cycle, there may be time intervals during the cycle when electrical energy is input to the generator assembly (e.g., short time periods of motoring rather than generating).

The gas spring system may include, for example, a pair of gas springs. Each gas spring assembly may include a gas spring cylinder having a bore, a cylinder head, a lower-pressure port, a higher-pressure port, valves, filters, sensors, any other suitable components, or any suitable combination thereof. In some embodiments, an integrated linear generator system may include a single gas spring assembly. For example, if a single translator is included, a single corresponding gas spring assembly may be included. In some such embodiments, a cylinder head may be included to seal the reaction section. In some embodiments, an integrated linear generator system may include two gas spring assemblies, and only one of the two gas spring assemblies includes a low-pressure port, high-pressure port, or both. In some embodiments, an integrated linear generator system includes two gas spring assemblies, each including a respective low-pressure port and a respective high-pressure port. In some embodiments, the lower-pressure ports of all the gas springs in an integrated linear generator system may be in fluid communication (e.g., connected via a common reservoir or piping), the higher-pressure ports of all the gas springs in an integrated linear generator system may be in fluid communication, or both. In some embodiments, the lower-pressure ports of some gas springs in an integrated linear generator system may be in fluid communication (e.g., connected via a common reservoir or piping), the higher-pressure ports of some gas springs in an integrated linear generator system may be in fluid communication, or both. In some embodiments, no lower-pressure ports are in fluid communication, no higher-pressure ports are in fluid communication, or both. In some embodiments, a higher-pressure port of one or more a gas springs may be used to partially or fully supply compressed gas for gas bearings used in the integrated linear generator system (e.g., translator bearings, anti-clocking bearings). In some embodiments, a lower-pressure gas spring outlet port may be used to partially or fully supply air to the intake system in order to reduce or eliminate power required by an intake boost blower. In some embodiments, a reservoir may be used to reduce pressure waves caused by the oscillation of the translators (e.g., from the backside of the gas spring piston). In some embodiments, a reservoir may comprise a lower-pressure inlet port that provides makeup air for the gas spring, a lower-pressure outlet port that supplies gas (e.g., air) to the intake system, or both. In some embodiments, the reservoir may be configured to reduce pressure waves, sound, noise, or any combination thereof (e.g., infrasound pressure waves).

Figure 22:
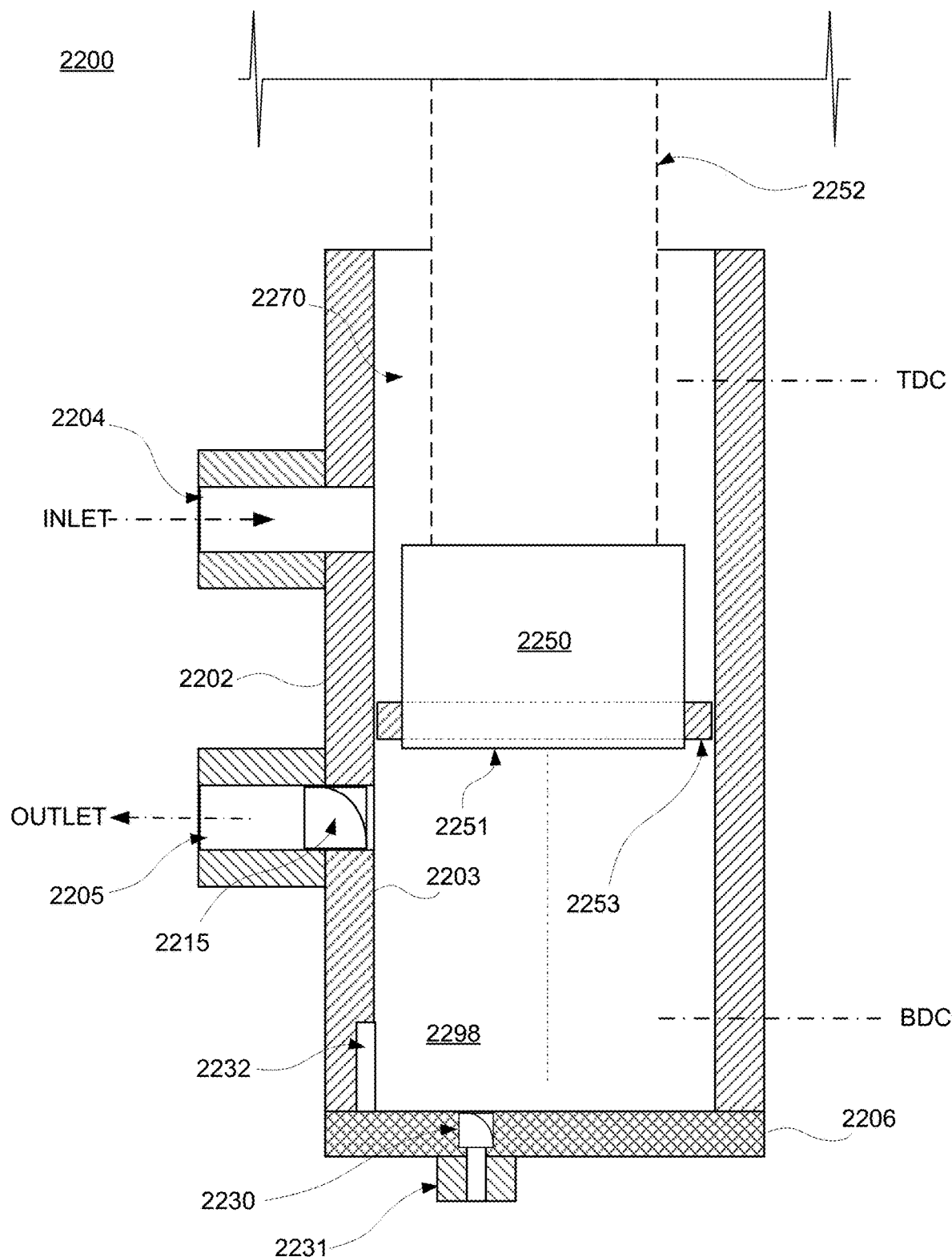
FIG. 22 shows a cross-sectional view of an illustrative gas spring system, in accordance with some embodiments of the present disclosure.

FIG. 22 shows a cross-sectional view of illustrative gas spring system 2200, in accordance with some embodiments of the present disclosure. Gas spring system 2200 includes gas spring cylinder 2202 having bore 2203, piston 2250 (e.g., part of translator 2252), lower-pressure port 2204, higher-pressure port 2205, valve 2215, and cylinder head 2206. In some embodiments, gas spring 2298 is the volume formed between piston face 2251 and gas spring cylinder 2202 and cylinder head 2206. Seal 2253 is configured to seal the gas between piston 2250 and bore 2203, although in some embodiments, seal 2253 is not needed. In some embodiments, seal 2253 includes a sealing ring assembly (e.g., formed from graphite, plastics, metals or other suitable materials and configured to wear against bore 2203, oiled sealing rings, or any other suitable sealing rings). In some embodiments, seal 2253 is configured for oil-less operation (e.g., sealing without the use of oil or liquid for lubrication). Gas spring 2298 is configured to store and release energy during compression and expansion, respectively, as the gas pressure in gas spring 2298 changes.

In some embodiments, lower-pressure port 2204 is configured to allow gas to flow into bore 2203, when piston 2250 (e.g., and seal 2253) uncovers lower-pressure port 2204. In some embodiments, lower-pressure port 2204 is configured for near atmospheric breathing (e.g., 1 atm±0.5 atm), during which atmospheric air at atmospheric pressure is drawn into bore 2203 (e.g., wherein the pressure in bore 2203 is lower than the atmospheric pressure). For example, at the end of a stroke as a translator moves from BDC to TDC (e.g., a gas spring expansion), the gas pressure in gas spring 2298 may be sub-atmospheric at or near BDC due to losses. To illustrate, mass loss may occur from gas spring 2298 past seal 2253 referred to herein as "blow-by," or through higher-pressure port 2205 via valve 2215 referred to herein as "higher-pressure breathing." In some embodiments, gas from behind seal 2253 (i.e., away from piston face 2251) may interact with lower-pressure port 2204. For example, in some circumstances, gas behind seal 2253 may flow between lower-pressure port 2204 and the volume behind piston 2250 (i.e., driver back section 2270). In some embodiments, driver back section 2270 is open to near atmosphere. In some embodiments, driver back section 2270 may be open to near atmospheric pressure (e.g., 1 atm±0.5 atm). In some embodiments, driver back section 2270 may be sealed from near atmospheric pressure. For example, a gas seal may seal between translator 2252 and gas spring cylinder 2202. In a further example, driver back section 2270 may be sized to reduce or limit compression work of gas within driver back section 2270 during strokes of a cycle. In some embodiments, lower-pressure port 2204 is configured for boosted air breathing, during which boosted air at higher than atmospheric pressure is drawn into bore 2203. For example, a boost blower may be used to supply inlet air (e.g., makeup air) to lower-pressure port 2204, which provides the makeup air to gas spring 2298. In some embodiments, lower-pressure port 2204 is located in cylinder head 2206 or near cylinder head 2206 (e.g., but still arranged in cylinder 2202). Any suitable number of lower-pressure ports 2204, having any suitable size, location, or both, may be included in a gas spring system. In some embodiments, lower-pressure port 2204 is valved, or otherwise controllable with respect to being "opened" or "closed." In some embodiments, lower-pressure port 2204 is configured to allow gas to exit gas spring 2298. For example, a gas spring system may include a first lower-pressure port for supplying makeup air to gas spring 2298, and a second lower-pressure port for delivering air from gas spring 2298. In an illustrative example, a lower-pressure port may be used to supply reaction intake air (e.g., at a suitable boost pressure by using a timed valve).

Higher-pressure port 2205 is configured to allow the gas of gas spring 2298 to exit bore 2203 when the gas pressure of gas spring 2298 is above a threshold. In some embodiments, valve 2215 is configured to prevent the flow of gas until the pressure of gas spring 2298 is above a threshold. The threshold may be, for example, the pressure downstream of valve 2215, a cracking pressure of valve 2215, or any other suitable threshold. In some embodiments, higher-pressure port 2205 is configured to provide higher-pressure gas to systems outside of bore 2203. For example, in some embodiments, higher-pressure port 2205 may be coupled to a gas bearing system and may supply bearing gas to the bearing system. Accordingly, in some embodiments, the gas spring system may also function as a gas compressor. Valve 2215 may include any suitable type of valve such as, for example, a check valve, a reed valve, or any other suitable passive (e.g., spring loaded) or active (e.g., actuated) valve. In some embodiments, the BDC position is nearer to head 2206 than higher-pressure port 2205. For example, in some embodiments, during a stroke to the BDC position, seal 2253 may move past higher-pressure port 2205, and accordingly gas spring 2298 may not significantly transmit pressure with higher-pressure port 2205. In some embodiments, gas from gas spring 2298 may flow through valve 2215 when the pressure in gas spring 2298 is above a threshold and seal 2253 is neither blocking higher-pressure port 2205 or nearer to head 2206 than higher-pressure port 2205. In an illustrative example, the peak pressure in gas spring 2298, achieved at or near BDC, may be twenty bar or more, while the gas exiting valve 2215 may be six bar or less. This example is merely illustrative, and any suitable position of higher-pressure port 2205 and BDC may be used, and any suitable pressures may be achieved (e.g., several bar to well over fifty bar) in gas spring 2298. Any suitable number of higher-pressure ports 2215, having any suitable size, location, or both, may be included in a gas spring system. Higher-pressure port 2205 may be arranged in cylinder 2202, cylinder head 2206, any other suitable component, or any combination thereof (e.g., multiple higher-pressure ports, or ports formed at interfaces of components).

In some embodiments, a gas spring system need not include a higher-pressure port. For example, a gas spring system may include a lower-pressure port to provide make-up air during a breathing process to counteract blow-by during compression and expansion of gas spring 2298 (e.g., to maintain near consistent cycle-to-cycle operation). In a further example, a lower-pressure port may include a valve (e.g., arranged in the gas spring cylinder or head), coupled to a gas source, supply, or reservoir, and configured to allow make-up gas to flow into the bore during a breathing process. A lower pressure port (e.g., a make-up-air port) may be arranged at any suitable location including, for example, in a cylinder head (e.g., configured to only open when the translator is near TDC) or cylinder wall.

In some embodiments, a gas spring system need not include a lower-pressure port. For example, in some embodiments, when piston 2250 is near the TDC position, air from behind piston 2250 (i.e., driver back section 2270 which is away from piston face 2251) may flow past seal 2253 into gas spring 2298.

In some embodiments, a gas spring system need not include a lower-pressure port or a higher-pressure port.

In some embodiments, gas spring system 2200 may include one or more features 2232 for removing energy from gas spring 2298, limiting peak pressure in gas spring 2298, limiting a compression ratio of gas spring 2298, limiting an expansion ratio of gas spring 2298, or a combination thereof. In some embodiments, gas spring system 2200 includes pressure-relief port 2231, which may optionally include, for example, pressure relief valve 2230. In some embodiments, pressure-relief valve 2230 is configured to open when the pressure in gas spring 2298 exceeds a threshold. For example, pressure-relief valve 2230 may include a spring-loaded valve that opens when pressure in gas spring 2298 is sufficient to counteract the spring force. Pressure relief port 2231 may be included to protect against over-pressure conditions in gas spring 2298 by releasing energy from gas spring 2298 (e.g., to reduce forces acting on translator 2252). Optional pressure relief port 2231 may be included in cylinder head 2206, gas spring cylinder 2202, or both. Any suitable number of pressure relief ports, having any suitable cracking pressure, may be included in a gas spring system.

In some embodiments, gas spring system 2200 includes pressure-relief relief feature 2232. For example, pressure relief feature 2232 may include one or more axial grooves or scallops included in the bore of cylinder 2202 configured to provide a leak path around seal 2253 (i.e., as blowby) if seal 2253 moves past pressure relief feature 2232 (e.g., to a more extreme BDC position). One or more of length, axial position, and depth of feature pressure relief 2232 may be configured to introduce and maintain the leak path for a predetermined position of piston 2250. In some embodiments, one or more pressure relief features 2232 may be included to provide pressure relief in gas spring 2298 without the need for mechanical or moving parts (e.g., such as pressure-relief valve 2230).

In some embodiments, seal 2253 allows backflow when the pressure in driver back section 2270 is greater than the pressure in gas spring 2298. For example, seal 2253 may seal against bore 2203 when the pressure in gas spring 2298 is greater than the pressure in driver back section 2270 (e.g., greater than, or greater than by a threshold). In a further example, when the pressure in gas spring 2298 is less than the pressure in driver back section 2270 (e.g., less than, or less than by a threshold), seal 2253 may allow gas from driver back section 2270 to flow into gas spring 2298 (i.e., backflow). To illustrate, in some such embodiments, where seal 2253 is configured to allow backflow, cylinder 2202 may need not include lower pressure port 2204. Make-up gas may enter gas spring 2298 from driver back section 2270 by flowing across seal 2253 when the pressure in driver back section 2270 is greater than (or greater than by a threshold) the pressure in gas spring 2298.

Figure 23:
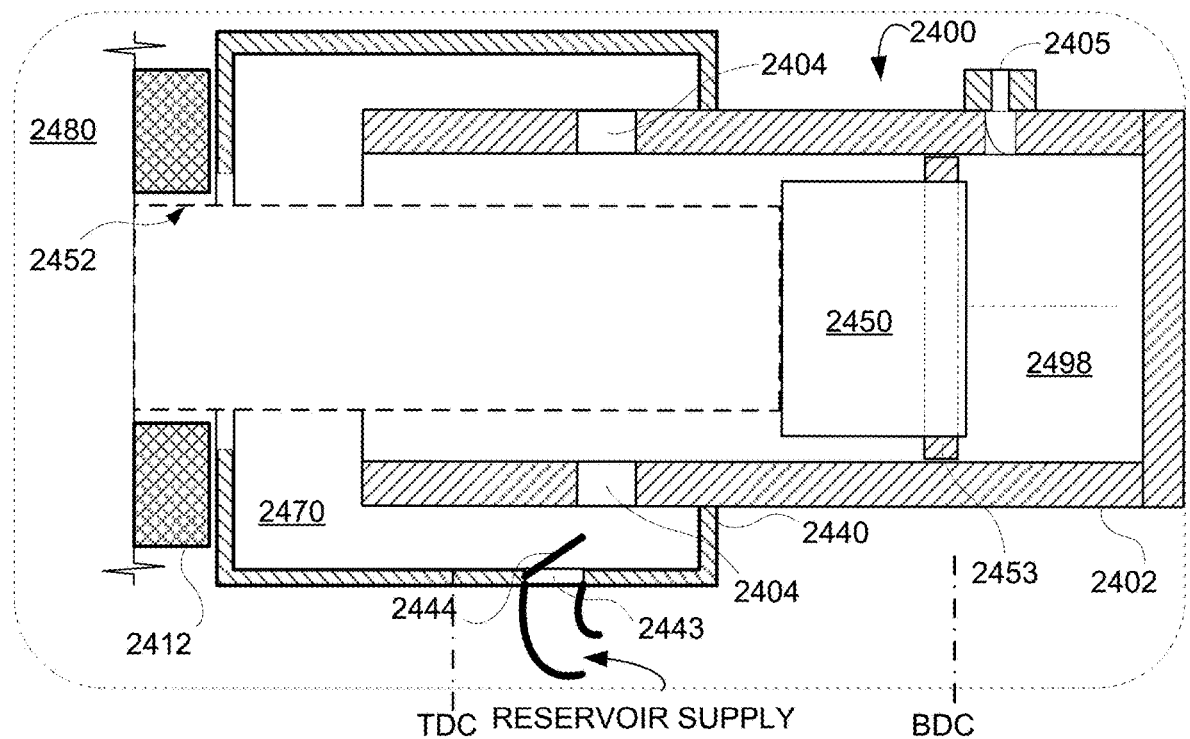
FIG. 23 shows a cross-sectional side view of an illustrative gas spring system, having a reservoir, in accordance with some embodiments of the present disclosure.
Figure 24:
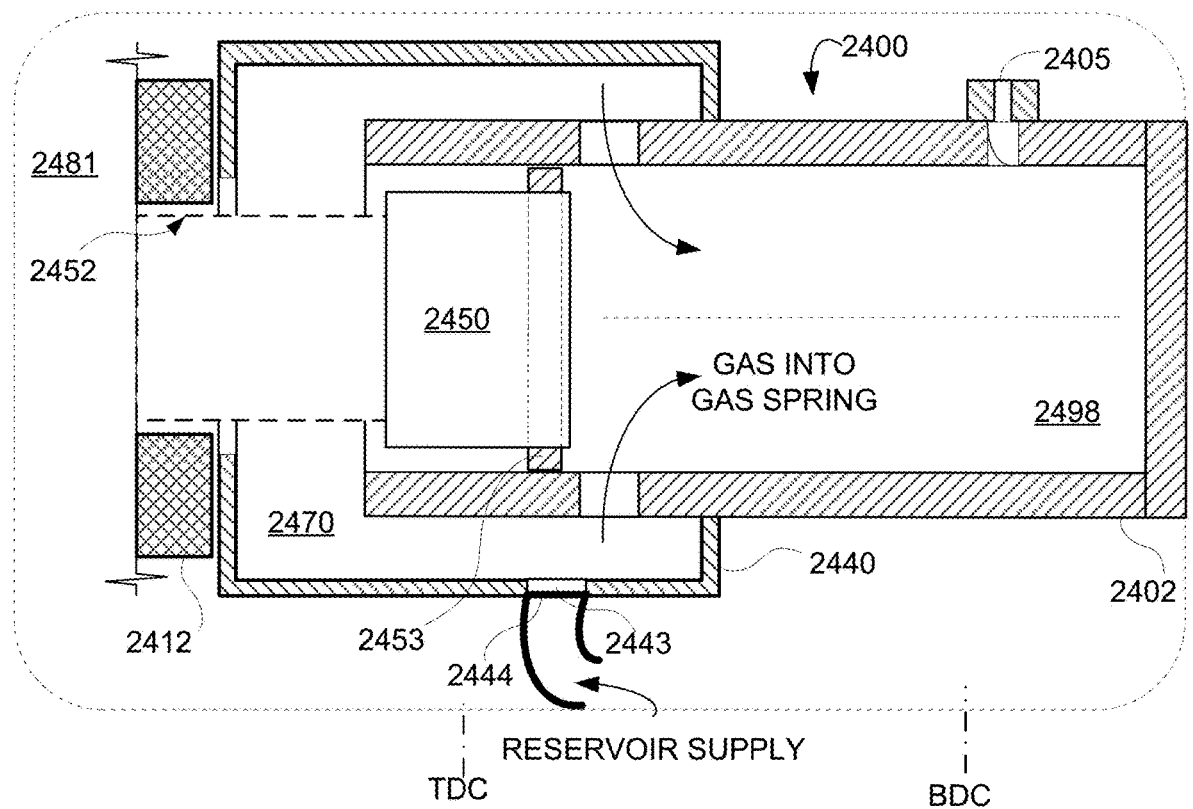
FIG. 24 shows a cross-sectional side view of the illustrative gas spring system of FIG. 23, with the translator at a second position, in accordance with some embodiments of the present disclosure.

FIG. 23 shows a cross-sectional side views of illustrative gas spring system 2400, having reservoir 2440, in accordance with some embodiments of the present disclosure. FIG. 24 shows illustrative gas spring system 2400 of FIG. 23, with the translator (e.g., including piston 2450) at a second position, in accordance with some embodiments of the present disclosure. Panel 2480 shows piston 2450 when the translator is near BDC, and panel 2481 shows piston 2450 when the translator is near TDC, which shows breathing ports 2404 open. In some embodiments, a gas spring system may include a reservoir configured to seal between cylinder 2402 of the gas spring and bearing housing 2412 of the gas spring. In some embodiments, a seal may be included to seal against a cylinder, a bearing housing, a stator, a structural frame, any other suitable component, or any combination thereof, that in turn seal against a bearing housing. For example, reservoir 2440 may be configured to seal against the stator (not shown) to react axial loads, and seal against bearing housing 2412 to reduce axial loads and provide radial compliance. In a further example, reservoir 2440 may seal against a structural frame (not shown), flange (not shown) of cylinder 2402, or any other suitable component. As illustrated, reservoir 2440 has an associated volume (e.g., volume 2470). As illustrated, gas spring system 2400 includes reservoir supply port 2443. For example, in some embodiments, ambient air (e.g., unconditioned from the environment, or optionally filtered, compressed, cooled, heated, or otherwise conditioned) is supplied via reservoir supply port 2443 (e.g., using reed valve 2444 as illustrated). In an illustrative example, reservoir 2440 may exhibit breathing behavior (e.g., with inflows and outflows occurring alternately) as gas is inducted into reservoir 2440 via reservoir supply port 2443 and then flows into gas spring 2498 via breathing ports 2404. In some embodiments, as illustrated, gas spring cylinder 2402 includes high-pressure port 2405. For example, high pressure port 2405 may be coupled to a gas bearing system and may be configured to provide pressurized gas to one or more gas bearings of the gas bearing system. In some embodiments, as piston seal 2453 uncovers breathing ports 2404, gas in volume 2470 of reservoir 2440 flows into gas spring 2498 via breathing ports 2404 (e.g., replenishing gas lost via high pressure port 2405, gas leakage past piston seal 2453, or both). In some such embodiments, gas in reservoir 2440 may be sized such that the pressure increases before flowing into gas spring 2498 via ports 2404. In some embodiments, reservoir 2440 is sealed against bearing housing 2412 (e.g., by an O-ring, gasket, tight tolerance, or any other suitable seal), thus effectively forming a seal against translator tube 2452 against flow out of reservoir 2440 (e.g., when the pressure in volume 2470 is less than a gas bearing pressure). As piston 2450 translates (e.g., gas spring 2498 expands and contracts), the pressure in volume 2470 may accordingly vary (e.g., generally having a pressure change opposite in sign of the change in pressure of gas spring 2498). The larger the volume 2470, the smaller changes in pressure in the volume 2470. For example, fluctuations in pressure of volume 2470 may be reduced by increasing volume 2470 (e.g., by increasing the size of reservoir 2440). Conversely, fluctuations in pressure of volume 2470 may be increased by decreasing volume 2470 (e.g., by decreasing the size of reservoir 2040). In some embodiments, reservoir 2440 is adjustable (e.g., volume 2470 is adjustable). For example, one or more tanks, bladders, or any other suitable components may be coupled to reservoir 2440 and may be opened, closed, or otherwise adjusted to adjust a total volume (e.g., volume 2470 plus an additional volume). In some embodiments, reservoir 2440 is itself adjustable, using any suitable mechanism, feature, or components. In some embodiments, reservoir 2440 is configured to seal against a structural frame (e.g., instead of bearing housing 2412).

In some embodiments, reservoir 2440 may be used to provide fuel compression. For example, natural gas or other suitable gaseous fuel may be supplied to volume 2270, and may undergo compression by the action of piston 2450, thus increasing the pressure of the fuel. In some embodiments, gas spring 2498 may be used to provide fuel compression. For example, fuel may be admitted to gas spring 2498 directly (e.g., gas spring 2498 consists of fuel), or compressed gas of gas spring 2498 may be used to compress fuel (e.g., using higher pressure port 2405 and a bladder or piston pump assembly).

FIG. 25 shows a cross-sectional side view of illustrative gas spring system 2500, having reservoir 2540 configured for intake compression, in accordance with some embodiments of the present disclosure. As illustrated, the system of FIG. 25 is similar to the system illustrated in FIGS. 22-24, with the addition of intake supply valve 2542 arranged at intake supply port 2541 and optionally intake supply tank 2544. As piston 2550 and seal 2553 move along axis 2570 in cylinder 2502, the pressure in reservoir volume 2570 may change. For example, as gas spring 2598 expands, the pressure in reservoir volume 2570 may increase, and as gas spring 2598 contracts, the pressure in reservoir volume 2570 may decrease. As illustrated, as the pressure in reservoir volume 2570 exceeds a cracking pressure of intake supply valve 2542, gas from reservoir volume 2570 flows through intake supply port 2541 into intake supply tank 2544, and then to the intake system. Accordingly, the driver back section (e.g., which includes reservoir volume 2570 and volume between translator 2552 and cylinder 2502) may be used to provide intake gas (e.g., intake air for the reaction cylinder), or otherwise pressurize intake gas to increase the boost pressure in the reaction cylinder (not shown in FIG. 25). In some embodiments, for example, the driver back section is used to pressurize intake gas to reduce or eliminate the need for an intake boost blower. In some embodiments, for example, the driver back section is used to pressurize intake gas in addition to an intake boost blower (e.g., gas from intake supply tank 2544 is provide to a boost blower of an intake system). In some embodiments, reservoir 2540 may include one or more filters before or after intake supply valve 2542, before or after intake supply tank 2544, before the intake system, or a combination thereof. In an illustrative example, reservoir 2540 may exhibit breathing behavior as gas is inducted into reservoir 2540 via reservoir supply port 2543 (e.g., shown with supply port valve 2544) and then flows into gas spring 2598 via breathing ports 2504 (e.g., which may be, but not be, controlled by optional valves 2580) and flows out of intake supply port 2541 to intake supply tank 2544. In some embodiments, an intake supply tank need not be included. For example, the volume of ducting from an intake supply port may include sufficient volume (e.g., to lessen pressure fluctuations from unsteady flow from the valve opening/closing) and a separate tank may not be needed.

FIG. 26 shows a side cross-sectional view of a portion of illustrative gas spring system 2600 having a reservoir, in accordance with some embodiments of the present disclosure. Translator 2620 is configured to move along the indicated axis. Bearing housing 2630 forms bearing gap 2631 with a surface of translator 2620 (e.g., to form a gas bearing). Translator 2620, which includes seal 2621, and cylinder 2602 define gas spring 2697 (e.g., the sealed volume that acts as a spring). In some embodiments, the portion of translator 2620 that defines gas spring 2697 is a separate but attached piston assembly (shown in FIG. 26 as an integrated part of translator 2620) including seal 2621. Gas spring port 2604, when open (e.g., seal 2621 uncovers gas spring port 2604, as illustrated), is configured to allow gas to enter gas spring 2697 from a gas spring supply (e.g., which may include atmospheric air, compressed air, or other suitable gas supply). Gas spring port 2604 may be open or valved (e.g., with one or more passive valve, with one or more valves controlled by a control system, or any combination thereof). Reservoir 2640, as illustrated, seals against stator 2650, bearing housing 2630 and cylinder 2602 to define volume 2641. Reservoir port 2642 is configured to allow gas to enter volume 2641. Reservoir port 2643 is configured to allow gas to exit volume 2641. In some embodiments, reservoir ports 2642 and 2643 are each valved (e.g., with one or more passive valve, with one or more valves controlled by a control system, or any combination thereof). For example, reservoir port 2643 may be configured to allow gas from volume 2641 to flow to an intake system (not shown) to provide boosted intake air, to a gas spring inlet port (e.g., gas spring port 2604), or both. In some embodiments, reservoir port 2642 (an inlet port) need not be included and only reservoir port 2643 (an outlet port) may be included. For example, gas spring inlet port 2604 can provide make up air to the gas spring 2697 when gas spring inlet port 2604 is open to the gas spring (e.g., when seal 2621 is at a position closer to TDC, as shown in FIG. 26) and also provide air to reservoir 2641 when gas spring inlet port 2604 is closed to the gas spring (and therefore open to reservoir 2641). In some embodiments, reservoir port 2642 (an inlet port) need not be included and reservoir port 2643 (an outlet port) need not be included.

FIG. 27 shows a side cross-sectional view of a portion of illustrative gas spring system 2700 having a reservoir, in accordance with some embodiments of the present disclosure. Translator 2720 is configured to move along the indicated axis. Bearing housing 2730 forms bearing gap 2731 with a surface of translator 2720 (e.g., to form a gas bearing). Translator 2720, which includes seal 2721, and cylinder 2702 define gas spring 2797. In some embodiments, the portion of translator 2720 that defines gas spring 2797 is a separate but attached piston assembly (shown in FIG. 27 as an integrated part of translator 2720) including seal 2721. Gas spring port 2704, when open (e.g., seal 2721 uncovers gas spring port 2704, as illustrated), is configured to allow gas to enter gas spring 2797 from volume 2741. Gas spring port 2704 may be open or valved (e.g., with one or more passive valve, with one or more valves controlled by a control system, or any combination thereof). Reservoir 2740, as illustrated, seals against stator 2750, bearing housing 2730 and cylinder 2702 to define volume 2741. Reservoir port 2742 is configured to allow gas to enter volume 2741. Reservoir port 2743 is configured to allow gas to exit volume 2741. In some embodiments, reservoir ports 2742 and 2743 are each valved (e.g., with one or more passive valve, with one or more valves controlled by a control system, or any combination thereof). Gas spring system 2700 allows gas in volume 2741 that is compressed as translator 2720 moves from BDC towards TDC to flow into gas spring port 2704, when open, at an increased pressure. For example, reservoir port 2743 may be configured to allow gas from volume 2741 to flow to an intake system (not shown) to provide boosted intake air.

FIG. 28 shows a side cross-sectional view of a portion of illustrative gas spring system 2800 having a reservoir, in accordance with some embodiments of the present disclosure. Translator 2820 is configured to move along the indicated axis. Bearing housing 2830 forms bearing gap 2831 with a surface of translator 2820 (e.g., to form a gas bearing). Translator 2820, which includes seal 2821, and cylinder 2802 define gas spring 2897. In some embodiments, the portion of translator 2820 that defines gas spring 2897 is a separate but attached piston assembly (shown in FIG. 28 as an integrated part of translator 2820) including seal 2821. Gas spring port 2804, when open (e.g., seal 2821 uncovers gas spring port 2804, as illustrated), is configured to allow gas to enter gas spring 2897 from volume 2841. Gas spring port 2804 may be open or valved (e.g., with one or more passive valve, with one or more valves controlled by a control system, or any combination thereof). Reservoir 2840, as illustrated, seals against stator 2850, bearing housing 2830 and cylinder 2802 to define volume 2841. Reservoir port 8242 is configured to allow gas to enter volume 2841. In some embodiments, reservoir port 2842 is valved (e.g., with one or more passive valve, with one or more valves controlled by a control system, or any combination thereof).

In some embodiments, the flow path of gas to or from reservoirs 2641, 2741, or 2841 is used to cool one or more components such as, for example, encoder read heads, encoder strips/tape, any other suitable component, or any combination thereof. For example, an encoder read head may be located on a gas spring cylinder or a bearing housing contained at least partially within a reservoir, and the gas flow into or from the reservoir may be used to cool the read head. In another example, encoder strips or tape may be located on a translator that moves at least partially within a reservoir, and the gas flow into or from the reservoir may be used to cool the encoder strips or tape.

Figure 29:
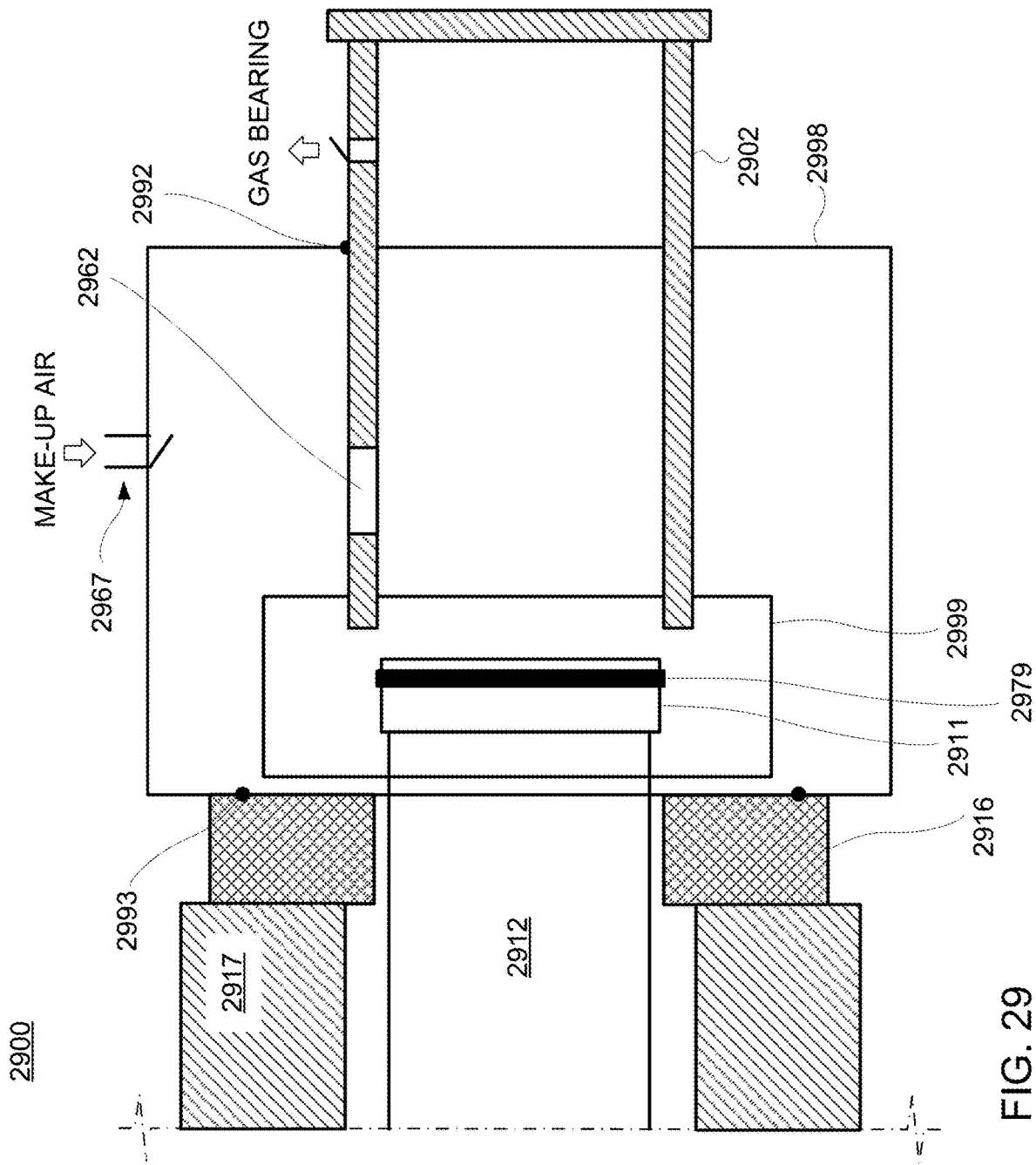
FIG. 29 shows several perspective views of an illustrative gas spring system, in accordance with some embodiments of the present disclosure.

FIG. 29 shows a view of an illustrative gas spring system of integrated linear generator system 2900, in accordance with some embodiments of the present disclosure. Cylinder 2902, as illustrated, includes port 2962 (e.g., for receiving gas spring make-up gas) and port 2963 (e.g., for providing gas for gas bearings to bearing housing 2916 of integrated linear generator system 2900). Reservoir 2998, as illustrated, seals to cylinder 2902 using seal 2992, and seals to bearing housing 2916 using seal 2993. Bearing housing 2916, as illustrated, is coupled to stator 2917 (e.g., using one or more mounts, flexures, or other components not shown). Translator tube 2912 and piston 2911 with seal 2979 are configured to move axially along gas spring cylinder 2902. As illustrated, piston 2911 is positioned axially out of cylinder 2902 for maintenance, inspection, or repair. Hatch 2999 is removable, allowing access to piston 2911, seal 2979, and an end of translator tube 2912. For example, hatch 2999 affixes to reservoir 2998 (e.g., using fasteners, a clamp, a sliding interface, a hinge, or any other suitable affixment) during operation, and may seal against reservoir 2998. Reservoir 2998 may include port 2967 for receiving make-up gas for providing to port 2962.

Figure 30:
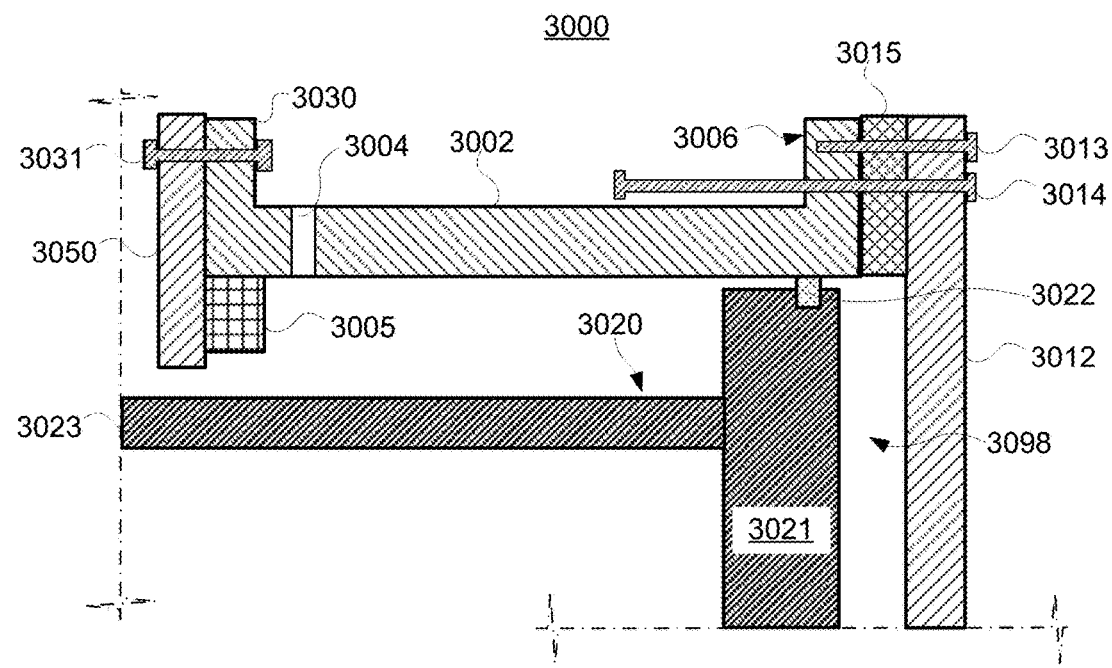
FIG. 30 shows a side cross-sectional view of an illustrative gas spring cylinder assembly, in accordance with some embodiments of the present disclosure.
Figure 31:
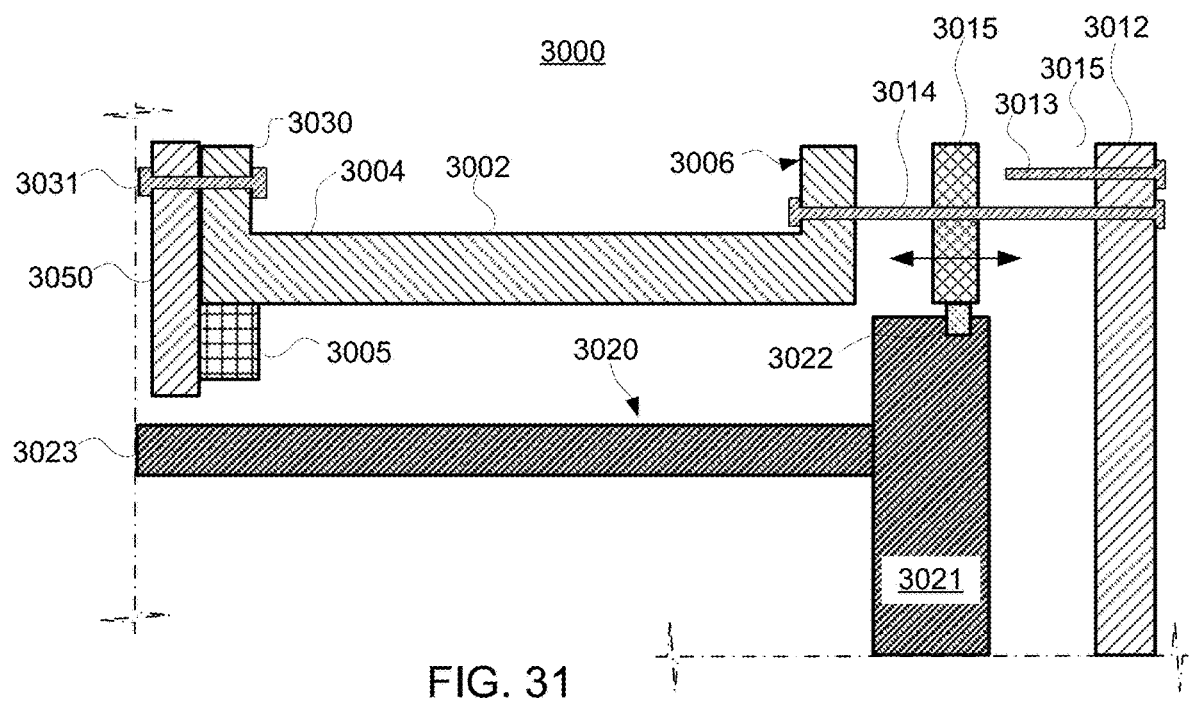
FIG. 31 shows a side cross-sectional view of the illustrative gas spring cylinder assembly of FIG. 30, opened using slide bushings, in accordance with some embodiments of the present disclosure.

FIG. 30 shows a side cross-sectional view of illustrative gas spring cylinder assembly 3000, in accordance with some embodiments of the present disclosure. Gas spring cylinder assembly 3000 includes cylinder 3002, head 3012, spacer 3015, energy absorber 3005, and breathing ports 3004. Cylinder 3002 includes flange 3006, which is affixed to head 3012 by fasteners 3013. Spacer 3015 is arranged axially between flange 3006 and head 3012. Flange 3006, spacer 3014, and head 3012 have corresponding recesses to accommodate slid bushings 3014 (e.g., described further in the context of FIG. 31). Energy absorber 3005 is arranged radially inside of cylinder 3002, as illustrated. If translator 3020 travels sufficiently far inboard (e.g., toward the center of the corresponding generator assembly), it will contact and deform energy absorber 3005, which is configured to convert kinetic energy of the translator. Cylinder 3002 includes flange 3030 for mounting to frame system 3050, by fasteners 3031. In some embodiments, spacer 3015 may be included to affect compression ratio of gas spring 3098. FIG. 31 shows a side cross-sectional view of illustrative gas spring cylinder assembly 3000, opened using slide bushings 3014, in accordance with some embodiments of the present disclosure. Slide bushings 3014 allow head 3012, spacer 3015, or both, to be axially removed a distance from flange 3006 (e.g., when fasteners 3013 are removed or otherwise loosened). In some embodiments, the distance is sufficient to allow seal removal, installation, and inspection of piston 3021, seal 3022, tube 3023, any other suitable hardware, or a combination thereof. For example, cylinder 3002 may be separated by any suitable length from the assembled position, which is sufficient for inspection, maintenance, and repair, or any combination thereof. In some embodiments, spacer 3015 is configured to function as a ring compressor (e.g., for removing a ring, installing a ring, replacing a ring, inspecting a ring, or any combination thereof).

The bearing system is configured to constrain motion (primarily radially) of a translator, with low frictional losses. The bearing system may include, for example, contact bearings, non-contact bearings, or a combination thereof, or any other suitable means for supporting translator movement while providing low friction. In some embodiments, the bearing system includes a gas bearing system configured to, for example, provide a layer of gas against the translators to function as a gas bearing for frictionless, near frictionless, or low friction movement of the translator. For example, the gas bearing system may maintain a layer of pressurized gas between the translator and a bearing surface on which the translator moves.

Figure 32:
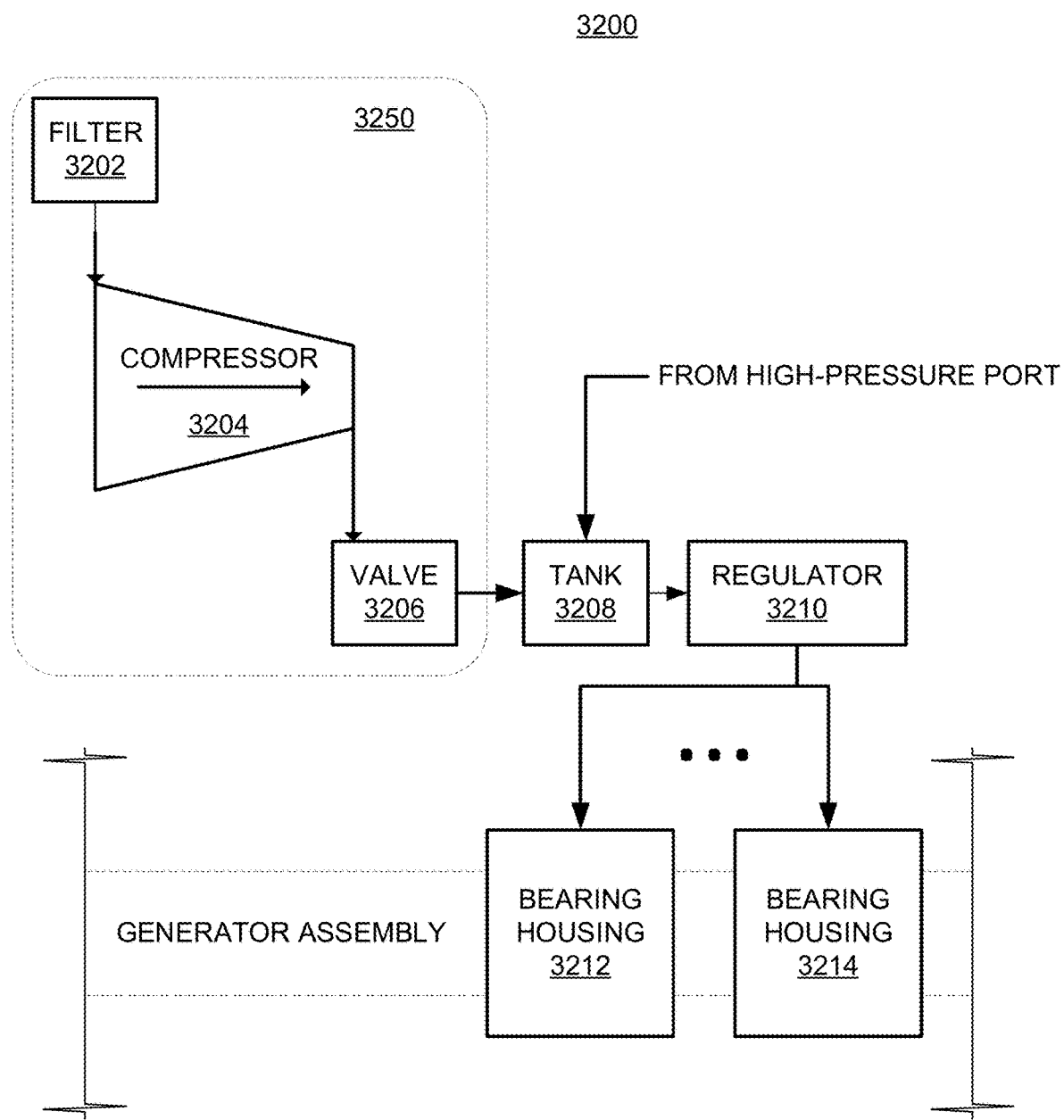
FIG. 32 shows a system diagram of an illustrative bearing system, in accordance with some embodiments of the present disclosure.

FIG. 32 shows a system diagram of illustrative bearing system 3200, in accordance with some embodiments of the present disclosure. The bearing system includes, for example, one or more bearing housings (e.g., bearing housings 3212 and 3214), regulator 3210, tank 3208, optional auxiliary bearing gas supply system 3250 with corresponding filters, compressors, valves, plumbing, sensors, any other suitable components, or any suitable combination thereof.

Bearing housings 3212 and 3214 include, for example, a bearing surface (e.g., which may be porous, include orifices, or both) configured to interface to a gas bearing, which in turn, interfaces to a translator. In some embodiments, bearing housings are mounted to a stator. Accordingly, in some such embodiments, alignment of the bearing housings and the stator is maintained (e.g., lateral and axial alignment), which allows linear motion of the translators along the axis of the linear generator. In some embodiments, the bearing housings include a feature for adjustment of alignment between the bearing housing and translator, a feature for adjustment of alignment between bearing housings, or both. In some embodiments, the bearing housing may include a feature to automatically adjust for expansion and contraction of the translator tube (e.g., due to thermal expansion or contraction, due to pressure forces). Bearing housings 3212 and 3214 are configured to provide bearing gas to the gas bearing via, for example, orifices (e.g., of any suitable cross section) fed from a common supply or multiple supplies, a porous layer fed from a common gas supply or multiple gas supplies, or a combination thereof. In some embodiments, bearing housings 3212 and 3214 are configured to substantially azimuthally surround (e.g., not necessarily azimuthally continuous) a corresponding translator. In some embodiments, a translator tube may include a bearing surface (e.g., a polished or otherwise smooth surface) configured to interface to the gas bearing. In some embodiments, the inner surface of the bearing housing may be coated with a low-friction material (e.g., abradable powder coating, graphite-based coating, ceramic-based coating) to minimize damage to the translator surface or bearing surface (e.g., scraping or galling) in the event of surface to surface contact. In some embodiments, bearing housings 3212 and 3214 are configured to partially azimuthally surround a corresponding translator.

Optional tank 3208 is configured to provide an enclosed volume to accumulate bearing gas, thus reducing fluctuations in the bearing gas supply. In some embodiments, for example, tank 3208 is configured to receive bearing gas from a high-pressure port of a gas spring system (e.g., high-pressure port 2205 of FIG. 22, high-pressure port 2405 of FIGS. 23-24, or high-pressure port 2505 of FIG. 25), auxiliary system 3250, or both. In some embodiments, the auxiliary system 3250 may supply all the bearing gas to bearing housing 3212 and bearing housing 3214. For example, during start up or shut down or during maintenance events, auxiliary supply system 3250 may provide all of the bearing gas to the bearing housings (e.g., when the gas spring system is unable to provide a minimum required flow of bearing gas, or when the gas spring system is unable to provide bearing gas at or above a required pressure). Optional regulator 3210 acts as a pressure regulator to deliver bearing gas at a constant, or near constant, pressure to bearing housings 3212 and 3214. Regulator 3210 may include any suitable type of pressure regulator (e.g., active or passive), flow restriction (e.g., an orifice, passive valve, or controllable valve), any other suitable equipment, or any combination thereof. In some embodiments, a filter (not shown in FIG. 32) is included upstream or downstream of regulator 3210. In some embodiments, regulator 3210 may be controllable (e.g., manually or remotely) to adjust pressure to bearing housings 3212 and 3214. In some embodiments, tank 3208, regulator 3210, or both, need not be included, and bearing gas from a source may be delivered directly to bearing housings 3212 and 3214. Tank 3208 may include any suitable pressure vessel such as, for example, a tank, a pipe, a box, a plenum, or any other suitable component configured to reduce or limit fluctuations in gas pressure. In some embodiments, tank 3208 may be implemented using a structural frame of an integrated linear generator system. For example, the structural frame may include hollow members (e.g., lateral members, end members, tubes, or otherwise) that are configured to accommodate pressurized gas (e.g., bearing gas).

While air is a convenient bearing gas because, for example, air is abundant and in general readily available, any suitable gas may be used as the bearing gas, in accordance with the present disclosure. In some embodiments, bearing gas is preferred to be sufficiently dry (e.g., non-condensing), sufficiently clean, and available to be compressed to a pressure suitable for a desired gas bearing performance. The stiffness of the gas bearing may depend on a pressure of the gas bearing (e.g., higher pressure in the gas bearing may provide more stiffness, up to an instability limit). In some embodiments, the bearing housings 3212 and 3214 may be configured to allow condensed liquid (e.g., water) to accumulate in the bearing housings, drain from the bearing housings, or both.

In some embodiments, the gas bearing system may be coupled to a high-pressure port of a gas spring system (e.g., high-pressure port 2205 of FIG. 22, high-pressure port 2405 of FIGS. 23-24, or high-pressure port 2505 of FIG. 25). For example, compressed gas from the gas spring may be extracted from the gas spring during high-pressure breathing, optionally conditioned, and used as the bearing gas. In some embodiments, high-pressure ports of one or more gas springs may be coupled to a reservoir such as tank 3208 that may supply one or more gas bearings. In some embodiments, high-pressure ports of one or more gas springs located on one or more linear generator systems within the same package may be coupled together through a common reservoir or other means, and configured to supply gas to one or more gas bearings of the one or more linear generator systems within the same package. In some such embodiments, no external gas compressor may be required (e.g., but may optionally be included, particularly for startup), thus avoiding the need to include further mechanical systems. In some embodiments, an external gas compressor is included and used only for during start-up, shut-down, or maintenance of the linear generator assembly (e.g., when the pressure in the gas springs is insufficient to supply gas to the gas bearings). Tank 3208 is configured and sized to lessen pressure fluctuations of gas from the high-pressure port which may be pulsed due to the nature of the higher-pressure breathing process (e.g., via valve 2215 of FIG. 22).

In some embodiments, auxiliary system 3250 is configured to optionally supply bearing gas to a gas bearing. For example, in some embodiments, during startup of the linear generator, the gas spring system may not yet provide enough gas to act as a gas bearing (e.g., to have sufficient bearing stiffness), and auxiliary system 3250 may be used to provide bearing gas at a suitable pressure. In some such embodiments, auxiliary system 3250 is de-activated once the gas spring system can provide sufficient bearing gas, although in some embodiments, auxiliary system 3250 may remain in a standby mode or continue to provide at least some bearing gas (e.g., to supplement the gas spring system). In a further example, auxiliary system 3250 may be configured to provide bearing gas at a suitable pressure and flow during a maintenance event when the linear generator system is substantially off (e.g., not producing power)

Figure 33:
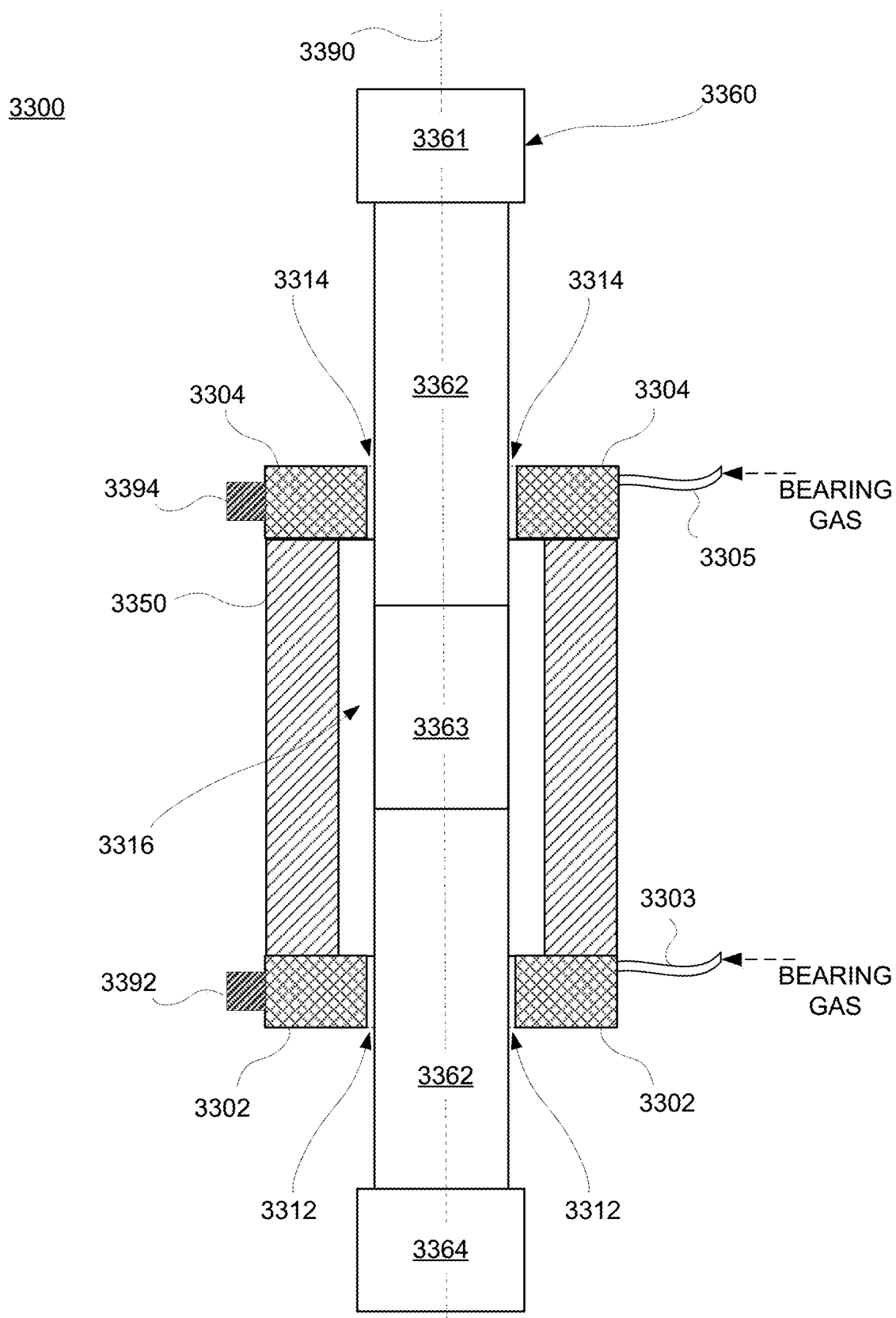
FIG. 33 shows a cross-sectional view of an illustrative generator assembly portion, in accordance with some embodiments of the present disclosure.

Referring to FIG. 2, bearing housings 216, 217, 226, and 227, or a subset thereof, may be fed from a single bearing gas source such as, for example, high-pressure ports 2305, 2405, or 2505 of FIGS. 23, 24, and 25, respectively, auxiliary system 2950, or both. In some embodiments, for example, any of bearing housings 216, 217, 226, and 227 of FIG. 2 may be fed by either gas spring 298 or gas spring 299. In some embodiments, any gas spring located within a package may be fed by any gas spring located within the same package, wherein a package may include one or more generator assemblies. FIG. 33 shows a cross-sectional view of generator assembly portion 3300, in accordance with some embodiments of the present disclosure. Generator assembly portion 3300 includes a partial assembly of an integrated linear generator system, including translator 3360, stator 3350, bearing housings 3302 and 3304, and gas bearings 3312 and 3314. Translator 3360 includes tube 3362 acting as the rigid body coupling pistons and other components to form a rigid translator, piston 3361 configured to contact a reaction section, piston 3364 configured to contact a gas spring, and section 3363 configured to interact electromagnetically with stator 3350. Although discussed as a tube, tube 3362 may have any suitable cross-sectional shape, and accordingly gas bearings 3312 and 3314 may have a corresponding shape. For example, in some embodiments, tube 3362 may have a rectangular cross section, and accordingly gas bearings 3312 and 3314 may be flat rather than annular. In some embodiments, translator 3360 includes one or more taper regions over at least a portion of its length. For example, translator 3360 may be subject to high temperature heat transfer from the reaction piston 3361. As a result of the high temperatures, translator 3360 may experience thermal expansion beyond a maximum allowable air bearing clearance. In some embodiments, translator 3360 may include one or more tapered sections to compensate for translator thermal expansion, allowing the translator and air bearing to function across a range of operating conditions.

Bearing housings 3302 and 3304 are configured to receive bearing gas from feed line(s) 3303 and 3305, respectively, and form respective gas bearings 3312 and 3314. For example, referencing a tubular geometry, each of bearing housings 3302 and 3304 may include a bearing surface arranged at a radially inward surface, configured to interface to respective annular gas bearings 3312 and 3314. Tube 3362 may include a cylindrical bearing surface configured to interface to annular gas bearings 3312 and 3314. During operation, gas bearings 3312 and 3314 allow translator 3360 to move along axis 3390 with low, near-zero, or zero friction, and prevent substantial lateral (e.g., radial) motion off from axis 3390. For example, gas bearings 3312 and 3314 may be configured to maintain motor air gap 3316 between stator 3350 (e.g., iron and copper portions thereof) and section 3363 during operation. It will be understood that gas bearings 3312 and 3314, and motor air gap 3316 may have any suitable thickness. For example, in general the thicknesses are preferred to be as thin as possible while ensuring reliable operation. Feed line(s) 3303 and 3305 may include one or more pipes, tubes, hoses, plenums, any other suitable conduit, any suitable fittings, or any combination thereof configured to deliver bearing gas to bearing housings 3302 and 3304, respectively. For example, in some embodiments, feed lines 3303 and 3305 may include a flexible hose or a rigid tube coupling a tank (e.g., tank 3208 of FIG. 32) to respective bearing housings 3302 and 3304. In some embodiments, as illustrated, bearing housings 3302 and 3304 include respective drainage lines 3392 and 3394 configured to allow condensate removal based on gravity, pressure (e.g., via purging by pressurized bearing gas), or temperature (e.g. via condensate evaporation). Drainage lines 3392 and 3394 may include, for example, valving, piping, hosing, tubing, fittings, sensors, condensate evaporation plates, and any other suitable components for removing condensate from a bearing housing, or any combination thereof. In some embodiments, drainage lines 3392 and 3394 may be arranged on respective bearing housings 3302 and 3304 to allow condensate removal using gravity (e.g., be arranged at or near a bearing housing to allow condensed phases to flow out when a drainage port is opened, with or without bearing gas pressure above atmospheric pressure). In some embodiments condensate from drainage lines 3392 and 3394 is removed from a linear generator assembly or package enclosing a linear generator assembly in a liquid state, a vapor stator, or both. For example, condensate from lines 3392 and 3394 may be transferred from a linear generator assembly or package enclosing a linear generator assembly as a liquid to the environment or to a reservoir. In a further example, condensate from lines 3392 and 3394 may be transferred from a linear generator assembly or package enclosing a linear generator assembly as a vapor in the exhaust from the linear generator assembly or the package enclosing the linear generator assembly (e.g., via evaporation).

In some embodiments, one or both of bearing housings 3302 and 3304 are rigidly affixed to stator 3350. For example, rigidly affixing bearing housings 3302 and 3304 to stator 3350 may help in counteracting lateral (e.g., radial) loads on translator 3360. In some embodiments, one or both of bearing housings 3302 and 3304 may be affixed to stator 3350 via one or more flexures (e.g., having prescribed a stiffness in one or more directions), fixtures, mounts, fasteners, any other suitable hardware, or any combination thereof. For example, a bearing housing may be affixed to a flexure, which is in turn coupled to the stator (e.g., by a mount), and the flexure may allow the bearing housing to pitch, yaw, or otherwise conform to the translator while maintaining alignment. In some embodiments, one or both bearing housings 3302 and 3304 need not be affixed to stator 3350 and may be affixed to a driver cylinder, a reaction cylinder, any other suitable component of the linear generator system, or to any combination thereof. In some embodiments, one or both of bearing housings 3302 and 3304 may be affixed to stator 3350, a driver cylinder, a reaction cylinder, any other suitable component of the linear generator system, or to any combination thereof.

To illustrate, the cantilever design of the translator/air bearing system provides minimal constraints on the translator which makes the design and manufacturing of the product more tolerant to for example misalignments. In some embodiments, one or both of bearing housings 3302 and 3304 may be affixed to a reaction cylinder or a gas spring cylinder. In some embodiments, one or both bearing housings 3302 and 3304 may be affixed to an external frame, housing, or block of the linear generator assembly.

In some embodiments, bearing gas is configured to exit bearing housings 3302 and 3304 (e.g., to form respective gas bearings 3312 and 3314) in substantially the radially inward direction (i.e., streamlines directed towards axis 3390). Bearing gas may flow through porous sections of bearing housings 3302 and 3304, ducts and orifices within bearing housings 3302 and 3304, or a combination thereof, to reach respective gas bearings 3312 and 3314. In some embodiments, bearing housings 3302 and 3304 may include a coating, a consumable layer, a dry film lubricant, or a combination thereof, at corresponding bearing surfaces to accommodate, for example, contact with translator 3360. In some embodiments, a bearing housing extends fully and continuously azimuthally around a translator (e.g., 360°). In some embodiments, a bearing housing includes one or more bearing segments that extend for an azimuthal range around a translator. For example, a bearing housing may include four bearing segments spaced at ninety degrees around the translator, with azimuthal gaps in between the bearing segments. A bearing housing may include any suitable number of bearing segments having any suitable number of gaps, and arranged in any suitable configuration, around a translator.

In some embodiments, translator 3360 may include one or more features that may engage with corresponding features of stator 3350, bearing housing 3302, bearing housing 3304, or a combination thereof, to substantially lock translator 3360 in place (e.g., axially, radially, azimuthally, or a combination thereof). For example, when not in operation (e.g., during maintenance, inspection, or repair), translator 3360 may be arranged at a suitable axial position relative to stator 3350 and locked in place. Translator 3360 may include a feature (e.g., a blind hole, a through hole, a notch, a slot, a pin, a surface, any other suitable boss feature or recess feature, or any combination thereof), which may be engaged by a corresponding feature to prevent displacement of translator 3360 in one or more directions. For example, translator 3360 may include one or more blind holes, which are configured to engage with one or more pins that prevent axial motion of translator 3360. In a further example, translator 3360 may include one or more notches which are configured to engage with one or more pins that prevent axial motion of translator 3360.

FIG. 34 shows a cross-sectional view of illustrative generator assembly portion 3400, in accordance with some embodiments of the present disclosure. Generator assembly portion 3400 includes a partial assembly of an integrated linear generator system, including cylinder 3402 (e.g., a reaction cylinder), translators 3410 and 3420, stators 3417 and 3427, bearing housings 3416 and 3426, and seals 3415 and 3425. Translator 3410 includes, for example, piston 3411 with seal 3479, tube 3412, and section 3413. Translator 3420 includes, for example, piston 3421 with seal 3489, tube 3422, and section 3423.

For discussion purposes, generator assembly portion 3400 will be considered to use uniflow scavenging having intake ports and exhaust ports on opposite sides axially of cylinder 3402, both without valves. Accordingly, for discussion purposes, translator 3410 will be considered an intake-side translator because piston 3411 covers and uncovers intake breathing ports 3419. Further, for discussion purposes, translator 3420 will be considered an exhaust-side translator because piston 3421 covers and uncovers exhaust breathing ports 3429. It will be understood that scavenging techniques other than uniflow scavenging may be used, in accordance with the present disclosure.

Seals 3415 and 3425 provide a seal between cylinder 3402 and respective bearing housings 3416 and 3426. In some embodiments, seals 3415 and 3425 seal against cylinder 3402 (e.g., on a radially outer surface, or an axially outer surface), and also against any suitable surface of respective bearing housings 3416 and 3426. For example, volumes 3418 and 3428, behind respective pistons 3411 and 3421 (e.g., away from reaction section 3497) may include intake gas and exhaust, respectively. In some circumstances, it is not desirable for reaction back section 3418 to be vented to atmosphere, because the intake gas therein may be at a boost pressure greater than atmospheric pressure causing the intake gas to flow out of bore 3403 of cylinder 3402 into the atmosphere (e.g., thus potentially venting fuel, if the intake gas is premixed, and, therefore, wasting energy). Similarly, in some circumstances, it is not desirable for reaction back section 3428 to be vented to atmosphere, because the exhaust gas therein may be at an elevated temperature causing the performance of nearby components (e.g., such as stator 3427 or other components) to be affected. Because bearing housings 3416 and 3426 provide pressurized gas to respective gas bearings, the corresponding bearing gas acts as a further seal, preventing gas from bore 3403 of cylinder 3402 or gas from volumes 3418 and 3428 from passing the corresponding gas bearing. For example, when the pressure of the intake gas bearing is larger than the pressure in the intake system or any pressure in volume 3418, the intake gas is limited or prevented from leaking to the surroundings (e.g., atmosphere). Similarly, when the pressure of the exhaust gas bearing is larger than the pressure in the exhaust system or any pressure in volume 3428, the exhaust gas in volume 3428 is limited or prevented from leaking to the surroundings (e.g., atmosphere). Seals 3415 and 3425 may include, for example, O-rings, crush seals, gaskets, flanges, threads, alignment features, mating tolerances (e.g., a mating interface that is near gas-tight), any other suitable component or feature, or any combination thereof. Sections 3480 and 3481 provide enlarged views in FIGS. 36 and 37. In some embodiments, seal 3415, seal 3425, or both may be wholly or partially integrated into cylinder 3402, respective bearing housings 3416 and 3426, or a combination thereof. For example, seals 3415 and 3425 need not include any rigid components or housing structures, and may include an O-ring or gasket between mating components. In some embodiments, seal 3415, seal 3425, or both may be configured to indirectly seal against cylinder 3402. For example, a seal may seal against another component of the integrated linear generator system (e.g., an intake or exhaust manifold) that is sealed against cylinder 3402. In some embodiments, generator assembly portion 3400 may include one or more ring compressors, as illustrated in FIG. 2. For example, a respective ring compressor may be arranged at each axial end of cylinder 3402, for interacting with respective seals 3479 and 3489.

Figure 35:
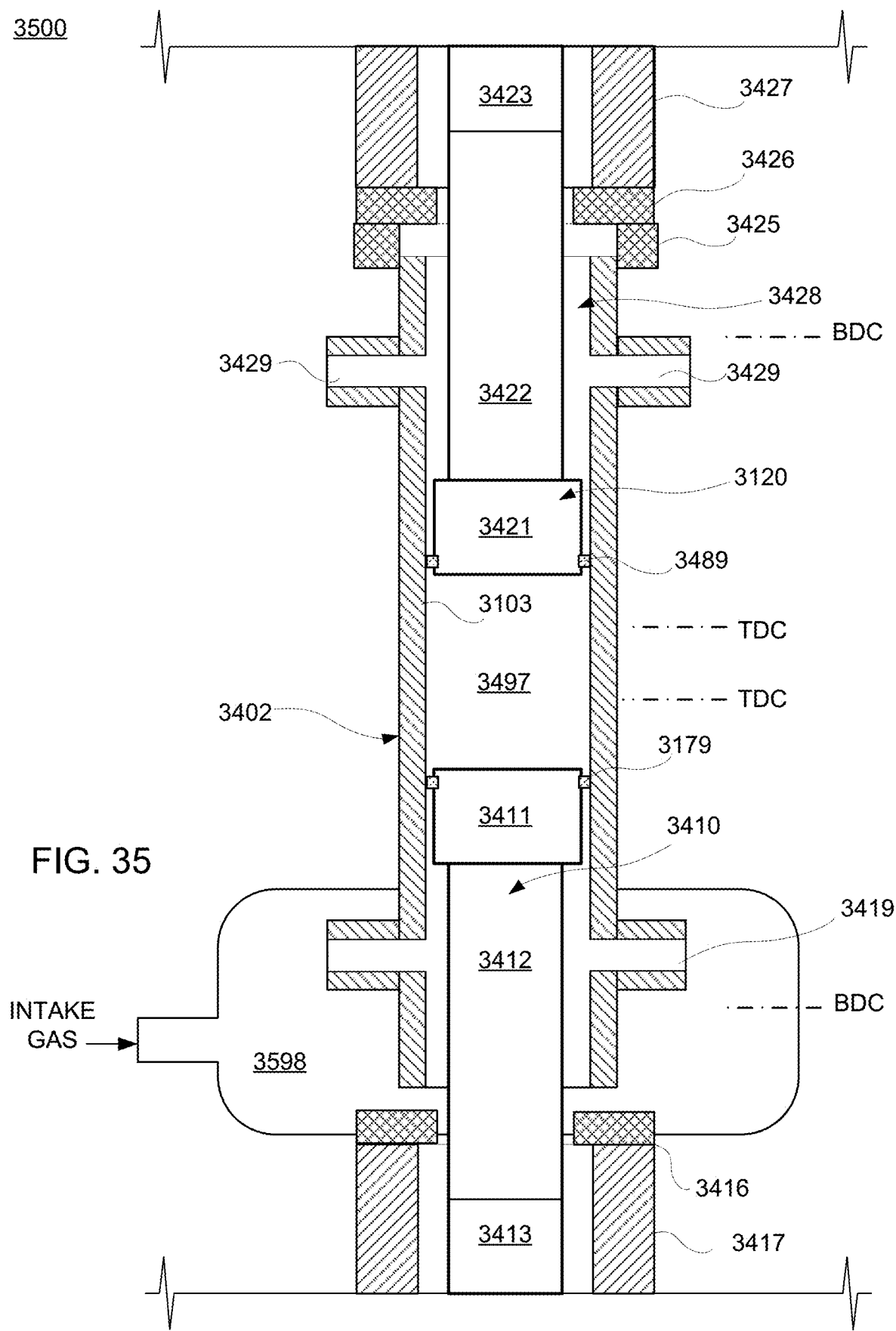
FIG. 35 shows a cross-sectional view of an illustrative generator assembly portion, in accordance with some embodiments of the present disclosure.

FIG. 35 shows a cross-sectional view of generator assembly portion 3500, in accordance with some embodiments of the present disclosure. Generator assembly portion 3200 is similar to generator assembly portion 3400 of FIG. 34, with intake manifold 3598 included, and seal 3415 not included. Intake manifold 3598 seals to cylinder 3402 and bearing housing 3416, functioning as an intake manifold and seal (e.g., similar in function to seal 3415 of FIG. 34). Intake ports 3419 are arranged within intake manifold 3598, wherein intake gas flows from intake manifold 3498 into intake ports 3419. Bearing gas, or a portion thereof, may flow from bearing housing 3416 into a gas bearing and then into intake manifold 3598. Intake manifold 3598 may be similar, for example, in shape and aspects of arrangement to the reservoirs of FIGS. 23-29 (e.g., although port arrangement, volume, and/or other aspects may differ), which are arranged to contain gas in a back section. In some embodiments, an exhaust manifold is included on the exhaust side of a generator assembly (e.g., similar to intake manifold 3598 on the intake side). In some embodiments, a manifold may mate with a cylinder, a bearing housing, or both.

Figure 36:
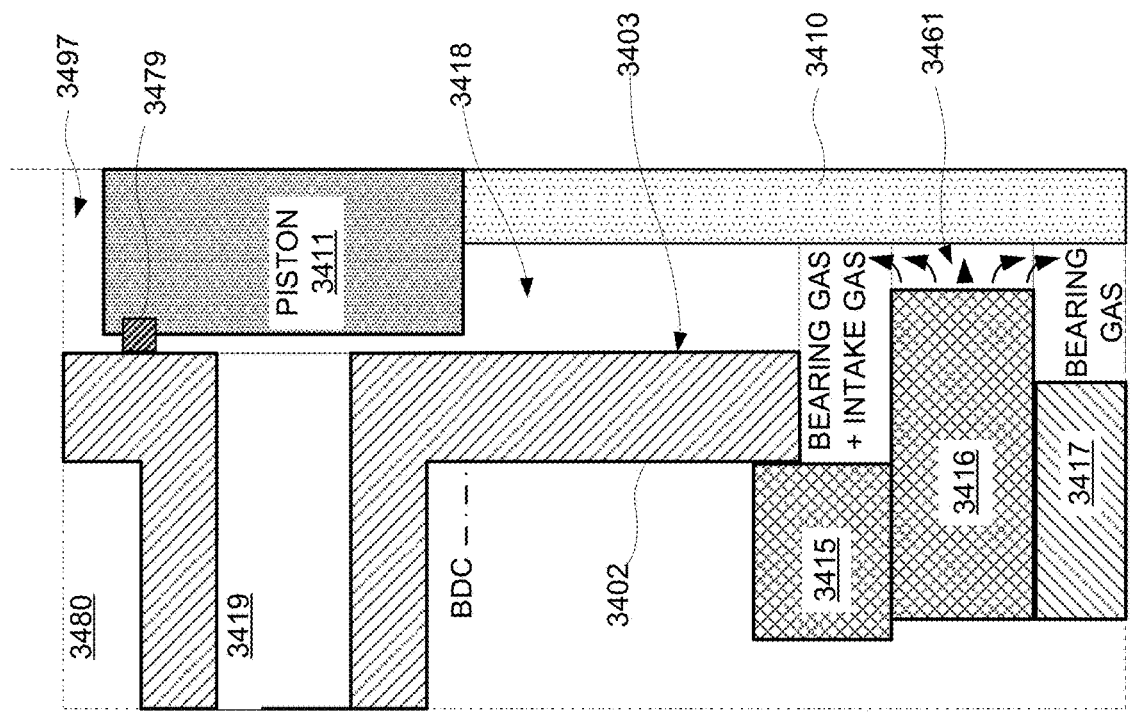
FIG. 36 shows an enlarged view of a section of the illustrative generator assembly portion of FIG. 34, with a seal positioned axially in front of an intake port, in accordance with some embodiments of the present disclosure.

FIG. 36 shows an enlarged view of section 3480 of FIG. 34, with seal 3479 positioned axially in front of the intake port 3419 (e.g., the intake port is closed to reaction section 3497), in accordance with some embodiments of the present disclosure. Bearing gas of gas bearing 3470 may flow in both axial directions, keeping bearing gap 3461 (e.g., the space between bearing housing 3416 and translator 3410) between bearing housing 3416 and translator 3410 (i.e., the gas bearing) purged with bearing gas. Accordingly, a mixture of intake gas (e.g., from the intake port) and bearing gas may be present behind piston 3411 in bore 3403 (e.g., in reaction back section 3418), and only bearing gas flows out near stator 3417 (e.g., which may be open to the atmosphere). Accordingly, bearing housing 3416 and seal 3415 act to seal the gas of bore 3403 from the atmosphere surrounding cylinder 3402. Seal 3479 seals piston 3411 to cylinder 3402 and is positioned forward of the intake port as illustrated in FIG. 34. Reaction back section 3418 extends from bearing housing 3416 to seal 3479, and is also bounded by seal 3415 and cylinder 3402. As translator 3410 translates axially, the volume of reaction back section 3418 changes, and accordingly may undergo boundary work (e.g., compression and expansion). The gas in reaction back section 3418 may include a mixture of bearing gas and intake gas (e.g., along with gas from blowback and blow-by) that may flow out of reaction back section 3418 and into port 3419 (e.g., the flow through port 3418 may be unsteady), when seal 3479 forward of port 3419. For example, in some embodiments, the bearing gas is air, and any bearing gas that mixes with intake gas in reaction back section 3418 is included in the intake gas that undergoes reaction in bore 3403. In an illustrative example, approximately half of the bearing gas that flows to bearing gap 3461 may flow into reaction back section 3418, and undergo reaction in reaction section 3497. If air is the bearing gas, then any air from bearing gap 3461 that enters reaction section 3497 will lean the intake gas mixture provided to the intake port 3419 from an intake system. To illustrate, a measurement of exhaust gas composition from a linear generator may be representative of both intake gas composition and bearing gas composition. The pressure in reaction back section 3418 is less than the pressure of the bearing gas in bearing gap 3461, such that at least some bearing gas flows from bearing housing 3416 to reaction back section 3418.

Figure 37:
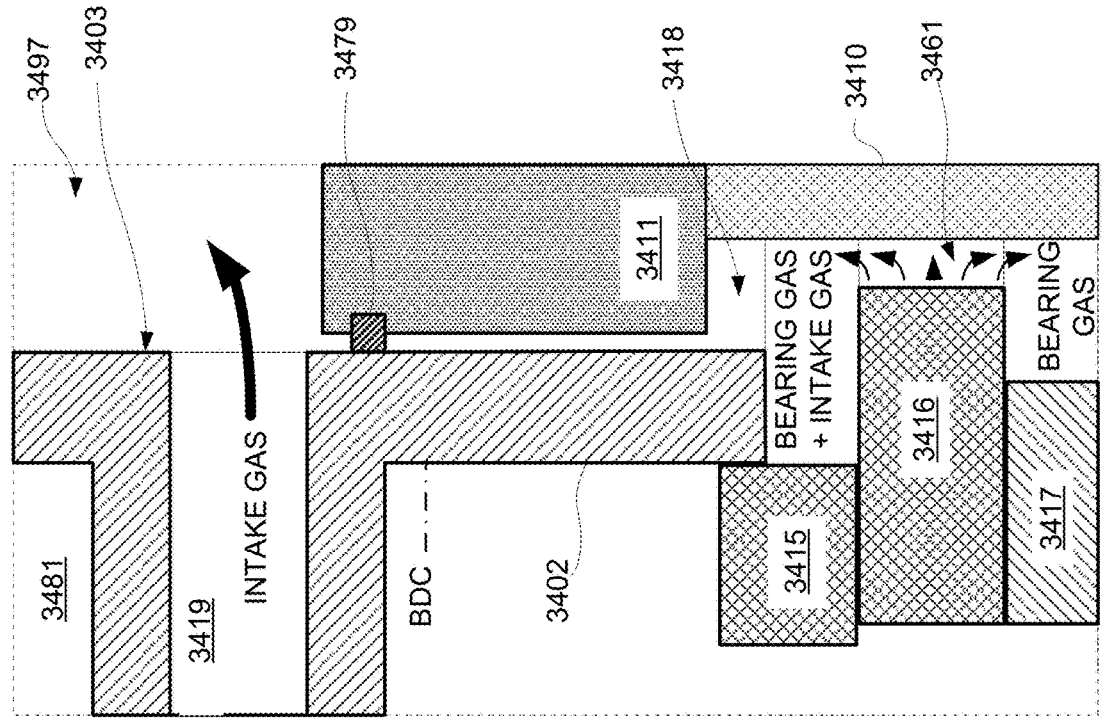
FIG. 37 shows an enlarged view of a section of the illustrative generator assembly portion of FIG. 34, with a piston seal positioned axially behind the intake port, in accordance with some embodiments of the present disclosure.

FIG. 37 shows an enlarged view of section 3481 of FIG. 34, with seal 3419 positioned axially behind the intake port (e.g., the intake port is open to reaction section 3497), in accordance with some embodiments of the present disclosure. Section 3481 and 3480 are the same except for the axial position of translator 3410. In some embodiments, seal 3415 may be sized to impact this boundary work. For example, in some embodiments, seal 3415 is configured such that the gas pressure in reaction back section 3418, when the breathing ports are open (e.g., as shown in FIG. 37), is less than the gas pressure of the gas bearing (e.g., to ensure sufficient flow of the bearing gas). Reaction back section 3418, as illustratively shown in FIG. 37, may exhibit a maximum pressure when the volume of reaction back section 3418 is smallest (e.g., at or near a BDC position of translator 3410).

To illustrate, for given operating conditions, the larger the volume of reaction back section 3418 is at BDC, the lower the volumetric compression ratio and volumetric expansion ratio of reaction back section 3418 during operation, thus reducing the maximum gas pressure in reaction back section 3418. In some embodiments, the volume of reaction back section 3418 is large enough to ensure that the pressure in reaction back section 3418 is less than a bearing gas pressure, while also achieving a pressure as low as possible (e.g., to minimize boundary work). For example, to illustrate, peak pressures in reaction back section 3418 may be kept low (e.g., less than 3 bar) and fluctuations over a stroke of piston 3411 may be kept relatively low (e.g., less than a pressure ratio of 3:1 between maximum:minimum pressure). In some embodiments, the pressure in reaction back section 3418 is kept below 2 bar with a 1.2 bar intake gas pressure (e.g., a boost pressure). In some embodiments, gas bearings operate with bearing gas at a supply pressure of 6-10 bar, with the ultimate goal of achieving a pressure of 3-4 bar in bearing gap 3461. Properties of gas within reaction back section 3418 may be affected by spatial dimensions of translator 3410, piston 3411, cylinder 3402, seal 3415, bearing housing 3416, or relative dimensions thereof (e.g., gaps or clearances thereof), as well as the position of seal 3479 and the position of translator 3410 (e.g., TDC and BDC positions). While FIG. 37 is shown with respect to the intake side, the same features can be utilized on an exhaust side.

Figure 38:
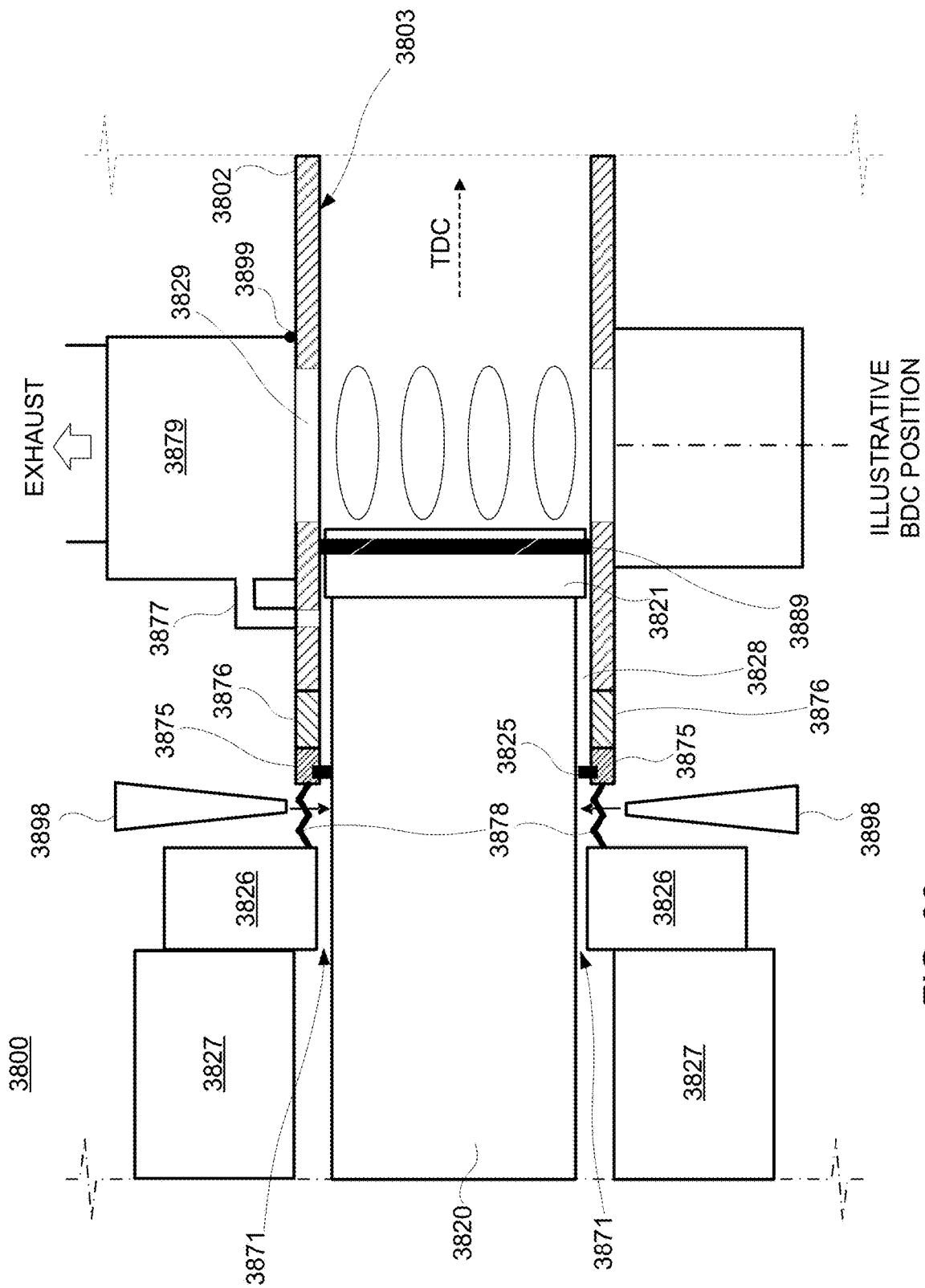
FIG. 38 shows an enlarged view of a section of an illustrative generator assembly portion, in accordance with some embodiments of the present disclosure.

FIG. 38 shows an enlarged view of a section of an illustrative generator assembly portion, in accordance with some embodiments of the present disclosure. A gas bearing is formed by providing a flow of bearing gas to bearing gap 3871 between bearing housing 3826 and translator 3820 (i.e., the gas bearing) purged with bearing gas. Accordingly, a mixture of exhaust gas and bearing gas may be present behind piston 3821 in bore 3803, and only bearing gas flows out near stator 3827 (e.g., which may be open to the atmosphere). Seal 3825 acts to seal the gas of bore 3803 from the atmosphere. Seal 3825 is fixed relative to the motion of translator 3820 and is mounted in seal holder 3875. While seal 3825 is shown affixed to holder 3875, it may be mounted to cylinder 3802, ring compressor 3876, any other suitable component, or any suitable combination. Seal 3889 (e.g., a sealing ring assembly) moves with seals and seals piston 3821 to cylinder 3802. Reaction back section 3828 extends from seal 3825 to seal 3889, and is also bounded by ring compressor 3876 and cylinder 3802. As translator 3820 translates axially, the volume of reaction back section 3828 changes, and accordingly may undergo boundary work (e.g., compression and expansion). The gas in reaction back section 3828 may include a mixture of bearing gas and exhaust gas, and this mixture may flow in and out of reaction back section 3828 and port 3829 (e.g., the flow through port 3829 may be unsteady), when seal 3889 is forward of port 3829. For example, in some embodiments, the bearing gas is air, and any bearing gas that mixes with exhaust gas in reaction back section 3828 is included in the gas exhausted to the exhaust system and ultimately atmosphere. In an illustrative example, approximately half of the bearing gas that flows to bearing gap 3871 may flow into reaction back section 3828. To illustrate, a measurement of exhaust gas composition from a linear generator may be representative of both intake gas composition and bearing gas composition from intake and exhaust bearings. The pressure in reaction back section 3828 is less than the pressure of the bearing gas in bearing gap 3871, such that at least some bearing gas flows from bearing housing 3826 to reaction back section 3828. It may be important to maintain the pressure in back section 3828 below the bearing feed pressure to maintain functionality of the bearing. When this is important, exposure to and gas exchange between back section 3838 to the exhaust manifold 3879 may avoid over pressure of the back section. In this embodiment, port 3877 couples manifold 3879 reaction back section 3828 to exhaust manifold 3879 to limit pressure building up in reaction back section 3828 (e.g., when piston 3821 and seal 3889 are moving axially outwards towards BDC). Seal 3899, as illustrated, seals between the outer surface of cylinder 3802 and manifold 3879. In some embodiments, this can be achieved by the port lengths being axially long enough such that when piston 3821 is at BDC, the back section 3838 is still capable of gas exchange with the ports and exhaust manifold 3879. In some embodiments, over-pressure in the back section 3828 can be avoided by a check valve.

Ring compressor 3876 is configured to constrain seal 3889 from rearrangement or disassembly during maintenance. For example, seal 3889 may be axially positioned within ring compressor 3876, which may be moved axially and/or radially during maintenance, inspection, installation, removal, replacement, or any other suitable activity occurring during other non-operation periods. Spring 3878 is configured to apply an axial force on ring compressor 3876 (via holder 3875 in FIG. 38), so that ring compressor 3876 remains in contact with cylinder 3802. As illustrated, spring 3878 pushes against bearing housing 3826, but spring 3878 may push against any suitable component. In some embodiments, spring 3878 is integrated with spring compressor 3876 and/or holder 3875 as a single component or a single assembly. In some embodiments, ring compressor 3876 is mechanically attached to the cylinder using, for example, v-bands, clamps, bolts, screws, or any other suitable mechanical attachment method, or any combination. In some embodiments, seal 3825, holder 3875, ring compressor 3876, and spring 3878 may be integrated as one part, multiple parts, or separate parts (as shown in FIG. 38).

Figure 39A:
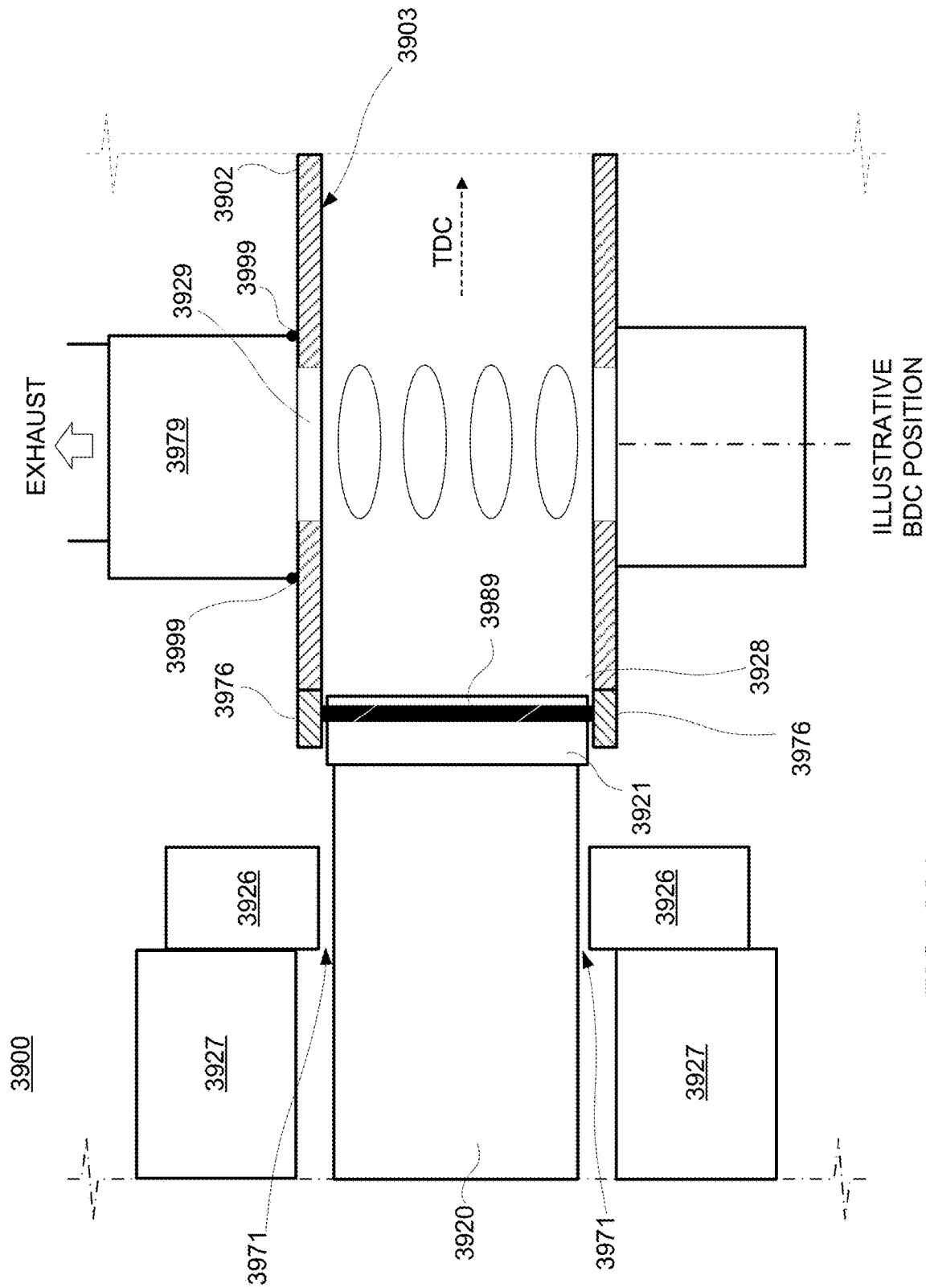
FIG. 39A shows a cross-sectional view of an illustrative generator assembly portion, with the seal within a ring compressor, in accordance with some embodiments of the present disclosure.

FIG. 39A shows a cross-sectional view of illustrative generator assembly portion 3900, with seal 3989 within ring compressor 3975, in accordance with some embodiments of the present disclosure. In some embodiments, a seal (e.g., not shown, but similar to seal 3825 and seal holder 3875 of FIG. 38) may be removed in the configuration shown in FIG. 39A (e.g., during maintenance and inspection). Bearing gap 3971 is arranged between bearing housing 3926 (e.g., which may be mounted to stator 3927) and translator 3920 (i.e., the gas bearing) and may be purged with bearing gas. Seal 3989 (e.g., a sealing ring assembly) seals piston 3921 to bore 3903 of cylinder 3902 and is positioned outward of exhaust port 3929 as illustrated in FIG. 39A. Seal 3999, as illustrated, seals between the outer surface of cylinder 3902 and manifold 3979.

Ring compressor 3976 is configured to constrain seal 3989 from rearrangement or disassembly during maintenance. For example, as illustrated, seal 3989 is axially positioned within ring compressor 3976 (e.g., during maintenance, inspection, installation, removal, replacement, or any other suitable activity occurring during other non-operation periods). As illustrated, seal 3989 includes a multi-part seal that forms a sealing ring assembly (e.g., to accommodate wear of seal 3989). In some exemplary embodiments, the ring compressor 3976 includes a clam shell structure that can be opened to provide access to the seal 3989. In other exemplary embodiments, the ring compressor 3976 may comprise of a single piece may be moved axially out of the way to provide access the seal 3989.

Figure 39B:
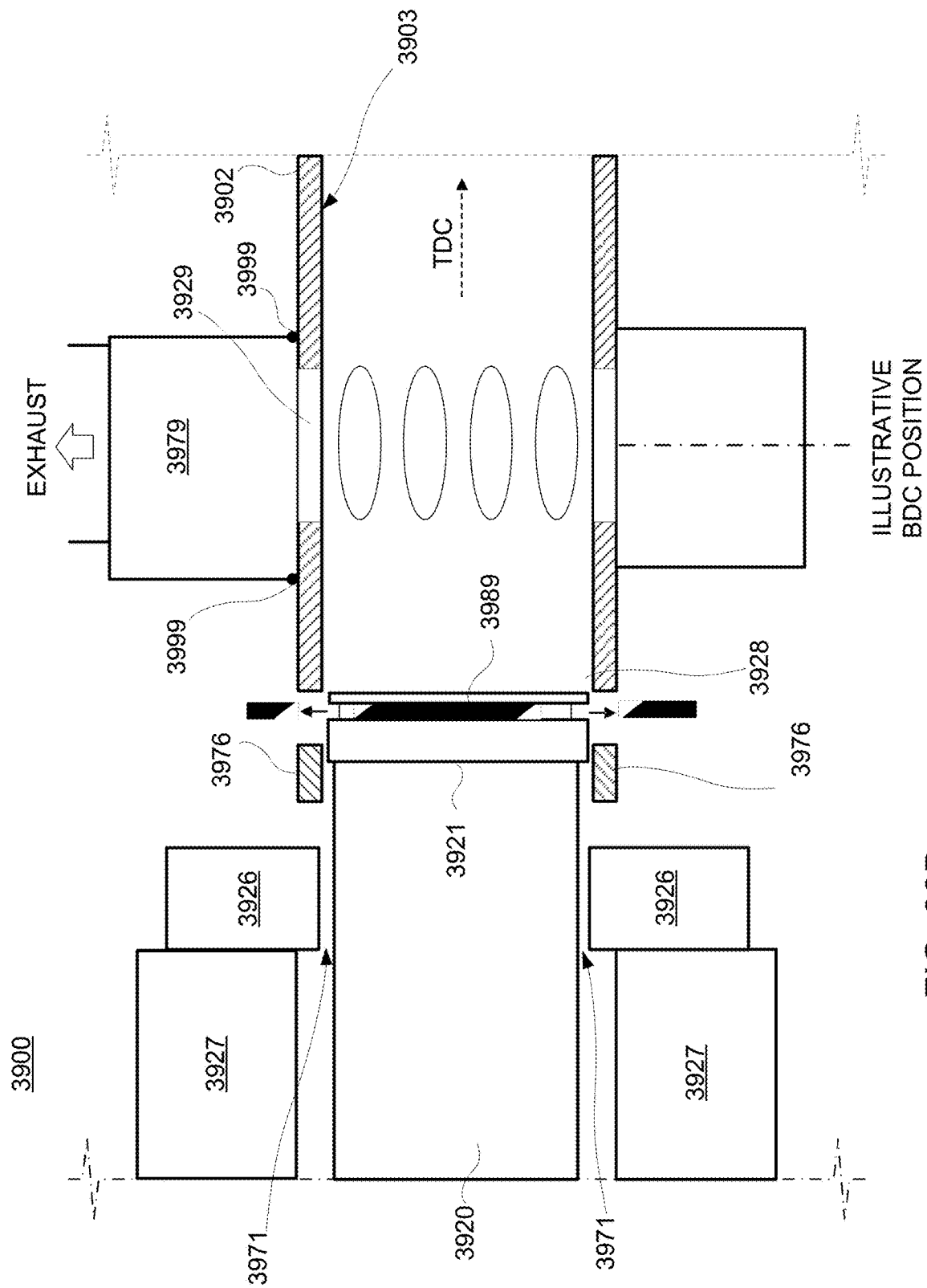
FIG. 39B shows a cross-sectional view of the illustrative generator assembly portion of FIG. 39A, with the seal outside of the ring compressor, in accordance with some embodiments of the present disclosure.

FIG. 39B shows a cross-sectional view of illustrative generator assembly portion 3900 of FIG. 39A, with ring compressor 3976 removed axially outward from seal 3989, in accordance with some embodiments of the present disclosure. As illustrated, with the ring compressor 3976 moved radially outward, seal 3989 is partially disassembled, with segments removed from piston 3921. For example, the configuration illustrated in FIG. 39B may correspond to a time during an inspection or replacement of seal 3989, inspection of a land or ring groove of piston 3921, or any other suitable time outside of operation of the generator assembly. In some embodiments, ring compressor 3976 is configured to move radially outward, axially outward, or both, in order to remove ring segments.

In some embodiments, the seals and bearing housings of FIGS. 34-39 may be used with a gas spring piston and cylinder. For example, as discussed in the context of FIGS. 22-29, a reservoir may act as a seal between a cylinder and bearing housing. In some embodiments, a seal (e.g., seal 34115, seal 3425, or both), intake manifold 3298 may mate, or otherwise seal against a stator (e.g., stator 3417, stator 3427), similar to the arrangements shown in FIGS. 26-28.

In some embodiments, translator 3920 may include one or more features (not shown) that may engage with corresponding features of a generator assembly to substantially lock translator 3920 in place (e.g., axially, radially, azimuthally, or a combination thereof). For example, in the configuration of FIG. 39B, translator 3920 may be arranged at a suitable axial position of a generator assembly (e.g., relative to stator 3927, bearing housing 3926, cylinder 3902, or a feature thereof), and locked in place. Translator 3920 may include a feature (e.g., a blind hole, a through hole, a notch, a slot, a pin, a surface, any other suitable boss feature or recess feature, or any combination thereof), which may be engaged by a corresponding feature to prevent displacement of translator 3920 in one or more directions. For example, translator 3920 may include one or more blind holes, which are configured to engage with one or more pins that prevent axial motion of translator 3920. In a further example, translator 3920 may include one or more notches which are configured to engage with one or more pins that prevent axial motion of translator 3920.

Figure 40:
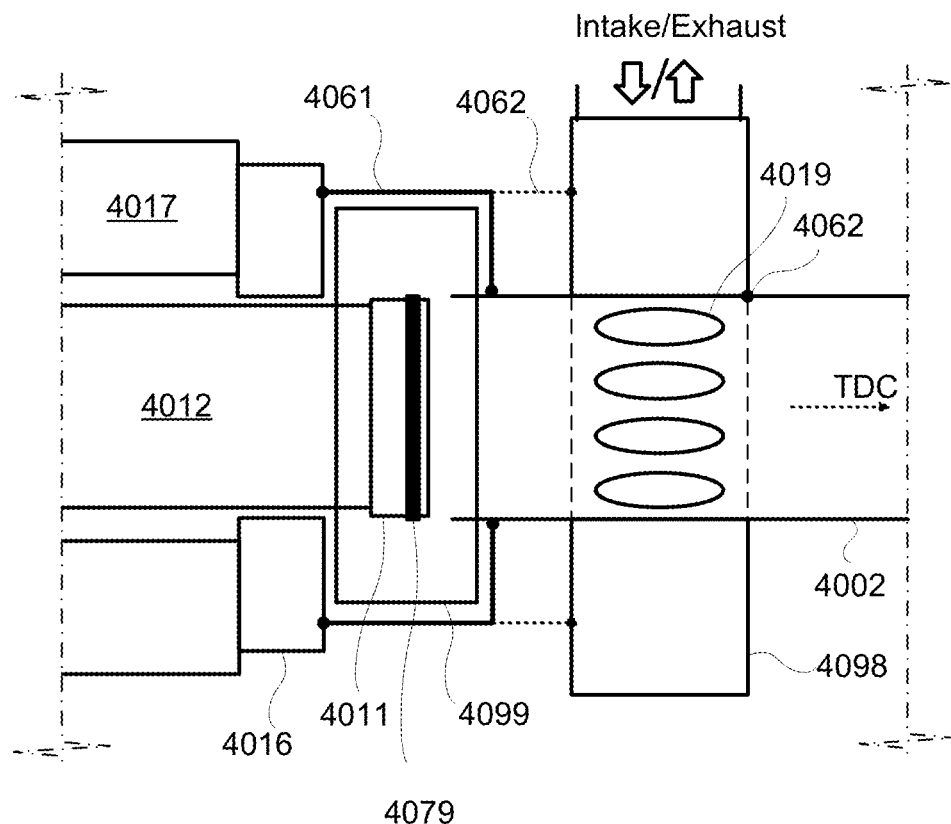
FIG. 40 shows a cross-sectional view of an illustrative generator assembly portion, having an intake seal, in accordance with some embodiments of the present disclosure.

FIG. 40 shows a cross-sectional view of generator assembly portion 4000, having seal 4061, in accordance with some embodiments of the present disclosure. Generator assembly portion 4000 may be similar to one side of generator assembly portion 3400 of FIG. 34, for example. Generator assembly portion 4000, as illustrated, includes manifold 4098, and seal 4061 that seals between cylinder 4002 and bearing housing 4016. Alternatively, a seal may be configured to seal between manifold 4098 and bearing housing 4016 (e.g., illustrated by seal 4062). Manifold 4098 seals to cylinder 4002 (e.g., using seal 4062) and directs intake gas to ports 4019 or exhaust gas from ports 4019 (e.g., depending upon which side of a generator assembly manifold 4098 is installed on). Ports 4019 are arranged in cylinder 4002 within manifold 4098. Bearing gas, or a portion thereof, may flow from bearing housing 4016 into a gas bearing and then into manifold 4098. Manifold 4098 may be similar, for example, in shape and aspects of arrangement to the reservoirs of FIGS. 23-28 (e.g., although port arrangement, volume, and/or other aspects may differ), which are arranged to contain gas in a back section. In some embodiments, seal 4061 includes hatch 4099, which may be removeable. For example, hatch 4099 allows maintenance, of piston 4011, seal 4079, or the end of tube 4012.

Figure 41:
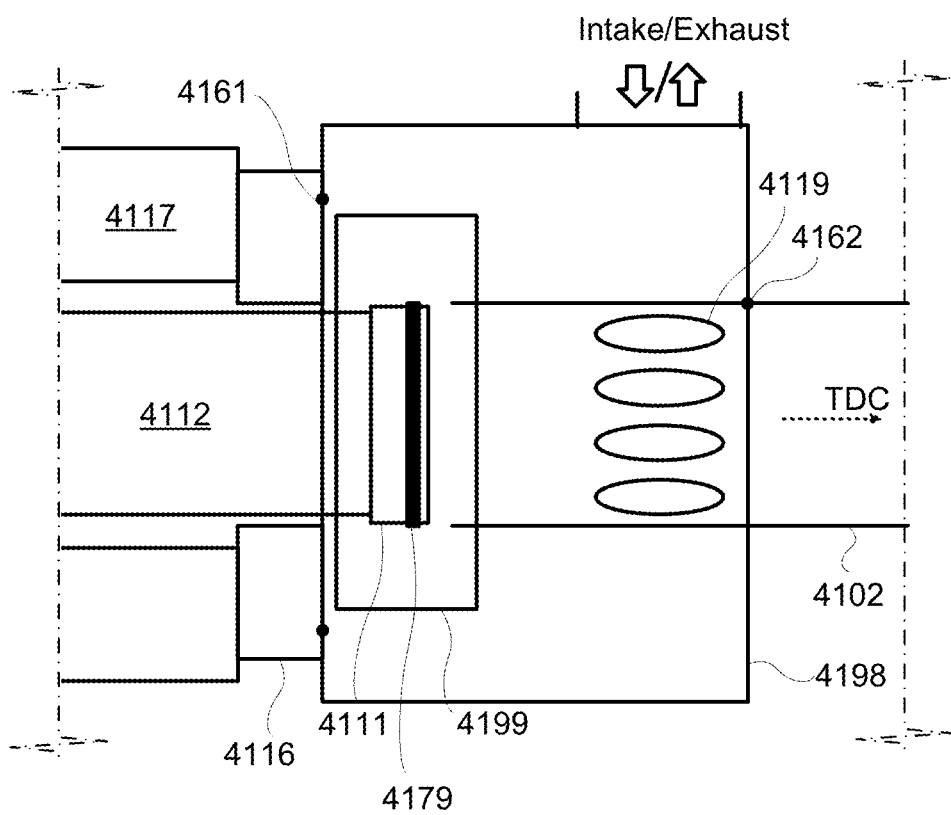
FIG. 41 shows a cross-sectional view of an illustrative generator assembly portion, having an intake manifold that seals against a bearing housing, in accordance with some embodiments of the present disclosure

FIG. 41 shows a cross-sectional view of generator assembly portion 4100, having an intake manifold that seals against a bearing housing, in accordance with some embodiments of the present disclosure. Generator assembly portion 4100 may be similar to one side of generator assembly portion 3400 of FIG. 34, for example. Generator assembly portion 4100, as illustrated, includes manifold 4198 that seals between cylinder 4102 and bearing housing 4116. Manifold 4198 seals to cylinder 4102 using seal 4162) and seals to bearing housing 4116 using seal 4161, to direct intake gas to ports 4119 or exhaust gas from ports 4119 (e.g., depending upon which side of a generator assembly manifold 4198 is installed on). Ports 4119 are arranged in cylinder 4102 within manifold 4198. Bearing gas, or a portion thereof, may flow from bearing housing 4116 into a gas bearing and then into manifold 4198. Manifold 4198 may be similar, for example, in shape and aspects of arrangement to the reservoirs of FIGS. 23-29 (e.g., although port arrangement, volume, and/or other aspects may differ), which are arranged to contain gas in a back section. In some embodiments, manifold 4198 includes hatch 4199, which may be removeable. For example, hatch 4199 allows maintenance, of piston 4111, seal 4179, or the end of tube 4112.

The translating assembly or "translator" is the actuator that couples expansion and compression of gas volumes to electromagnetic interactions with a stator to generate electric power. Accordingly, the translator is capable of moving under pressure forces and electromagnetic forces, generating an electromotive force (emf) in phases of the stator (e.g., and conversely react to an emf generated by the stator), achieving a nominally linear path of movement, and withstanding thermal and mechanical loadings experienced during operating cycles.

Figure 42:
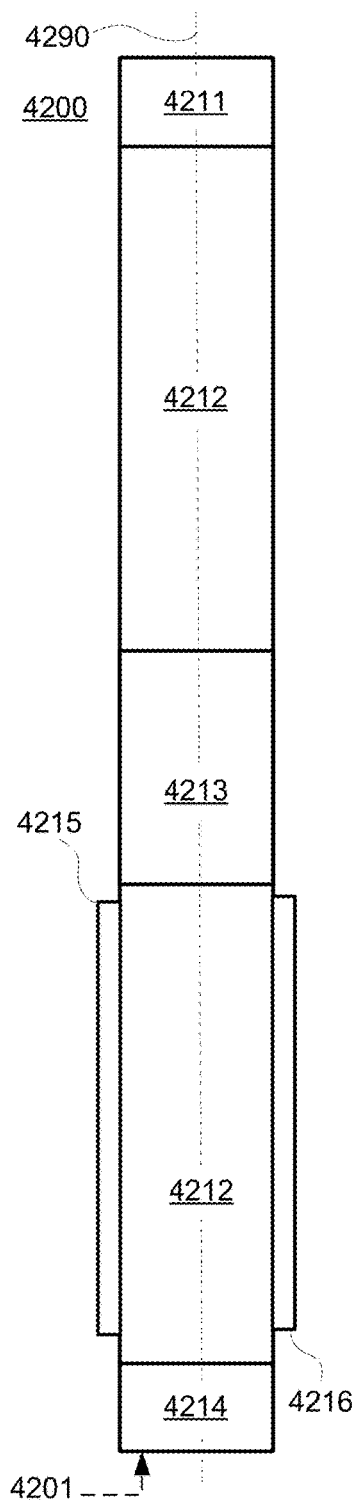
FIG. 42 shows a side view of an illustrative translator, in accordance with some embodiments of the present disclosure.
Figure 43:
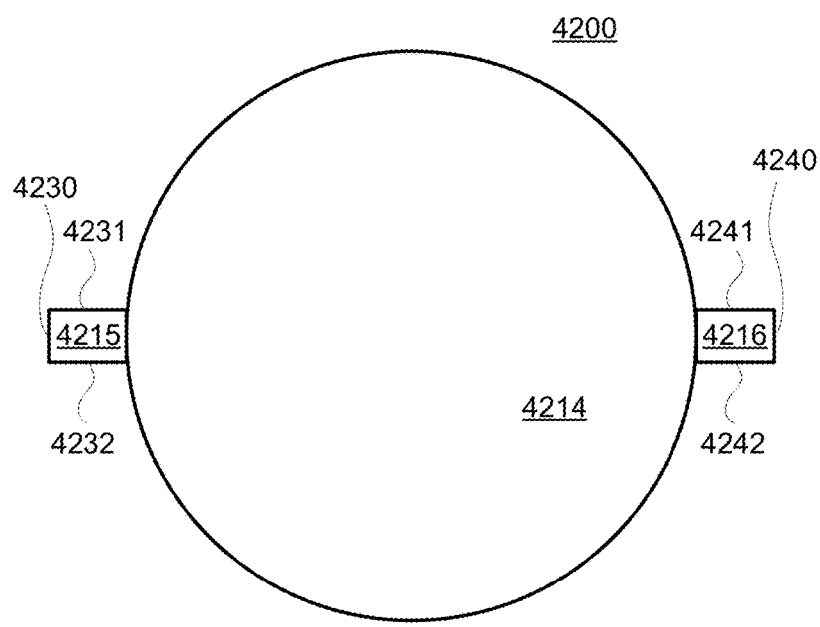
FIG. 43 shows an axial end view of the illustrative translator of FIG. 42, in accordance with some embodiments of the present disclosure.

FIG. 42 shows a side view of illustrative translator 4200, in accordance with some embodiments of the present disclosure. FIG. 43 shows an axial end view of translator 4200, in accordance with some embodiments of the present disclosure. The axial end view of FIG. 43 is taken from direction 4201. Translator 4200 includes tube 4212, to which pistons 4211 and 4214 are rigidly coupled (e.g., bolted, screwed, clamped, or welded together). Translator 4200 includes section 4213, which may include features (e.g., magnets) for enabling a desired electromagnetic interaction with a stator. In some embodiments, as illustrated, translator 4200 also optionally includes rails 4215 and 4216, each configured to provide a position index, an anti-clocking bearing surface, or both. In some embodiments, translator 4200 does not include rails and sufficient anti-clocking stiffness in the azimuthal direction is provided through the electromagnetic interaction between the stator and translator (e.g., as described in the context of FIG. 49). In some embodiments, translator 4200, or components thereof, may be symmetrical about axis 4290 (e.g., including circular shapes centered at axis 4290, fastener patterns, arrangement of rails, and other aspects having rotational symmetry). In some embodiments, translator 4200, or components thereof, need not be symmetrical about axis 4290. In some embodiments, section 4213, piston 4211, and piston 4214 may have substantially the same diameter as tube 4212. In some embodiments, section 4213, piston 4211, and piston 4214 may have differing diameters, both smaller or larger, than tube 4212. As illustrated, translator 4200 includes two pistons 4211 and 4214. In some embodiments, piston 4214 is configured to be in contact with a driver section such as gas spring 2298 of FIG. 22. Although illustrated in FIG. 42 as being arranged at the same axial location, in some embodiments, rails are included at more than one axial location or region. Pistons 4211 and 4214 may be, but need not be, the same. For example, pistons 4211 and 4214 may differ in size (e.g., diameter, axial length), features, number of seals (e.g., one ring, or more than one ring), affixment (e.g., differing fasteners or orientation of fasteners). In a further example, piston 4211 may be arranged to contact a reaction section, and accordingly be configured to accommodate greater temperature, greater heat flux, or both than piston 4214. Translator 4200, as illustrated, does not include bearing housings, gas passages for feeding gas bearings, or otherwise any bearing components other than surfaces configured to interface to bearings (e.g., gas bearings).

Rail 4215 includes, for example, surface 4230, which may include a feature for position indication or indexing, and surfaces 4231 and 4232, which may include anti-clocking bearing surfaces. Anti-clocking bearing surfaces 4231 and 4232 are capable of receiving forces in the azimuthal direction (e.g., their faces are normal to or nearly normal to the azimuthal direction). Rail 4216 includes, for example, surface 4240, which may include a feature for position indication or indexing surfaces 4241 and 4242, which may include anti-clocking bearing surfaces. In some embodiments, a translator may include zero, one, two, or more than two rails, having any suitable azimuthal or axial positioning around a translator, in accordance with the present disclosure. For example, in some embodiments, a translator may include more than one rail to provide multiple position indications (e.g., for redundancy, accuracy, symmetry, or a combination thereof). In some embodiments, translator 4200 need not include any anti-clocking rails, or any anti-clocking features. In some embodiments, without anti-clocking rails, magnetic interactions between the translator and the stator may provide adequate anti-clocking stiffness in the azimuthal direction. In some embodiments, without anti-clocking rails 4215 and 4216, for example, position indexing features may be attached directly to, or integrated directly in, translator 4200 (e.g., attached directly to or integrated directly in tube 4212). In some embodiments, without anti-clocking rails 4215 and 4216, for example, position may be determined by the electromagnetic interaction between the stator and section 4213. In some embodiments, surfaces 4231, 4232, 4241, and 4242 are configured to interface to corresponding anti-clocking bearings (e.g., which may include anti-clocking gas bearings). Anti-clocking bearings provide stiffness in the azimuthal direction, thus preventing or reducing azimuthal motion of the translator. In some embodiments, surface 4230 or 4240 may include machined features for position indication or indexing, magnetic tape for position indication or indexing, optical or electrical position sensors, any other suitable feature for position indication or indexing, or any combination thereof. In some embodiments, sensing the position of the translator relative to the stator may be determined by sensing the position of one or more rows of magnetic features of section 4213 of the translator and without the use of external position indexing features. For example, a back electromotive force (emf) may be measured in one or more phase windings to determine a relative position of the stator and translator. In a further example, a control signal (e.g., a pulse-width modulation signal for applying current), a measured current, or both may be used to determine a relative position of the stator and translator.

In some embodiments, translator 4200 may include one or more features that may engage with corresponding features of a generator assembly to substantially lock translator 4200 in place (e.g., axially, radially, azimuthally, or a combination thereof). For example, when not in operation (e.g., during maintenance, inspection, or repair), translator 4200 may be arranged at a suitable axial position of a generator assembly (e.g., relative to a stator, bearing housing, cylinder, or feature thereof), and locked in place. Translator 4200 may include a feature (e.g., a blind hole, a through hole, a notch, a slot, a pin, a surface, any other suitable boss feature or recess feature, or any combination thereof), which may be engaged by a corresponding feature to prevent displacement of translator 4200 in one or more directions. For example, translator 4200 may include one or more blind holes, which are configured to engage with one or more pins that prevent axial motion of translator 4200. In a further example, translator 4200 may include one or more notches which are configured to engage with one or more pins that prevent axial motion of translator 4200.

Figure 44:
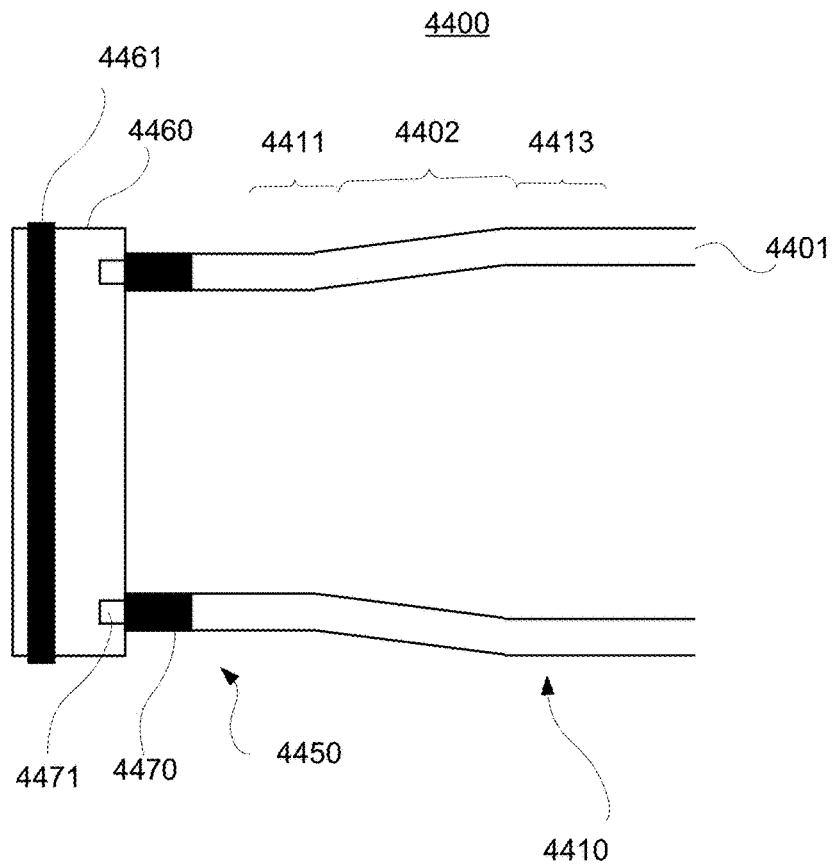
FIG. 44 shows a side cross-sectional view of an illustrative translator having a taper region and optional spacer, in accordance with some embodiments of the present disclosure.

FIG. 44 shows a side cross-sectional view of illustrative translator 4400 having taper region 4402, and optional spacer 4470, in accordance with some embodiments of the present disclosure. As illustrated, end 4450 shown is coupled to spacer 4470, which is coupled to piston 4460 (e.g., having seal 4461). Because piston 4460 may be in contact with relatively hot gases (e.g., from compression and/or chemical reactions), bearing surface 4410 may exhibit a non-uniform axial temperature field, which may cause non-uniform thermal expansion in the radial direction. In some embodiments, translator tube 4401 may include a taper region configured to allow non-uniform radial expansion to maintain a desired bearing clearance (e.g., a gas bearing thickness). For example, taper region 4402 is arranged axially between a portion of the translator tube having first outer diameter (OD1) 4411 and a second portion of the translator tube have a second outer diameter (OD2, larger than OD1) 4413. To illustrate, during operation, heat transfer from a power cylinder piston (e.g., a reaction-section piston), heat transfer from exposure to compressed gases and post-reaction gases, or both may be reduced to the translator tube by spacer 4470 (e.g., which may include a thermal conductivity less than that of piston 4460 or translator tube 4401). In some circumstances, (e.g., without a taper region) the magnitude of the thermal expansion may cause the diameter to grow to be larger than the maximum allowable diameter to maintain sufficient gas bearing clearances. Taper region 4402 of translator 4400 compensates for this thermal expansion, thus allowing gas bearings to function across a range of operating conditions (e.g., translator tube axial temperature profiles). Taper region 4402 may include any suitable shape profile such as, for example, a straight transition (e.g., conical), a piecewise linear transition (e.g., compound conical), a curved transition (e.g., having any suitable curvature, continuous or piecewise), any other suitable transition, or any combination or compound transition thereof. In some embodiments, translator 4400 need not include spacer 4470, and piston 4461 may be affixed to translator tube 4401. In some embodiments, the piston may include at least two separate components, a piston section 4460, and an optional collar section (not shown) that may be made of a different material, with differing material properties, including heat capacity. In an exemplary embodiment, the piston collar would help isolate the translator 4401 further from the high temperatures of the piston 4460.

In accordance with some embodiments of the present disclosure, a low-thermal-conductivity material may be inserted between the end face of translator tube 4401 and piston 4460. For example, a low-thermal conductivity material may be a sheet or ring (e.g., similar to a gasket) made of a ceramic or metal. The material is configured to carry the compressive load (e.g., during operation) but is thermally insulating (e.g., to reduce heat transfer). The insulating material may include any suitable material such as, for example, a ceramic material or a metal. In some embodiments, the length of the piston (e.g., which is made of more heat tolerant material) is relatively longer, moving the axial end face of the translator tube further away from the heat of the reaction section of the cylinder.

For example, by including recesses into one or the other mating faces, pockets may be formed to help reduce heat transfer. Recesses may be cut, punched, pressed, machined, or otherwise formed in the piston, translator tube, or both. In a further example, a layer of thermally insulating material may be inserted at the interface to reduce heat transfer. Thermally insulating material may include, for example, a ceramic (e.g., a woven or fibrous ceramic fabric or gasket). In some embodiments, all or part of a piston include more heat tolerant material (e.g., Inconel or ceramic). In some embodiments, increasing the axial length of a piston moves the end face of the translator tube further away from the reaction section of the cylinder, resulting in lower heat transfer to the translator. It will be understood that the interface between a piston and a translator tube may correspond to a reaction section piston, a driver section piston, or any other suitable piston for which heat transfer is desired to be reduced.

To illustrate, during operation, heat transfer from a power cylinder piston (e.g., a reaction-section piston), heat transfer from exposure to compressed gases and post-reaction gases, or both may be reduced to the translator tube by spacer 4470 (e.g., which may include a thermal conductivity less than that of piston 4460 or translator tube 4401). In some circumstances, (e.g., without a taper region) the magnitude of the thermal expansion may cause the diameter to grow to be larger than the maximum allowable diameter to maintain sufficient gas bearing clearances. Taper region 4402 of translator 4400 compensates for this thermal expansion, thus allowing gas bearings to function across a range of operating conditions (e.g., translator tube axial temperature profiles). Taper region 4402 may include any suitable shape profile such as, for example, a straight transition (e.g., normal conical), a piecewise linear transition (e.g., compound conical), a curved transition (e.g., having any suitable curvature, continuous or piecewise), any other suitable transition, or any combination or compound transition thereof.

In some embodiments, as illustrated, translator 4400 includes pockets 4471, or other recess features, in accordance with some embodiments of the present disclosure. Piston 4460, as illustrated, includes one or more pockets 4471 arranged azimuthally around the interface to spacer 4470 (e.g., or interface of translator tube 4401 if no spacer is included). Pockets 4471 reduce the contact area between the end face of spacer 4470 or translator tube 4401 and the mating face of piston 4460. Recesses, such as pockets 4471, may be any suitable shape such as, for example, pockets, grooves, blind holes, slots, or any other suitable shape configured to reduce contact area while still distributing the compressive load at the interface. In some embodiments, spacer 4470, translator tube 4401, or both, include a recess feature. For example, spacer 4470, translator tube 4401, or both, may include a continuous groove that reduces the contact area between the end face of translator tube 4401 and the mating face of piston 4460. The groove may include any suitable cross-sectional shape such as, for example, square, rounded, triangular, trapezoidal, compound, or any other suitable shape. In some embodiments, the groove need not be continuous and may be sectioned or include pockets.

In some embodiments, cooling air is directed to a translator to cool one or more surfaces or components (e.g., 2628 of FIG. 2 or 3898 of FIG. 38). For example, a plenum may direct cooling air to a bearing surface to cool the bearing surface to reduce thermal deformation or expansion.

In some embodiments, a piston may include features or components to reduce, limit, distribute, or otherwise control adverse impacts of blow-by gas downstream of a seal (e.g., to a translator tube). An example of this is shown in FIG. 44 with spacer 4470. In some embodiments, piston 4460 may include or be configured with features shown in FIG. 6. In some embodiments, as illustrated, [insert description of FIG. 6 based on slides].

Figure 45:
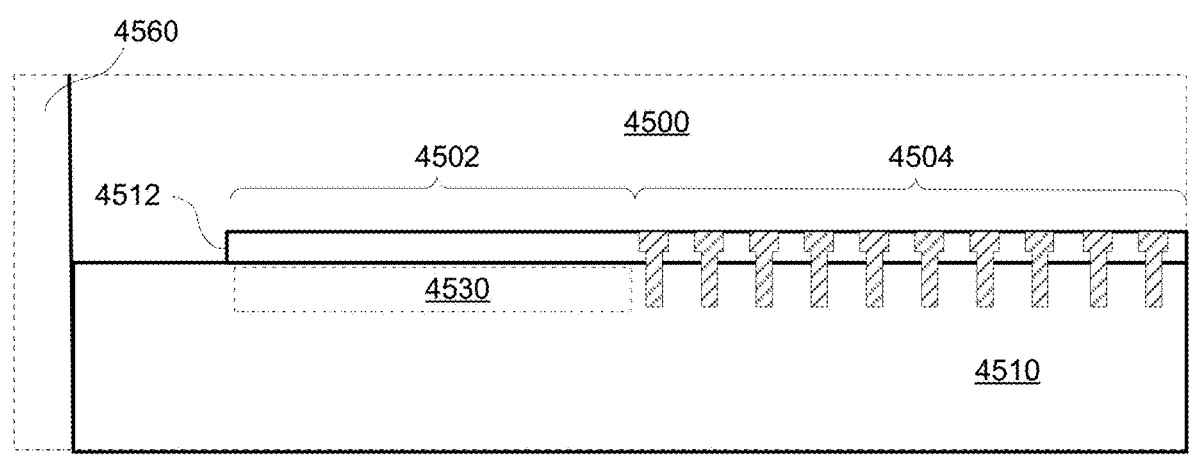
FIG. 45 shows a side cross-sectional view of an end of an illustrative translator tube, and a rail having a cantilevered section, in accordance with some embodiments of the present disclosure.

FIG. 45 shows a side cross-sectional view of an end of illustrative translator tube 4510, and rail 4512 having a cantilevered section, in accordance with some embodiments of the present disclosure. For example, rails may be configured to constrain rotational motion of the translator and/or to mount an encoder tape for position measurement. Because, in some embodiments, the rail thickness may be comparable to that of the translator tube, the rail may be capable of increasing the local stiffness of the translator tube (e.g., at least where the rails are attached). In some embodiments, the rail may experience relatively large local stresses at an end of the rail if it is rigidly coupled to the translator tube over the entire length of the rail (e.g., thus causing deformation in the bearing surface). In some embodiments, the rail is affixed to the translator only along a portion of the rail, and a cantilevered section of the rail is not affixed to the tube. Accordingly, the rail having a cantilevered section contributes less to the stiffness of the translator assembly, and also may cause less deformation. For example, under compressive load (e.g., caused by higher-pressure acting on a translator tube), increased stiffness provided by a fully-affixed rail may result in localized deformation with an out-of-round shape incompatible with gas bearing operation. In some embodiments, the portion of a bearing surface most affected by this deformation may be decoupled from the rail stiffness by cantilevering a portion of the rail. Translator tube 4510 of FIG. 45 is coupled to rail 4512, having affixed portion 4504 and cantilevered portion 4502. Translator tube 4510 may exhibit less localized stress than a translator tube having a fully affixed rail without cantilevered portion 4502. Piston 4560, which is affixed to translator tube 4510, is shown for reference.

Figure 46:
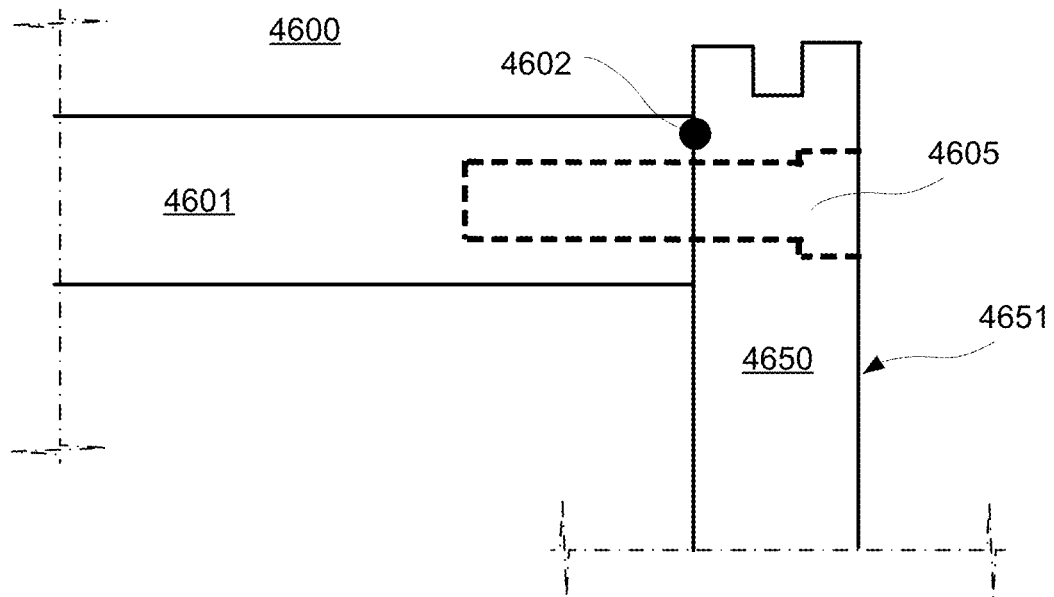
FIG. 46 shows a perspective view of an end of an illustrative translator tube, coupled to a piston via fasteners, in accordance with some embodiments of the present disclosure.

FIG. 46 shows a perspective view of an end of illustrative translator tube 4601, coupled to piston 4650 via fasteners 4605, in accordance with some embodiments of the present disclosure. Translator tube 4601 is sealed to piston 4650 using seal 4602 (e.g., an O-ring, gasket, or other sealing material). Fasteners 4605, as illustrated are oriented axially extending through piston 4650 from piston face 4651 into an axial end of translator tube 4601. In some embodiments, piston 4650 may be a gas spring piston, for example.

Figure 47:
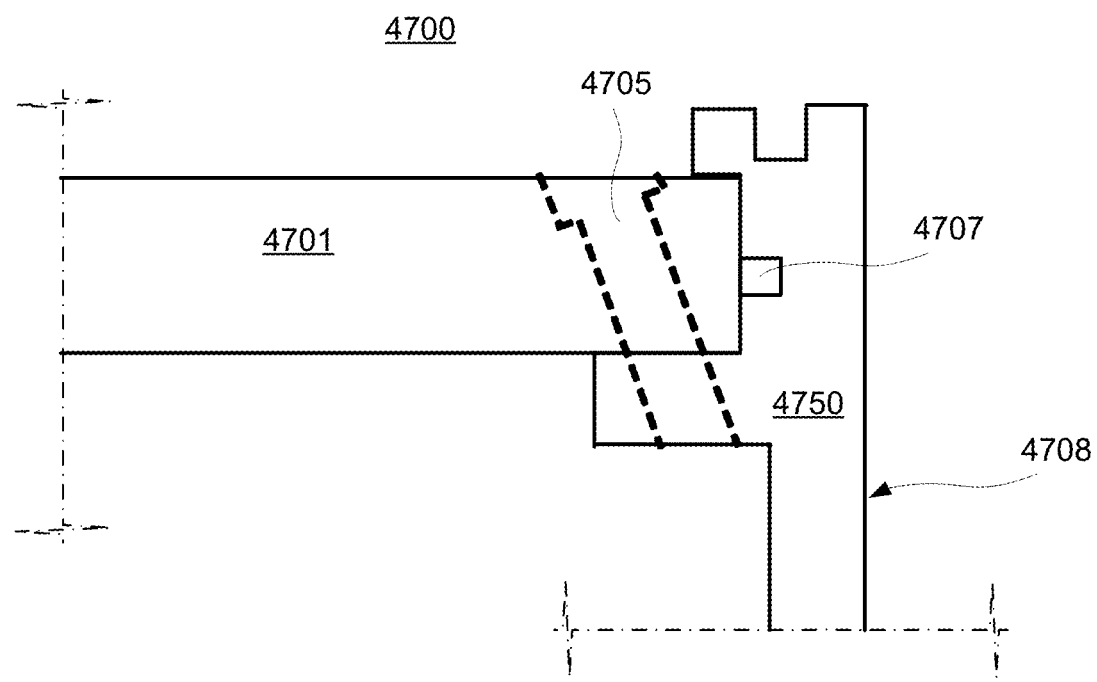
FIG. 47 shows a perspective view of an end of an illustrative translator tube, coupled to a piston via oblique-oriented fasteners, in accordance with some embodiments of the present disclosure.

FIG. 47 shows a perspective view of an end of illustrative translator tube 4701, coupled to piston 4750 via oblique-oriented fasteners 4705, in accordance with some embodiments of the present disclosure. Translator tube 4701 is sealed to piston 4750. In some embodiments, pocket 4707 is included in piston 4750 (e.g., as illustrated), translator tube 4701, or both. Fasteners 4705, as illustrated are oriented at an oblique angle (e.g., relative to the axial direction), and extend through a lateral surface of translator tube 4701 into piston 4750. In some embodiments, piston 4750 may be a reaction section piston, for example. For example, because fasteners 4705 engage the back side of piston 4750 (e.g., away from piston face 4708), less crevice volume is formed, which may reduce heat transfer, reaction quenching, or both.

Oblique-oriented fasteners are oriented at a non-zero angle to the axial direction (e.g., not parallel or perpendicular to the axial direction). In some embodiments, oblique-oriented fasteners allow for a relatively shorter piston in the axial direction (e.g., the piston need not accommodate the full length of the fastener but only a projected length). In some embodiments, oblique-oriented fasteners allow for a relatively shorter piston length while using fasteners of a desired length (e.g., for a desired bolt tension/stretch when torqued), which may allow for a shorter translator, shorter total generator assembly length, or both.

In some embodiments, fasteners (e.g., oblique-oriented fasteners) may be arranged diametrically-opposed (e.g., opposed in the radial direction). For example, in some such embodiments, radial tension contributions from each fastener is balanced by the opposing fastener, thus resulting in only net axial clamp load. In some embodiments, the use of opposed oblique-oriented fasteners 4430 allows for a sufficient axial clamp load on the piston joint with minimal length and mass. A piston may be affixed to a translator tube using any suitable number of fasteners, in any suitable arrangement, and oriented at any suitable angle. For example, fasteners (e.g., oblique-oriented fasteners) may be evenly spaced azimuthally around the piston. In a further example, oblique-oriented fasteners may be grouped, with the groupings spaced around the piston. In some embodiments, fasteners with orientations parallel or perpendicular to the translator axial direction may be used. In some embodiments, fasteners with differing orientation or non-uniform spacing may be used.

In some embodiments, the axial length of a piston may be selected to reduce or otherwise limit heat transfer from the piston face to a bearing surface of the translator.

Figure 48:
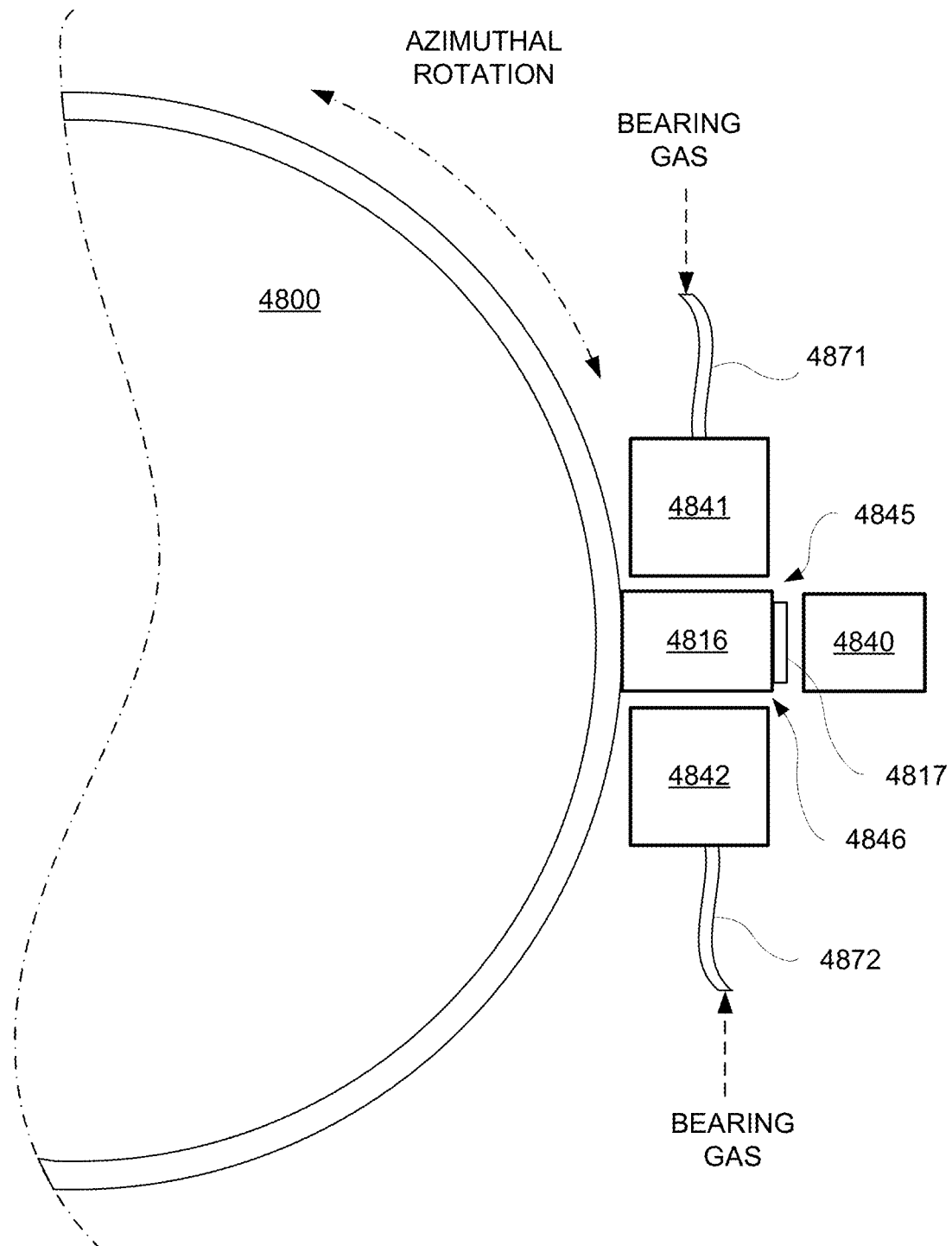
FIG. 48 shows an end view of an illustrative translator and additional components, in accordance with some embodiments of the present disclosure.

FIG. 48 shows an end view of translator 4800 and additional components, in accordance with some embodiments of the present disclosure. Translator 4800 include rail 4816, which is at least partially rigidly affixed to a translator tube of translator 4800. Bearing gaps 4845 and 4846 are arranged between rail 4816 and bearing housings 4841 and 4842, respectively. Bearing gaps 4845 and 4846 are configured to be filled with a bearing gas having a pressure suitable for functioning as a gas bearing to maintain or otherwise constrain an azimuthal position of translator 4800 (e.g., during operation or other processes).

Bearing housings 4841 and 4842 are configured to interface to corresponding gas bearings, which in turn interface with corresponding surfaces of rail 4816. In some embodiments, bearing housings 4841 and 4842 are stationary relative to translator 4800. For example, bearing housings 4841 and 4842 may be rigidly mounted to (e.g., fastened to), flexibly mounted to (e.g., mounted via a flexure to), or integrated into (e.g., be a single piece as) a stator, a bearing housing for constraining lateral motion of translator (e.g., bearing housings 3302 an 3304 of FIG. 33), a frame system, any other suitable stationary component, or any combination thereof. In some embodiments, bearing housings 4841 and 4842 are configured to generate corresponding gas bearings providing azimuthal stiffness to the orientation of translator 4800 (e.g., against azimuthal rotation of translator 4800, thus providing azimuthal anti-clocking). As illustrated, feed lines 4871 and 4872 are configured to provide bearing gas to respective bearing housings 4841 and 4842 (e.g., pressurized bearing gas supplied from a compressor or gas spring at greater than 1 atm). In some embodiments, contact bearings may be included instead of, or in addition to, gas bearings. For example, one or both of bearing housings 4841 and 4842 may alternatively include a bearing surface configured to contact rail 4816, or otherwise limit azimuthal rotation of rail 4816, while allowing rail 4816 to slide in the axial direction. In some embodiments, more than one rail, more than two gas bearing housings, or both may be provided and configured to constrain azimuthal rotation of a translator. For example, a second rail and corresponding bearing housings could be located 180° from the first rail and corresponding bearing housings. In some embodiments, a rail and bearing housings may not be needed. For example, another feature or component within the linear generator system (e.g., the stator) may constrain azimuthal rotation of the translator.

Position sensor 4840 is configured to sense a relative or absolute position of rail 4816 (e.g., and accordingly the relative position of other features of translator 4800). In some embodiments, translator 4800 is a rigid assembly (e.g., with each component moving with substantially the same velocity other than vibrations, pressure-induced strain, or other small perturbations). In some embodiments, for example, position sensor 4840 may be encoder read heads (e.g., magnetic or optical encoder read heads), and rails 4816 include corresponding encoder tapes (e.g., magnetic or optical tape). In some embodiments, position sensor 4840 may include an encoder read head (e.g., magnetic or optical encoder read head), and rail 4816 includes one or more indexing features to indicate position. In some embodiments, position sensor 4840 is stationary relative to translator 4800, and are thus able to sense the relative motion of the translator with respect to a stator, a cylinder, a bearing housing, any other suitable component, or any combination thereof. For example, position sensor 4840 may be rigidly mounted to (e.g., fastened to), flexibly mounted to (e.g., mounted via a flexure to), or integrated into (e.g., be a single piece as) a stator, a bearing housing, a structural frame system, any other suitable stationary component, or any combination thereof. Position sensor 4840 may include an absolute sensors, a relative sensors, an incremental sensors, any other suitable sensor type for measuring a position of translator 4800, or any combination thereof. In some embodiments, more than one rail, more than one position sensor, or both, may be included. For example, a second rail and corresponding position sensor could be located 180° from the first rail and corresponding position sensor. In some embodiments, a rail and position sensor may not be needed. For example, another feature or component within the linear generator system (e.g., the stator) may determine relative or absolute position of the translator. In some embodiments, bearing housings 4841 and 4842 may comprise a feature for allowing condensed liquid (e.g., condensed water from air) to drain from the bearing housing.

Figure 49:
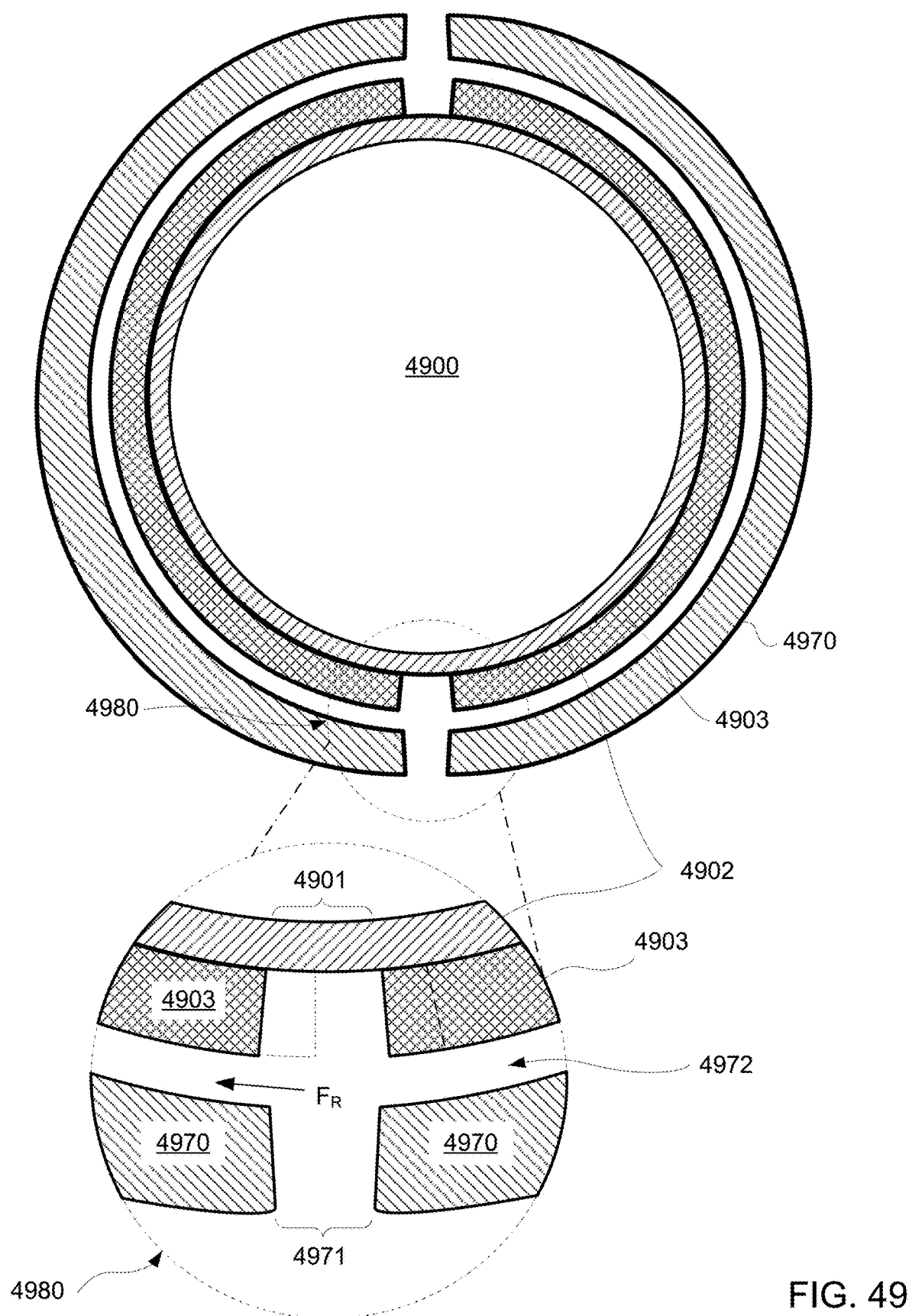
FIG. 49 shows a cross-sectional view of an illustrative translator and stator, and an enlarged portion, in accordance with some embodiments of the present disclosure.

FIG. 49 shows a cross-sectional view of illustrative translator 4900 and stator 4970, and enlarged region 4980, in accordance with some embodiments of the present disclosure. The cross-sectional view of FIG. 49 is taken at an axial location, showing translator tube 4902, magnet assembly 4903, and stator 4970. Magnet assembly 4903 is coupled to translator tube 4902 (e.g., using a press fit, fastening, bonding, adhering (e.g., gluing), wrapping, or any other technique to form a rigid assembly). Stator 4970 may include, for example, phase windings and stator teeth (e.g., iron or steel, laminated sheets). Stator 4970 forms airgap 4972 with magnet assembly 4903 of translator 4900. The magnetic reluctance of stator 4970 and translator 4900 assembly is proportional to the size of airgap 4972. Airgap 4972 directly affects the electromagnetic interactions of the stator 4970-translator 4900 assembly. In some embodiments, stator 4970 may include an azimuthal gap 4971 that continues the axial length of stator 4970 or a portion thereof, and magnet assembly 4903 of translator 4900 may include a corresponding azimuthal gap 4901 that continues the axial length of magnet assembly 4903 or a portion thereof. The gaps in the stator (e.g., gap 4971) and the magnet assembly (e.g., gap 4901) may be azimuthally aligned, and during operation, act to maintain an azimuthal position of magnetic assembly 4903 relative to stator 4970 (e.g., and thus the relative position of translator 4900 and stator 4970). Stator 4970 and translator 4900 may include any suitable number of corresponding gaps (e.g., a translator may include one or more gaps, and a stator may include one or more gaps), configured to provide anti-clocking of the translator. When corresponding gaps of the stator and translator are misaligned azimuthally, an electromagnetic force is generated causing the gaps to align. For example, the dashed magnet assembly in the enlarged view of region 4980 shows azimuthal misalignment, and a restoring force FR would be generated. In some embodiments, the one or more gaps in the stator may allow for phase windings to be passed through for routing (e.g., by providing an open path for wires to be routed away from the phase windings). Although shown in FIG. 49 as being approximately equal, gap 4971 and gap 4901 need not be equal in azimuthal length. For example, in some embodiments, gap 4971 and gap 4901 may have different azimuthal lengths and their corresponding centerline azimuthal positions may align. In some embodiments, gap 4901, gap 4971, or both, may contain or comprise of a dielectric material. For example, gap 4901 may be fully or partially filled with plastic "dummy" magnets. In a further example, gap 4971 may contain a plastic component for guiding phase windings to be passed through for routing.

Figure 50:
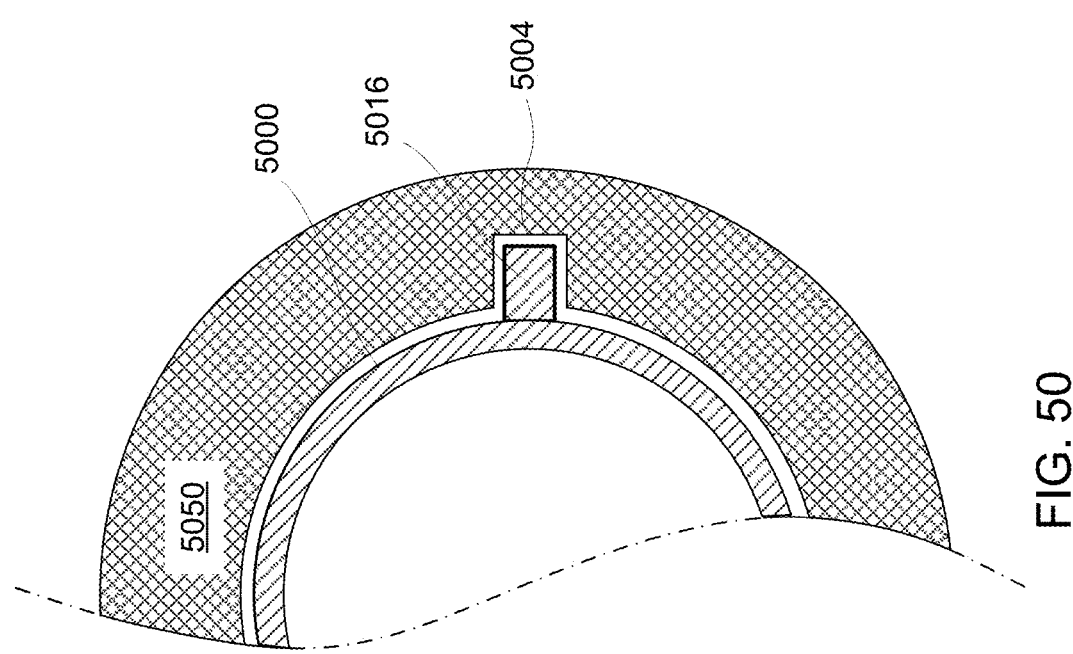
FIG. 50 shows cross-sectional view of an illustrative translator and stator, in accordance with some embodiments of the present disclosure.

FIG. 50 shows cross-sectional view of translator 5000 and stator 5050, in accordance with some embodiments of the present disclosure. In some embodiments, stator 5050 may include one or more reliefs 5004 to accommodate respective rail 5016, and optionally additional rails, during axial motion of translator 5000 (e.g., when rail 5016 is axially coincident with stator 5050). In some embodiments, an air gap between translator 5000 and stator 5050 need not be maintained in one or more relief 5004. In some embodiments, a stator includes one or more reliefs to accommodate corresponding features of a translator during axial motion of the translator. For example, while a portion of a stator is configured to form an airgap with a translator (e.g., having a predetermined magnetic reluctance and dimensional tolerance), other portions of stator need not for an airgap with the translator. In some embodiments, relief 5004 is not needed. For example, the combination of heights of the rail and the air gap may be sufficient such that a relief is not needed. In a further example, a rail may be affixed to the translator at a location such that the rail does not move within the stator.

Figure 51:
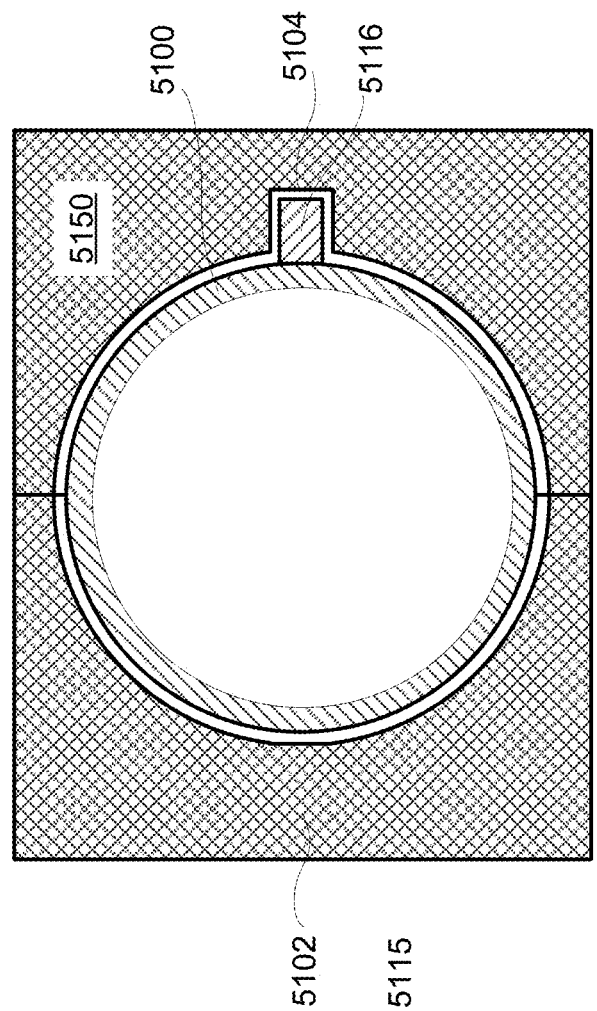
FIG. 51 shows cross-sectional view of an illustrative translator and bearing housing, in accordance with some embodiments of the present disclosure.

FIG. 51 shows cross-sectional view of translator 5100 and bearing housing 5150, in accordance with some embodiments of the present disclosure. In some embodiments, bearing housing 5150 may include one or more 5104 to accommodate rail 5116, and other optional rails, during axial motion of translator 5100 (e.g., when rail 5116 is axially coincident or otherwise overlapping with bearing housing 5150). As shown in FIG. 51, a gas bearing arranged radially between bearing housing 5150 and translator 5100 does not extend into one or more reliefs 5104. In some embodiments, a gas bearing arranged radially between bearing housing 5150 and translator 5100 does extend into one or more reliefs 5104. In some embodiments, as illustrated, bearing housing 5150 are of clamshell-type construction, wherein two components mate together to form the complete bearing housing 5150, as shown in FIG. 51. It should be noted that for clarity and ease of illustration the drawings of the present patent application are not necessarily drawn to scale and do not reflect the actual or relative size of each feature. A bearing housing may be any suitable shape such as, for example, round, rectangular, polygonal, curved, or any other shape including a single segment or more than one segment. Although shown as cylindrical in the present disclosure, a translator "tube" may include any suitable cross-sectional shape or cross-sectional shape profile along its axial length. For example, a translator tube may include an outer surface that is a bearing surface, and the bearing surface may be flat, round, curved, segmented, or any other suitable profile at which a bearing gap may be formed to contain a gas bearing. In some embodiments, a gas bearing need not include relief 5104. For example, the rail may be affixed to the translator at a location such that the rail does not move within the gas bearing.

The cooling system is configured to facilitate distribution of a cooling fluid to various portions of the linear generator and housing (e.g., for air-cooling). It will be understood that while the description that follows refers primarily to air-cooled systems, a cooling system may distribute and condition any suitable cooling fluid (e.g., gas, liquid, or a combination thereof), in accordance with the present disclosure. Cooling may be performed to counteract energy transfer in the form of heat due to chemical processes (e.g., reactions of fuel and air), compression and expansion processes (e.g., compression work on a working fluid), mechanical processes (e.g., from friction, or viscous effects), electrical processes (e.g., ohmic losses in power electronics or electrical components), or a combination thereof.

Figure 52:
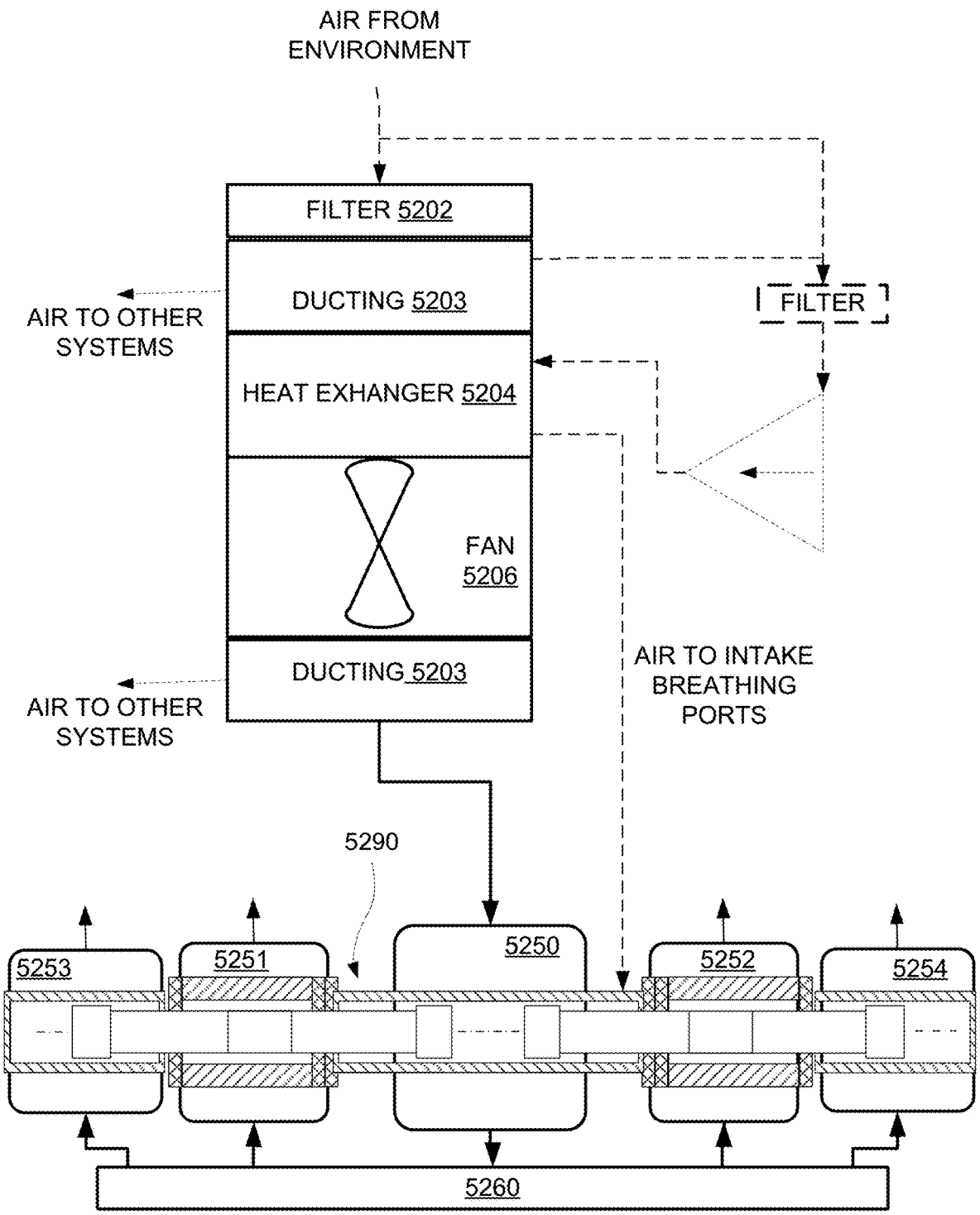
FIG. 52 shows a system diagram of an illustrative cooling system, in accordance with some embodiments of the present disclosure.

FIG. 52 shows a system diagram of illustrative cooling system 5200, in accordance with some embodiments of the present disclosure. Illustrative cooling system 5200 includes filter 5202, ducting 5203, heat exchanger 5204, fan 5206, cooling jackets 5250-5254, ducting 5260, any other suitable ducting (e.g., plenums, manifolds, tubing, piping, and fittings), louvres, sensors, any other suitable components (not shown), or any suitable combination thereof.

Fan 5206 is configured to draw ambient air, or another suitable gas source, through filter 5202, duct 5203 and heat exchanger 5204, which may be arranged in any suitable order, upstream or downstream of fan 5206, and provide air to cooling jackets 5250, 5251, 5252, 5253, and 5254, in any suitable arrangement. As shown illustratively in FIG. 52, cooling air is supplied to cooling jacket 5250 (e.g., at the cylinder housing the reaction section), from which the air enters duct 5260, which distributes the gas in parallel to cooling jackets 5251 and 5252 (e.g., arranged at respective stators), and cooling jackets 5253 and 5254 (e.g., arranged at respective gas springs). As cooling gas flows through each of cooling jackets 5250-5254, the temperature of the cooling gas may rise accordingly, based on the heat load, the cooling gas mass flow, and thermo-physical properties of the cooling gas.

In some embodiments, cooling jackets 5250-5254 include plenums that encapsulate, surround or otherwise shroud components of generator assembly 5290. In some embodiments, cooling jackets 5250-5254 include internal passages, tubes, hoses, cooling plates, fins, or other cooling features configured to cool components of generator assembly 5290. For example, in some embodiments, cooling jacket 5250 includes a cylindrical shroud arranged azimuthally around and outside of the cylinder, guiding airflow over the exterior of the cylinder. In a further example, in some embodiments, cooling jackets 5253 and 5254 each include a respective cylindrical shroud arranged azimuthally around and outside of the respective gas spring cylinder, guiding airflow over the exterior of the respective gas spring cylinder. In some embodiments, cooling jackets 5251 and 5252 are integrated into respective stators of generator assembly 5290. For example, cooling jackets 5251 and 5252 may include passages internal of respective stators (e.g., passages in the ferrous teeth of the stator). Cooling jackets may include manifolds, shrouds, vanes, any other suitable flow-directing features, or any combination thereof. Air provided from fan 5206 may directed along any suitable path in the cooling jackets 5250-5254. For example, in some embodiments, cooling jackets 5250-5254 may all receive air in parallel from duct 5260. In a further example, in some embodiments, some of cooling jackets 5250-5254 may receive air in parallel with each other, and in series with one or more other cooling jackets of cooling jackets 5250-5254. In some embodiments, cooling jackets 5250-5254 are arranged in series, in any suitable order. For example, the order and arrangement may depend on heat loads, temperature limits, plumbing routing, or a combination thereof. A linear generator system may include components not shown in FIG. 52 that have dedicated cooling paths (e.g., apart from cooling jackets 5250-5254). For example, power electronics, a control system enclosure, or both can be cooled separately (e.g., using a cooling jacket). In some embodiments, the air flow from the cooling system 5200 may be used to maintain the power electronics and control enclosures at a positive pressure with respect to the surrounding to protect electronic components from dust and other particles that may be detrimental to electronic components operation. In some embodiments, the air flow used to cool the electronic components may be treated in various ways, including heating and filtering to reduce moisture and particles from the cooling air. In a further example, a section of a translator may be cooled separately. In some embodiments, some cooling air downstream of cooling jacket 5250 may be directed away from duct 5260 for other cooling purposes (e.g., general purpose cooling, stator cooling, bearing cooling, translator cooling).

In some embodiments, intake gas from duct 5203 (e.g., which is filtered) may be provided to boost blower 5210, which increases the pressure of the intake gas (e.g., air). In some embodiments, an additional filter may be provided to further filter the air before entering boost blower 5210 (e.g., a finer grade filter with a higher associated pressure drop). In some embodiments, intake gas is diverted upstream of filter 5202 to boost blower 5210 with or without an additional filter. The intake gas may then be directed through heat exchanger 5204 (e.g., to cool the gas after boost blower 5210), and then to other suitable components of an intake system before entering intake breathing ports of generator assembly 5290. In some embodiments, heat exchanger 5204 may be a gas-to-gas heat exchanger, a gas-to-liquid heat exchanger, or a combination thereof.

In some embodiments, some or all of cooling jackets 5250-5254 may be omitted, combined, or otherwise altered from those shown in FIG. 52, in accordance with the present disclosure. In some embodiments, additional cooling jackets not shown in FIG. 52 may be included. For example, cooling jackets may be included to provide cooling for one or more bearing housings, seals, manifolds, or components of other systems (e.g., power electronics of a control system, or processing equipment of the control system).

In some embodiments, the cooling system may be configured to cool or heat a portion of a cylinder, bearing housing, translator, or other suitable component, to help bearing clearances and friction remain sufficiently low to minimize damage, wear, or both. For example, a bearing gap may be selected to be as thin as possible without incurring friction losses from contact due to thermal effects, off-axis loading, or other perturbation.

In some embodiments, cooling system 5200 includes a cooling subsystem for cooling a translator. For example, a compressed gas system may be included to provide compressed gas to the translator surface to provide convective cooling of the translator (e.g., a bearing surface thereof). In some embodiments, cooling system 5200 is configured to provided slightly heated gas (e.g., heated to a temperature above an environmental temperature) to one or more components. For example, cooling system 5200 may provide slightly heated air to electronics (e.g., in an enclosure or a rack) to provide humidity protection (e.g., to avoid condensation). In some embodiments, cooling system 5200 includes one or more controllable actuators to control flow paths to allow preferential heating or cooling of components.

The frame system is configured to maintain position, alignment, or both and provide rigidity against deflection for components of an integrated linear generator system. For example, the stationary components of a generator assembly may be secured to the frame system to prevent relative motion during operation. In some embodiments, for example, a linear generator may operate using gas bearings and relatively strict spatial tolerances. Accordingly, maintenance of spatial arrangements and alignments in view of structural effects (e.g., component weight and mounting), cyclic pressure loadings, off-axis loadings, thermal expansion, and other operating impacts is important for low-friction, prolonged operation. For example, a frame system may provide alignment along any suitable orientation (e.g., axial, azimuthal, radial, or any combination thereof)

Figure 53:
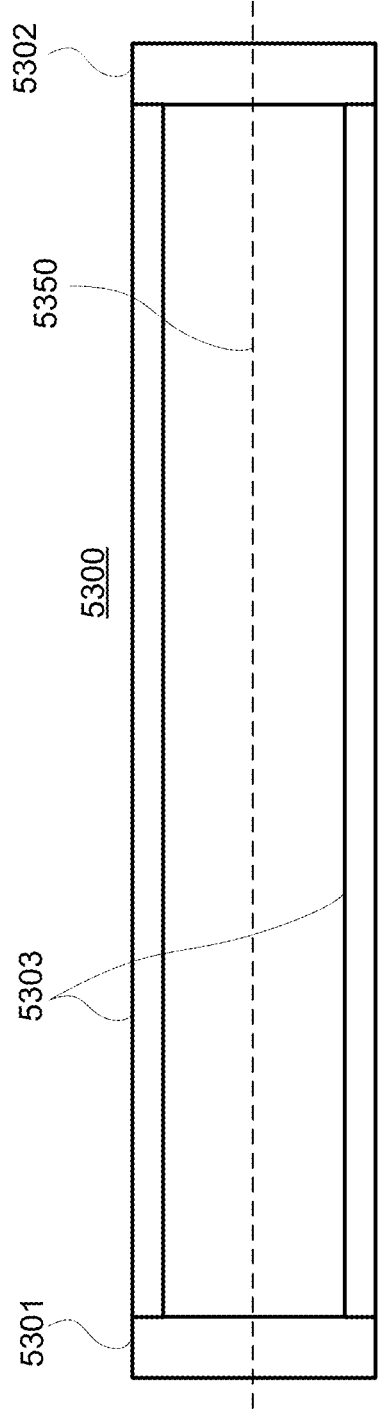
FIG. 53 shows a top view of an illustrative frame system, in accordance with some embodiments of the present disclosure.

FIG. 53 shows a top view of an illustrative frame system 5300, in accordance with some embodiments of the present disclosure. Illustrative frame system 5300 includes end members 5301 and 5302, axial members 5303, any other suitable components (not shown), or any suitable combination thereof. In some embodiments, frame system 5300 is symmetric, or partially symmetric about axis 5350 (e.g., about which a generator assembly is centered). In some embodiments, axial members 5303 provide axial stiffness to frame system 5300, axial alignment of components along axis 5350 (e.g., components of a generator assembly may mount to axial members 5303), or both. In some embodiments, end members 5301 and 5302 are configured to react to forces from respective gas spring cylinders. For example, gas springs may exert large forces on respective gas spring heads axially outward (e.g., especially when the translators are outboard and the gas springs are compressed). Accordingly, end members 5301 and 5302, and axial members 5303 may be configured to react against corresponding axial forces. Axial members 5303 may be welded, brazed, fastened (e.g., bolted), or otherwise affixed to end members 5301 and 5302. In some embodiments, the affixation of axial members 5303 to end members 5301 and 5302 may be reinforced (e.g., through the use of tie rods or weldments). In some embodiments, the area that is open between axial members 5303 and end members 5301 and 5302 enables relatively easier manufacture of a linear generator system, by enabling the installation of components into frame system 5300 from the top (e.g., using a crane or other lifting/lowering device).

Figure 54:
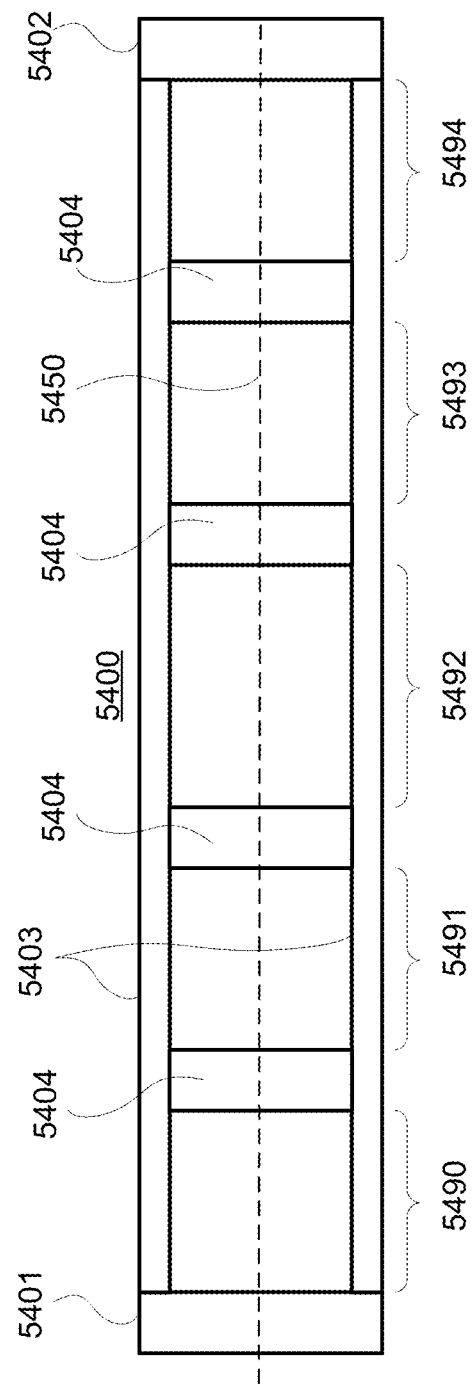
FIG. 54 shows a side view diagram of an illustrative frame system, in accordance with some embodiments of the present disclosure.

FIG. 54 shows a side view diagram of an illustrative frame system 5400, in accordance with some embodiments of the present disclosure. Illustrative frame system 5400 includes end members 5401 and 5402, axial members 5403, lateral members 5404, any other suitable components (not shown), or any suitable combination thereof. In some embodiments, frame system 5400 provides longitudinal stiffness, lateral stiffness, azimuthal stiffness, or a combination thereof to components of a generator assembly. In some embodiments, for example, frame system 5400 is symmetric, or partially symmetric about axis 5450 (e.g., about which a generator assembly may be centered or otherwise aligned). In some embodiments, axial members 5403 provide axis stiffness to frame system 5400, axial alignment of components along axis 5450 (e.g., components of a generator assembly may mount to axial members 5403), or both. In some embodiments, lateral members 5404 provide mounting locations, lateral stiffness, axial stiffness, or any combination thereof to components of a linear generator. In some embodiments, end members 5401 and 5402 are configured to react against forces from respective gas spring cylinders. For example, gas springs may exert large forces on respective gas spring heads axially outward (e.g., especially when the translators are near BDC positions and the gas springs are compressed). Accordingly, end members 5401 and 5402 may be configured to react to corresponding axial forces. Axial members 5403 may be welded, brazed, fastened (e.g., bolted), or otherwise affixed to end members 5401 and 5402. Lateral members 5404 may be welded, brazed, fastened (e.g., bolted), or otherwise affixed to axial members 5403. A frame system may include any suitable number of lateral members arranged at any suitable angle relative to axial members 5403. Axial spacing of lateral members may be sufficient to allow for ease of maintenance (e.g., access to key components such as bearings, pistons, rings, stators, and other components).

In some embodiments, a frame system includes one or more access areas arranged to accommodate components of a linear generator system. Frame system 5400 includes access area 5491 of the one or more members for receiving a first linear electromagnetic machine (LEM), access area 5493 of the one or more members for receiving a second LEM, access area 5492 of the one or more members for receiving a cylinder, access area 5490 of the one or more members for receiving a gas spring cylinder, and access area 5494 of the one or more members for receiving a gas spring cylinder. Frame system 5400 includes one or more openings among the one or more members, wherein the one or more openings correspond to access areas 5490-5494. Access areas 5490 and 5494 may be axially aligned (e.g., along axis 5450), laterally aligned (e.g., relative to axis 5450), or both.

FIG. 55 shows a side view of illustrative assembly including frame system 5500 coupled to generator assembly 5550 (shown in cross-section for illustrative purposes), in accordance with some embodiments of the present disclosure. Illustrative frame system 5500 includes end members 5501 and 5502, axial members 5503, lateral members 5504, any other suitable components (not shown), or any suitable combination thereof. Generator assembly 5550 may be secured to frame system 5500. For example, components of generator assembly 5550 (e.g., one or more cylinders, one or more stators, one or more bearing housings, one or more seals) may be aligned, affixed, or both to one or more lateral members 5504, axial members 5503, end member 5501, end member 5502, or a combination thereof. In some embodiments, components of generator assembly 5550 may be aligned, affixed, or both, to one or more lateral members 5504, axial members 5503, end member 5501, end member 5502, or a combination thereof using mounting components, flexure components, or a combination thereof. In some embodiments, lateral members may include an opening configured to accommodate the generator assembly, or components thereof. In some embodiments, one or more lateral members, or all lateral members, may include any suitable plate, support, or truss design. For example, lateral members may include simple beams (e.g., welded box beams), a plate with openings, or any other suitable design. In some embodiments, each respective lateral member may include an opening that extends to the periphery of the respective lateral member, wherein the opening is configured to accommodate the generator assembly or a portion thereof. For example, in some embodiments, an opening in each lateral member may extend to the top of the lateral member, thus allowing the generator assembly, or portions thereof, to be inserted laterally from the top. In a further example, portions of the generator assembly may be inserted, installed, or removed via one or more openings in the frame system, or members thereof.

Illustrative frame system 5500 includes mounts 5590 and 5591. In some embodiments, at least one mount may be affixed to the frame. For example, the linear generator may operate in one or more frequency ranges and at least one mount is capable of attenuating vibrations from the linear generator. As illustrated, mounts 5590 and 5591 are affixed to frame system 5500. In some embodiments generator assembly 5550 operates in one or more frequency ranges and mounts 5590 and 5591 are capable of attenuating vibrations from the linear generator (e.g., at the one or more frequency ranges). Mounts 5590 and 5591 may be separate, part of a mounting system, combined, omitted, or otherwise modified, in accordance with some embodiments of the present disclosure. In some embodiments, one or more mounts may comprise rollers or wheels for transporting frame system 5500.

Generator assembly 5550, as illustrated, includes cylinder 5551 (gas spring), bearing housing 5552, translator 5553, stator 5554, bearing housing 5555, cylinder 5556, translator 5557, bearing housing 5558, stator 5559, bearing housing 5560, and cylinder 5561 (gas spring). Bearing housings 5552 and 5555, translator 5553, and stator 5554 form a first LEM, and bearing housings 5558 and 5560, translator 5557, and stator 5559 form a second LEM. In some embodiments, the first LEM and the second LEM are aligned to each other using frame system 5500. In some embodiments, stator 5554 and stator 5559 are aligned to each other using frame system 5500, an assembly table upon which frame system 5500 sits and associated fixtures, or both. For example, the first LEM may be laterally aligned to the second LEM (e.g., to align stator bores of respective stators of the first and second LEMs). In a further example, the first LEM is axially aligned to the second LEM (e.g., to set the longitudinal spacing between the first and second LEM). In an illustrative example, when using frame system 5500 to align components to one another, this entails arranging the components relative to each other and relative to frame system 5500 to achieve a desired alignment. Once arranged, the relevant components may be constrained or otherwise secured by the frame by way of affixation, mechanical engagement, boundaries defined by frame system 5500, constraints imposed by one or more other components constrained or otherwise secured by frame system 5500, by way of any other suitable mechanism to constrain or secure a component to frame system 5500, or any combination thereof.

Generator assembly 5550 may be the same as, or similar to generator assembly 200 of FIG. 2, for example. In some embodiments, generator assembly 5550 may include one or more subassemblies that may be, but need not be, coupled to each other. For example, in some embodiments, stators 5554 and 5559 (e.g., with or without corresponding bearing housings connected) may be mounted to frame system 5500. Cylinders 5551, 5556, and 5561 may also be mounted to frame system 5500, and aligned to the corresponding stators 5554 and 5559. Accordingly, frame system 5500 may align or help maintain alignment of components of generator assembly 5550. In some embodiments, frame system 5500 may include locating features (e.g., pins), mounting features (e.g., hole patterns, threaded studs), aligning features (e.g., adjustable mounts), or a combination thereof, which may engage with corresponding features of the generator assembly.

Figure 58:
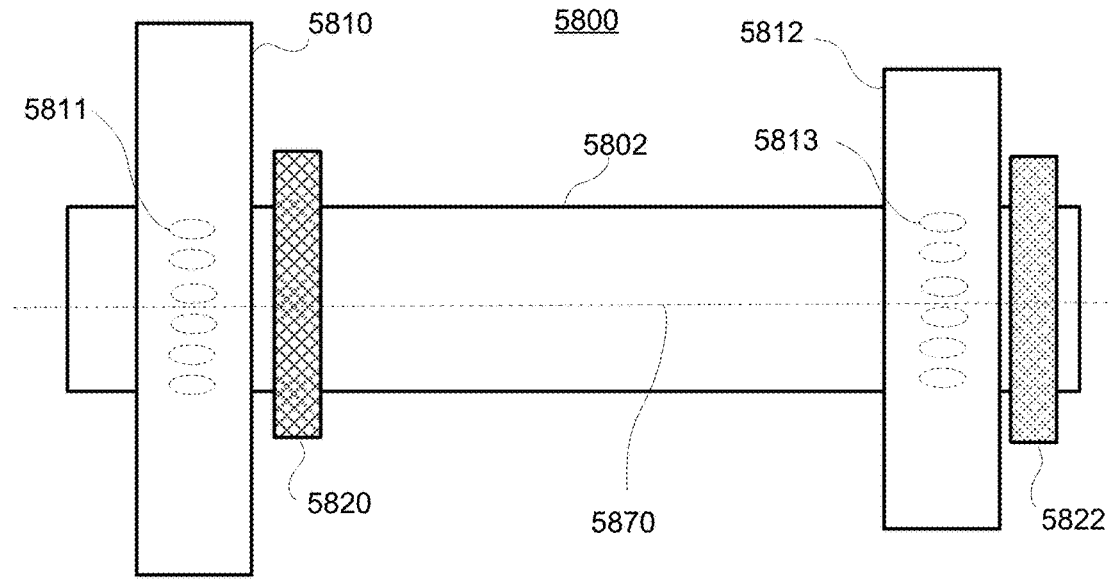
FIG. 58 shows a side view of an illustrative assembly including a cylinder having mounts, in accordance with embodiments of the present disclosure.

In an illustrative example, a linear generator may include a structural frame (e.g., frame system 5500), a cylinder (e.g., cylinder 202 of FIG. 2), a first LEM (e.g., LEM 256 of FIG. 2), and a second LEM (e.g., LEM 252 of FIG. 2). The cylinder may be affixed to a center region of the structural frame. The first LEM is arranged on a first longitudinal side of the cylinder and affixed to the structural frame. The second LEM is arranged on a second longitudinal side of the cylinder, and affixed to the structural frame. The second longitudinal side is opposite the first longitudinal side. The second LEM is aligned to the first LEM, and the cylinder is aligned to the first LEM and to the second LEM. In other embodiments, the first LEM is aligned to the second LEM, and the cylinder is aligned to the first LEM and the second LEM. For example, any suitable components of linear generator 200 of FIG. 2 may be aligned to each other using a structural frame and corresponding mounting components. In a further example, the linear generator may additionally include a first gas spring cylinder (e.g., cylinder 204 of FIG. 2) affixed to the structural frame and aligned to the first LEM (e.g., LEM 256 of FIG. 2), and a second gas spring cylinder (e.g., cylinder 205 of FIG. 2) affixed to the structural frame and aligned to the second LEM (e.g., LEM 252 of FIG. 2). In a further example, the structural frame may include one or more openings in a top surface allowing for insertion of the cylinder into the structural frame, insertion of the first LEM into the structural frame, and insertion of the second LEM into the structural frame, and insertion of other components into the structural frame. In a further example, the cylinder (e.g., cylinder 202 of FIG. 2) may be affixed to the structural frame (e.g., frame system 5500) by one or more flexures, mounts, or both (e.g., as illustrated in FIGS. 56-58). In some embodiments, auxiliary equipment may be attached to the structural frame. For example, one or more power electronics systems may be mounted on the outside of the frame system, near the stators, to reduce connector lengths, reduce ohmic losses, and reduce electromagnetic interference (EMI). In a further example, an intake system (with or without a fuel system), an exhaust system, or both may be mounted on top of the frame system. In a further example, each component required for testing, operation, or both of a generator assembly may be mounted to the frame system. Frame system 5500 includes mounting areas, similar to frame system 5400 of FIG. 54, for accommodating access to components of a generator assembly (e.g., for assembly, for maintenance, or both). As illustrated, frame system 5500 includes tie rod 5509, which is configured to provide compressive force on frame system 5500 (e.g., with or without a compressive pre-load in the non-operating state). A frame system may include one tie rod or more than one tie rod, but need not include any tie rods, in accordance with some embodiments of the present disclosure. In some embodiments, a frame system (e.g., frame system 5500) is configured to limit stretch of the frame members to within a predetermined range (e.g., less than 250 microns, less than 500 microns, less than 1 mm, less than 5 mm, or any other suitable range). For example, due to stresses arising from thermal and pressure effects, a frame system may undergo strain in one or more directions. The strain may be quasi steady (e.g., occurring over relatively large time scales compared to a cycle) or periodic or near-periodic (e.g., resulting from cycle behavior). Frame system 5500 may be configured to provide compliance (e.g., axial compliance) to one or more components, while maintaining a center line for cylinders, stators, bearing housings, any other suitable components, or any combination thereof.

FIG. 56 shows an end view of an illustrative frame system 5600, in accordance with some embodiments of the present disclosure. For example, frame system 5600 may be similar to frame system 5300 of FIG. 53 and frame system 5400 of FIG. 54. End member 5601 includes opening 5606 (e.g., to accommodate a gas spring cylinder) and features 5604. Illustrative features 5604 include cutouts arranged near the attachment location of axial members 5603, reducing rigidity between portions of end member 5601 near opening 5606 and portions of end member 5601 near the attachment location of axial members 5603. For example, during operation of the integrated linear generator system, the gas spring cylinder may impart an axial force directed outwards to end member 5601 near opening 5606. Features 5604 may allow the axial force experienced by axial members 5603 to be accordingly reduced. For example, features 5604 may allow portions of end member 5601 between opening 5606 and axial members 5603 to function as flexures. In a further example, features 5604 reduce forces transmitted to axial members 5603 and therefore the deflection axial members 5603 experience. End member 5601 may be subjected to large axial forces when the corresponding translator is at or near BDC, which may cause axial members 5603 to deflect. Features 5604 reduce that transmission of force, and thus deflection, to axial members 5603. Reduced deflection of axial members 5603 may help maintain alignment of components coupled to frame system 5600. Although not shown in FIG. 56, end member 5601 may include a bolt pattern, a bolt circle, one or more protruding studs (e.g., threaded studs), one or more locating features (e.g., pins, holes, slots), or any other suitable mounting feature. For example, in some embodiments, end members 5601 and 5602 include a hole pattern for mounting a corresponding gas spring cylinder (e.g., having a corresponding flange with a corresponding hold pattern). In some embodiments, features 5604 need not be included.

FIG. 57 shows a cross-sectional view of an illustrative portion of an integrated linear generator system, which includes end member 5702, gas spring cylinder 5703, and head 5705, in accordance with some embodiments of the present disclosure. In some embodiments, gas spring cylinder 5703 interfaces to an opening of end member 5702. For example, end member 5702 and gas spring cylinder 5703 may include one or more corresponding locating features 5710. Locating features 5710 may include, for example, an arrangement of studs, an arrangement of pins, and arrangement of holes, and arrangement of slots, any other suitable feature for constraining the relative position of end member 5702 and gas spring cylinder 5703, or any suitable combination thereof. For example, locating features 5710 may include a corresponding bolt circle in each of end member 5702 and gas spring cylinder 5703, as well as a set of locating pins in one component and corresponding holes in the other component. In some embodiments, gas spring cylinder 5703 may include flange 5706 configured to interface to end member 5702. Flange 5706 may be arranged on, or as part of, gas spring cylinder 5703 at any suitable axial location. For example, flange 5706 may interface to head 5705 and end member 5702. In a further example, flange 5706 may be arranged at the distal end of cylinder 5703 as compared to head 5705. In a further example, flange 5706 may be arranged to not impact a higher-pressure port, a lower-pressure, a cooling jacket, or a combination thereof. In some embodiments, end member 5702 includes one or more features similar to features 5604 of FIG. 56 for adjusting the axial stiffness of one more portions of end member 5702. End member 5702 is configured to provide compliance (e.g., axially), via features 5604, while maintaining a center line of arrangement of cylinder 5703.

FIG. 58 shows a side view of illustrative assembly 5800 including cylinder 5802 having mounts 5820 and 5822, in accordance with embodiments of the present disclosure. As illustrated, in some embodiments, first cylinder mount 5820 and second cylinder mount 5822 are affixed to cylinder 5802. Cylinder mounts 5820 and 5822 are affixed to the cylinder and affixed to a frame to hold the cylinder 5802 substantially fixed. Cylinder mounts 5820 and 5822 may be affixed to any suitable component of a frame (e.g., an axial member, a lateral member, or both). In some embodiments, cylinder mounts 5820 and 5822 may be configured to, or comprise features that, allow for motion or the cylinder 5802 or changes in dimension of the cylinder 5802 (e.g., due to thermal expansion). For example, first cylinder mount 5820 may be axially stiff, constraining the mounting location to the cylinder 5802. In a further example, second cylinder mount 5822 may be axially soft, allowing cylinder 5802 to expand and contract axially (e.g., due to thermal expansion). In some embodiments, both first cylinder mount 5820 and second cylinder mount 5822 are stiff in the radial direction, constraining cylinder 5802 to not move significantly in the radial direction. First cylinder mount 5820 and second cylinder mount 5822 may be positioned axially at any suitable location (e.g., on either side of breathing manifolds 5810 and 5812). In an illustrative example, the first cylinder mount may be affixed to the cylinder on the intake side (e.g., as illustrated, inboard of intake breathing manifold 5810), and the second cylinder mount may be affixed to the cylinder on the exhaust side (e.g., as illustrated, outboard of exhaust breathing manifold 5812), wherein the intake end is the location of axial constraint. Intake breathing ports 5811 are axially arranged within intake manifold 5810, and exhaust breathing ports 5813 are axially arranged within exhaust manifold 5812. In some embodiments, cylinder mount 5820 is integrated into or are a part of manifold 5810. In some embodiments, cylinder mount 5822 is integrated into or are a part of manifold 5812. For example, intake-side cylinder mount 5820 may be affixed to or a feature of intake manifold 5810 on either side of the manifold or on both sides of the manifold. In another example, exhaust-side cylinder mount 5822 may be affixed to or a feature of exhaust manifold 5812 on either side of the manifold or on both sides of the manifold. Assembly 5800 is configured to provide compliance of cylinder 5802 (e.g., axially), while maintaining a center line of arrangement of cylinder 5802 (e.g., which may be aligned with one or more stator bores, one or more bearing housings, one or more other cylinders, any other suitable components, or any combination thereof).

Figure 59:
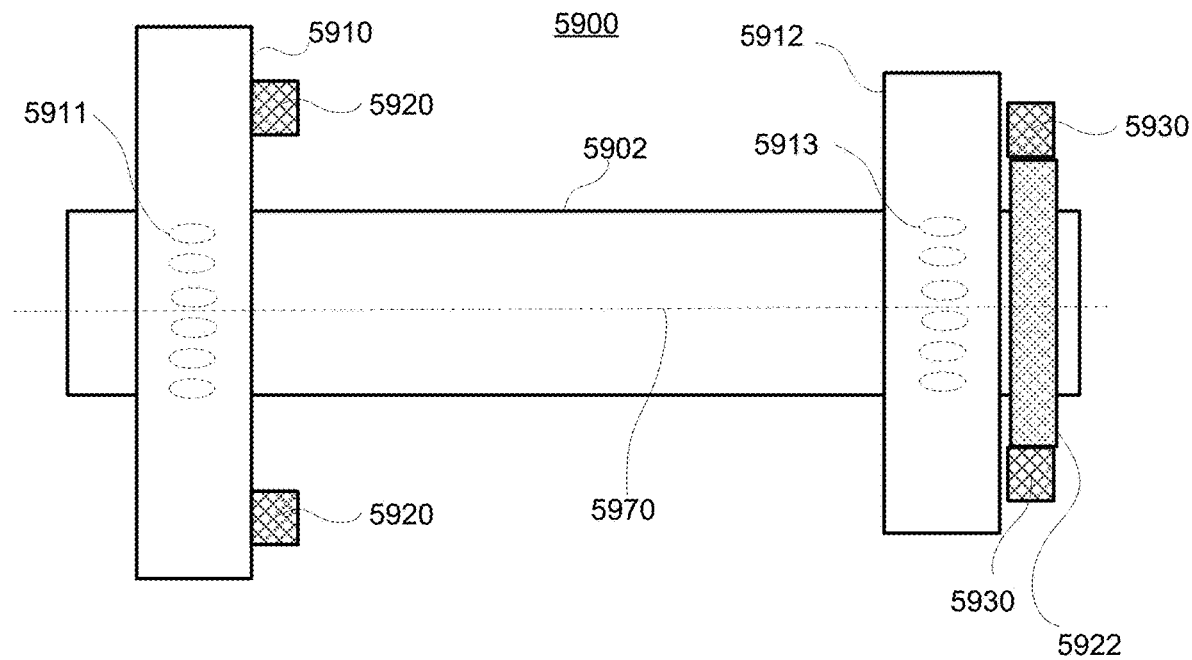
FIG. 59 shows an illustrative cylinder assembly, with an intake manifold having mounts, in accordance with some embodiments of the present disclosure.

FIG. 59 shows illustrative cylinder assembly 5900, with intake manifold 5910 having mounts 5920, in accordance with some embodiments of the present disclosure. Cylinder assembly 5900 includes cylinder 5902 (e.g., having intake ports 5911 and exhaust ports 5913), intake manifold 5910, exhaust manifold 5912, mounts 5920, mounts 5930, and flexure 5922. Mounts 5920 are configured for mounting intake manifold 5910 to a structural frame, (not shown). Mounts 5930 are configured for mounting exhaust manifold 5912 via flexure 5922 to the structural frame (not shown). For example, flexure 5922 may allow axial displacement of cylinder 5902 due to thermal expansion without incurring significant stress. In a further example, flexure 5922 may be relatively stiff to lateral displacement of cylinder 5902 (e.g., thus maintaining alignment of axis 5970 with stator bores). Assembly 5900 is configured to provide compliance of cylinder 5902 (e.g., axially), while maintaining a center line of arrangement of cylinder 5902 (e.g., which may be aligned with one or more stator bores, one or more bearing housings, one or more other cylinders, any other suitable components, or any combination thereof).

Figure 60:
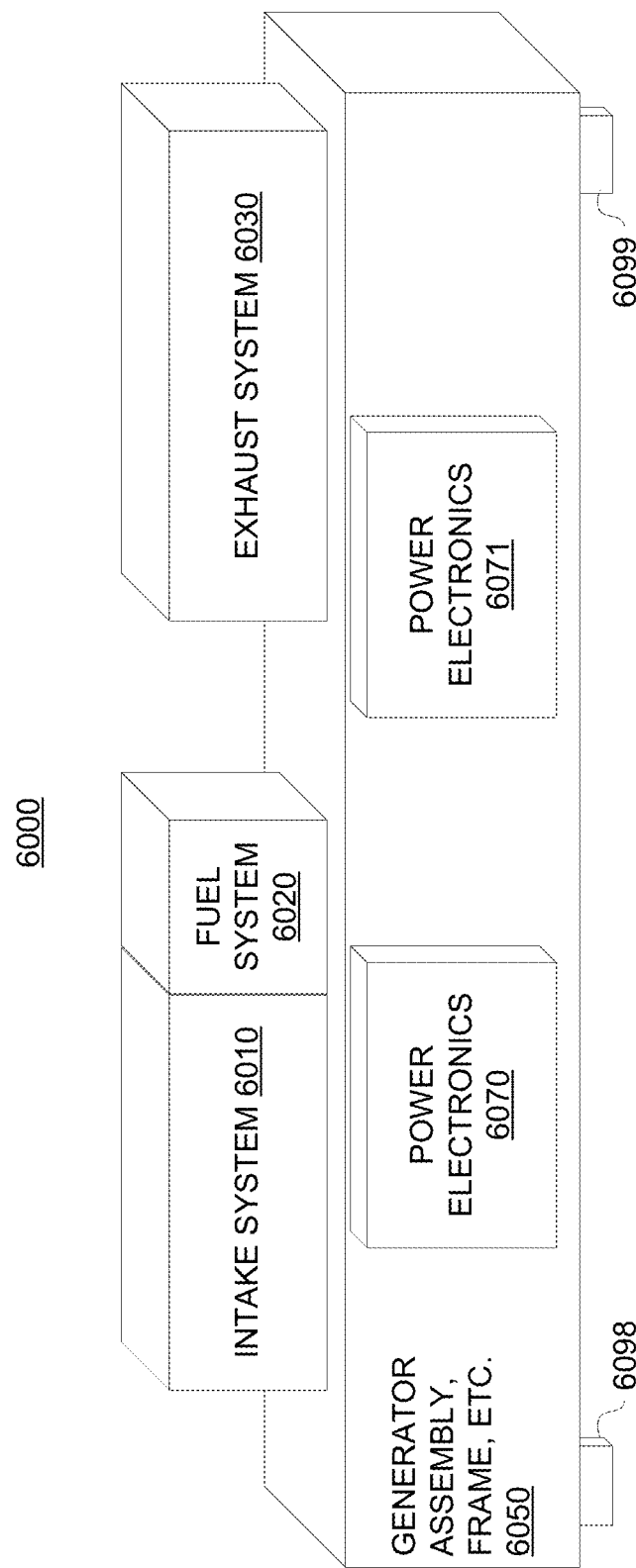
FIG. 60 shows a perspective view of an illustrative core, in accordance with some embodiments of the present disclosure.
Figure 61:
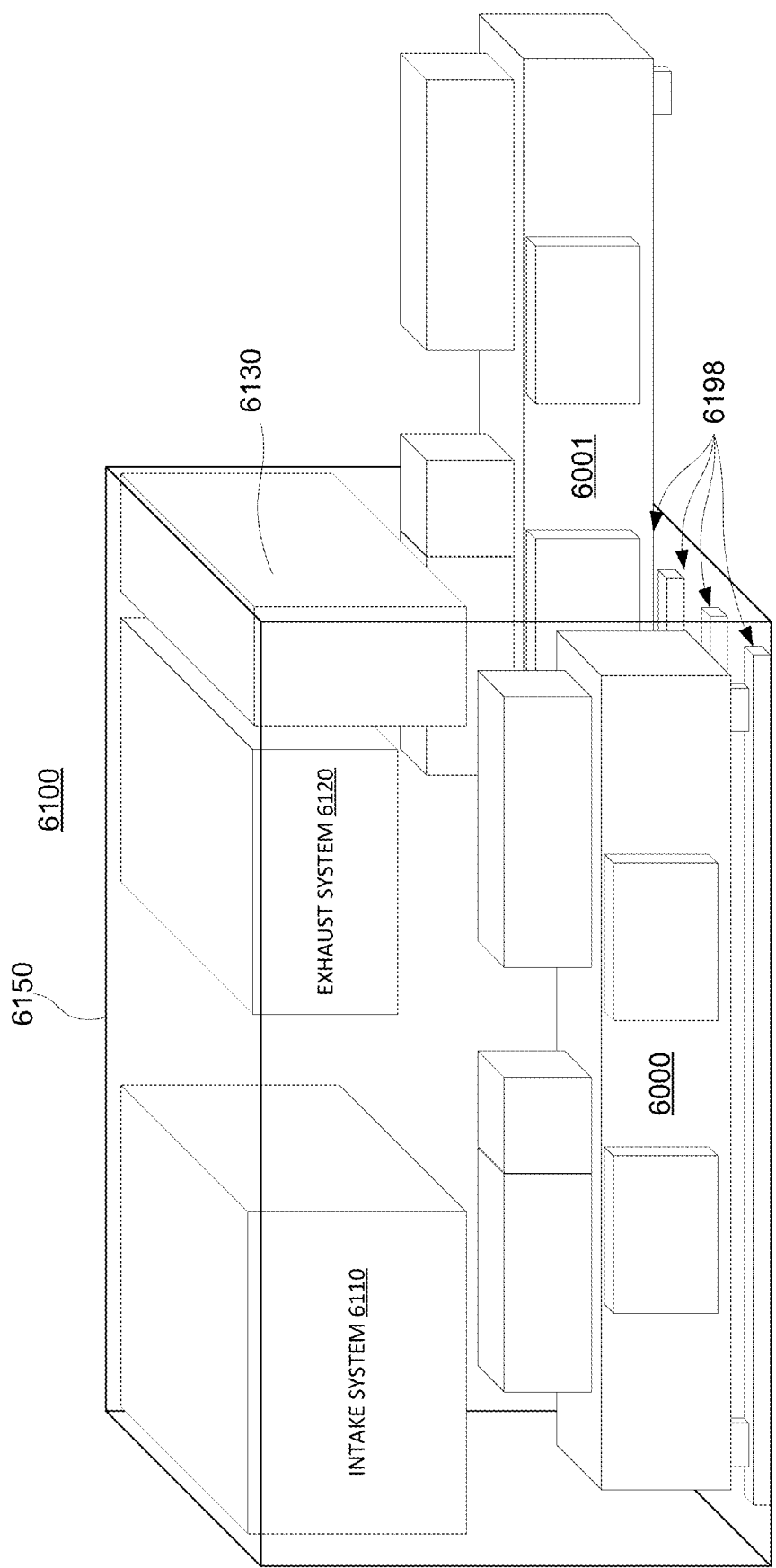
FIG. 61 shows a perspective view of an illustrative system that includes two cores, in accordance with some embodiments of the present disclosure.

FIG. 60 shows a perspective view of illustrative core 6000, in accordance with some embodiments of the present disclosure. Core 6000, as illustrated, includes generator assembly and frame 6050, intake system 6010, fuel system 6020, exhaust system 6030, power electronics 6070 (e.g., for the intake-side LEM), and power electronics 6071 (e.g., for the exhaust-side LEM). Core 6000 may include any suitable components to allow testing, characterization, or both. For example, core 6000 may be electrically coupled to a load bank (e.g., a set of resistive elements) for testing (e.g., to dissipate any generated power during testing), an AC grid, a DC grid, or any other electrical load, in advance of installation in a full package assembly (e.g., as illustrated in FIG. 61). In some embodiments, one or more subsystems may include back up components to provide redundancy, resilience and to allow for continued operation or for a controlled shut down in case of one or more component failures during operation.

FIG. 61 shows a perspective view of illustrative integrated linear generator system 6100, in accordance with some embodiments of the present disclosure. Integrated linear generator system 6100 includes enclosure 6150, core 6000, and core 6001. FIG. 61 shows core 6000 installed in enclosure 6150, with core 6001 partially installed/removed. Enclosure 6150 includes rail system 6198, which may engage with a structural frame of either core, for installing and removing each of cores 6000 and 6001. By including distinct cores (e.g., cores 6000 and 6001), integrated linear generator system 6100 exhibits modularity and allows replacement or repair of a core rather than the entire system. An enclosure may be configured to accommodate any suitable number of cores, in accordance with the present disclosure. In some embodiments, enclosure 6150 includes intake equipment 6010 (e.g., for providing intake gas to core 6000 and 6001), exhaust equipment 6120 (e.g., for receiving exhaust gas from core 6000 and 6001), and electronics 6130 (e.g., which may include a control system for controlling core 6000 and core 6001). For example, in some embodiments, intake equipment 6010 couples to intake system 6010 of core 6000. In a further example, in some embodiments, exhaust system 6120 couples to exhaust system 6030 of core 6000. In a further example, in some embodiments, electronics 6130 couples to power electronics 6070 and 6071 of core 6000.

In some embodiments, one or more components, systems, or auxiliaries may be shared among cores. For example, exhaust tuned pipes may be shared among more than one core (e.g., each core need not have a dedicated exhaust system, or dedicated tuned pipes thereof). In some embodiments, two or more packages (e.g., similar to integrated linear generator system 6100 of FIG. 61) may be in communication with each other. For example, packages may be linked to each other communications-wise via a communications network (e.g., any suitable wired or wireless network). In a further example, packages may be linked by a shared fuel system, shared cooling system, shared intake system, shared exhaust system, shared control system, shared power electronics system, any other suitable shared system, or any combination thereof. In some embodiments, one or more cores may be synchronized to the other cores to achieve operating requirements, including efficiency, power, or noise.

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to engines and compressors. In some embodiments, the present disclosure is applicable to combustion and reaction devices such as a reciprocating engine and an engine. In some embodiments, the present disclosure is applicable to non-combustion and non-reaction devices such as reciprocating compressors and compressors. In some embodiments, the present disclosure is applicable to gas springs. In some embodiments, the present disclosure is applicable to oil-free reciprocating and engines and compressors. In some embodiments, the present disclosure is applicable to oil-free engines with internal or external combustion or reactions. In some embodiments, the present disclosure is applicable to oil-free engines that operate with compression ignition (e.g., homogeneous charge compression ignition, stratified charge compression ignition, or other compression ignition), spark ignition, or both. In some embodiments, the present disclosure is applicable to oil-free engines that operate with gaseous fuels, liquid fuels, or both. In some embodiments, the present disclosure is applicable to linear engines. In some embodiments, the present disclosure is applicable to engines that can be combustion engines with internal combustion/reaction or any type of heat engine with external heat addition (e.g., from a heat source or external reaction such as combustion).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A linear generator comprising:
a structural frame comprising one or more openings in a surface of the structural frame allowing for insertion of a cylinder into the structural frame;
a cylinder, separate from the structural frame, affixed to a center region of the structural frame, wherein the structural frame surrounds the cylinder;

a first linear electromagnetic machine (LEM) arranged on a first longitudinal side of the cylinder, and affixed to the structural frame; and a second LEM arranged on a second longitudinal side of the cylinder, and affixed to the structural frame, wherein the second longitudinal side is opposite the first longitudinal side, wherein the second LEM is aligned to the first LEM, and wherein the cylinder is aligned longitudinally to the first LEM and to the second LEM.

2. The linear generator of claim 1, further comprising:
a first gas spring cylinder affixed to the structural frame and aligned to the first LEM; and
a second gas spring cylinder affixed to the structural frame and aligned to the second LEM.

3. The linear generator of claim 1, wherein the structural frame comprises one or more openings in a top surface allowing for:
insertion of the cylinder into the structural frame;
insertion of the first LEM into the structural frame; and
insertion of the second LEM into the structural frame.

4. The linear generator of claim 1, wherein:
the first LEM comprises a first stator bore; and
the second LEM comprises a second stator bore, wherein the first stator bore is aligned to the second stator bore.

5. The linear generator of claim 1, wherein the cylinder is affixed to the structural frame by one or more flexures.

6. The linear generator of claim 5, wherein the one or more flexures are relatively stiffer to lateral displacement than axial displacement.

7. The linear generator of claim 1, wherein the first LEM is laterally aligned to the second LEM.

8. The linear generator of claim 1, wherein the first LEM is axially aligned to the second LEM.

9. The linear generator of claim 1, further comprising at least one mount affixed to the frame, wherein:
the linear generator operates in one or more frequency ranges; and
the mount is capable of attenuating vibrations from the linear generator.

10. The linear generator of claim 1, wherein the structural frame comprises one or more end members, wherein the one or more end members allow for axial thermal expansion, and wherein the one or more end members maintain lateral stiffness.

11. The linear generator of claim 1, wherein the cylinder is aligned longitudinally to the first LEM and to the second LEM subject to a tolerance.

12. A linear generator comprising:
a structural frame comprising one or more openings in a surface of the structural frame allowing for insertion of a cylinder into the structural frame;
a cylinder, separate from the structural frame, affixed to a center region of the structural frame, wherein the structural frame surrounds the cylinder;
a first stator arranged on a first longitudinal side of the cylinder, and affixed to the structural frame; and
a second stator arranged on a second longitudinal side of the cylinder, and affixed to the structural frame, wherein the second longitudinal side is opposite the first side, wherein the second stator is aligned to the first stator, and wherein the cylinder is aligned longitudinally to the first stator and to the second stator.

13. The linear generator of claim 12, further comprising:
a first translator arranged to interact with the first stator and the cylinder; and a second translator arranged to interact with the second stator and the cylinder.

14. The linear generator of claim 13, further comprising:
one or more first gas bearing housings that constrain the first translator relative to the first stator; and
one or more second gas bearing housings that constrain the second translator relative to the second stator.

15. The linear generator of claim 13, wherein:
the first translator comprises:
a first piston arranged to move along an axis of the cylinder, and
a first magnet section that interacts with the first stator,
the second translator comprises:
a second piston arranged to move along the axis of the cylinder, and
a second magnet section that interacts with the second stator.

16. The linear generator of claim 15, wherein the first piston and the second piston define a reaction section of the cylinder.

17. The linear generator of claim 12, wherein the structural frame comprises one or more end members, wherein the one or more end members allow for axial thermal expansion, and wherein the one or more end members maintain lateral stiffness.

18. The linear generator of claim 12, wherein the cylinder is aligned longitudinally to the first LEM and to the second LEM subject to a tolerance.

19. A structural frame for mounting components of a linear generator, the structural frame comprising:
one or more members for providing axial and lateral stiffness;
a first mounting area of the one or more members for receiving a first linear electromagnetic machine (LEM);
a second mounting area of the one or more members for receiving a second LEM;
a third mounting area of the one or more members for receiving a cylinder that is separate from the structural frame, wherein the structural frame surrounds the cylinder, and wherein the structural frame causes the cylinder to be aligned longitudinally to the first LEM and to the second LEM; and
one or more openings among the one or more members, wherein the one or more openings correspond to the first mounting area, the second mounting area, and the third mounting area.

20. The structural frame of claim 19, wherein the one or more openings are arranged on a top side of the structural frame so that:
the first mounting area receives the first LEM through the top side;
the second mounting area receives the second LEM through the top side; and
the third mounting area receives the cylinder through the top side.

21. The structural frame of claim 19, further comprising one or more end members coupled to the one or more members, wherein the one or more end members allow for axial thermal expansion, and wherein the one or more end members maintain lateral stiffness.

22. The structural frame of claim 19, wherein the first mounting area, the second mounting area, and the third mounting area are axially and laterally aligned.

23. The structural frame of claim 19, wherein the cylinder is caused to be aligned longitudinally to the first LEM and to the second LEM subject to a tolerance.

* * * * *